Sept. 30, 1958      K. M. WHITE ET AL      2,854,096
ELEVATOR DISPATCHING AND CONTROL SYSTEM
Filed Oct. 12, 1956      34 Sheets-Sheet 1

INVENTORS
KENNETH M. WHITE,
JOHN J. DREXLER &
BY   PAUL DUCKWALL, III their     ATTORNEYS Sept. 30, 1958 K. M. WHITE ET AL 2,854,096
ELEVATOR DISPATCHING AND CONTROL SYSTEM
Filed Oct. 12, 1956 34 Sheets-Sheet 2

INVENTORS
KENNETH M. WHITE,
JOHN J. DREXLER &
PAUL DUCKWALL, III
BY Campbell, Brumbaugh, Free & Graves
their ATTORNEYS Sept. 30, 1958 K. M. WHITE ET AL 2,854,096
ELEVATOR DISPATCHING AND CONTROL SYSTEM
Filed Oct. 12, 1956 34 Sheets-Sheet 7

INVENTORS
KENNETH M. WHITE,
JOHN J. DREXLER &
PAUL DUCKWALL, III
BY Campbell, Brumbaugh, Free & Graves
their ATTORNEYS Sept. 30, 1958     K. M. WHITE ET AL     2,854,096
ELEVATOR DISPATCHING AND CONTROL SYSTEM
Filed Oct. 12, 1956     34 Sheets-Sheet 10

INVENTORS
KENNETH M. WHITE,
JOHN J. DREXLER &
PAUL DUCKWALL, III
BY
their ATTORNEYS Sept. 30, 1958 K. M. WHITE ET AL 2,854,096
ELEVATOR DISPATCHING AND CONTROL SYSTEM
Filed Oct. 12, 1956 34 Sheets-Sheet 13

INVENTORS.
KENNETH M. WHITE,
JOHN J. DREXLER &
PAUL DUCKWALL, III
BY
their ATTORNEYS.

Sept. 30, 1958   K. M. WHITE ET AL   2,854,096
ELEVATOR DISPATCHING AND CONTROL SYSTEM
Filed Oct. 12, 1956   34 Sheets-Sheet 14

INVENTORS.
KENNETH M. WHITE,
JOHN J. DREXLER &
PAUL DUCKWALL, III
BY
their ATTORNEYS.

Sept. 30, 1958 K. M. WHITE ET AL 2,854,096
ELEVATOR DISPATCHING AND CONTROL SYSTEM
Filed Oct. 12, 1956 34 Sheets-Sheet 15

INVENTORS
KENNETH M. WHITE,
JOHN J. DREXLER &
PAUL DUCKWALL, III
BY
Campbell, Brumbaugh, Free & Graves
their ATTORNEYS Sept. 30, 1958 K. M. WHITE ET AL 2,854,096
ELEVATOR DISPATCHING AND CONTROL SYSTEM
Filed Oct. 12, 1956 34 Sheets-Sheet 18

INVENTORS
KENNETH M. WHITE,
JOHN J. DREXLER &
BY PAUL DUCKWALL, III their ATTORNEYS Sept. 30, 1958     K. M. WHITE ET AL     2,854,096
ELEVATOR DISPATCHING AND CONTROL SYSTEM
Filed Oct. 12, 1956     34 Sheets-Sheet 23

INVENTORS
KENNETH M. WHITE,
JOHN J. DREXLER &
PAUL DUCKWALL, III
their ATTORNEYS Sept. 30, 1958  K. M. WHITE ET AL  2,854,096
ELEVATOR DISPATCHING AND CONTROL SYSTEM
Filed Oct. 12, 1956  34 Sheets-Sheet 24

INVENTORS
KENNETH M. WHITE,
JOHN J. DREXLER &
PAUL DUCKWALL, III
BY
their ATTORNEYS Sept. 30, 1958      K. M. WHITE ET AL      2,854,096

ELEVATOR DISPATCHING AND CONTROL SYSTEM

Filed Oct. 12, 1956      34 Sheets-Sheet 26

INVENTORS
KENNETH M. WHITE,
JOHN J. DREXLER &
PAUL DUCKWALL, III
BY
their ATTORNEYS Sept. 30, 1958     K. M. WHITE ET AL     2,854,096
ELEVATOR DISPATCHING AND CONTROL SYSTEM
Filed Oct. 12, 1956     34 Sheets-Sheet 27

INVENTORS
KENNETH M. WHITE,
JOHN J. DREXLER &
PAUL DUCKWALL, III
BY
their ATTORNEYS Sept. 30, 1958   K. M. WHITE ET AL   2,854,096
ELEVATOR DISPATCHING AND CONTROL SYSTEM
Filed Oct. 12, 1956   34 Sheets-Sheet 33
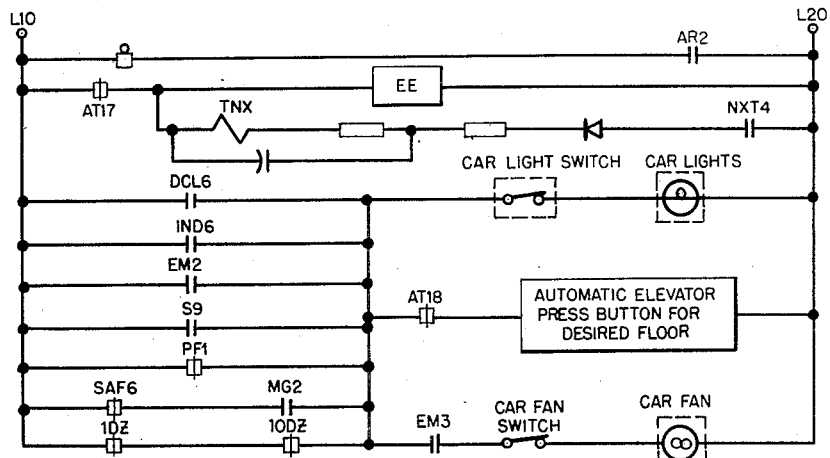
FIG.23.
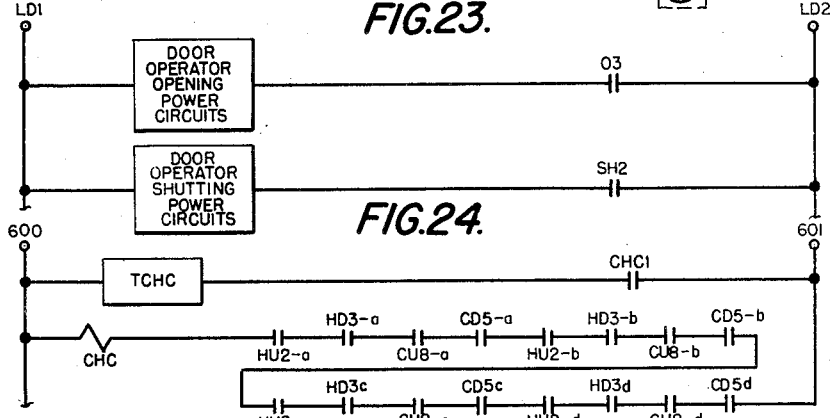
FIG.24.
FIG.25.
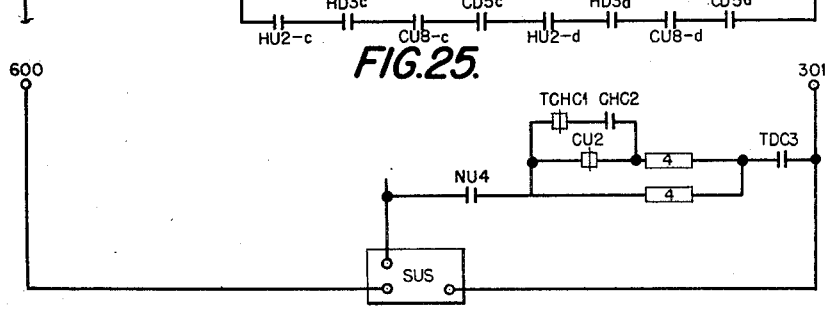
FIG.26
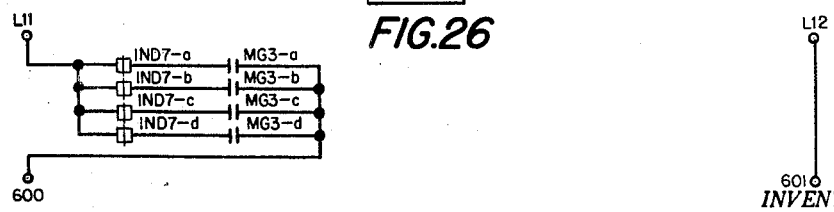
FIG.27.
INVENTORS
KENNETH M. WHITE,
JOHN J. DREXLER &
PAUL DUCKWALL, III
BY Campbell, Brumbaugh, Free & Graves
their ATTORNEYS Sept. 30, 1958 K. M. WHITE ET AL 2,854,096

ELEVATOR DISPATCHING AND CONTROL SYSTEM

Filed Oct. 12, 1956 34 Sheets-Sheet 34

INVENTORS
KENNETH M. WHITE,
JOHN J. DREXLER &
PAUL DUCKWALL, III
BY
their ATTORNEYS United States Patent Office 2,854,096
Patented Sept. 30, 1958

2,854,096

ELEVATOR DISPATCHING AND CONTROL SYSTEM

Kenneth M. White, John J. Drexler, and Paul Duckwall III, Louisville, Ky., assignors to K. M. White Company, Louisville, Ky., a corporation of Kentucky Application October 12, 1956, Serial No. 615,580

163 Claims. (Cl. 187—29)

The present invention relates to a dispatching and control system for a plurality of elevator cars operating in a bank between a plurality of floors, and, more particularly, to a novel and improved fully automatic dispatching and control system which responds instantaneously to the traffic demand indicated in the system.

A great variety of dispatching and control systems for a plurality of elevator cars operating in a bank are in use in modern elevator installations. In many of these systems, cars operating with and without attendants are dispatched from dispatching floors either at predetermined intervals of time or immediately upon arrival at the dispatching floor, and travel either from one terminal to another or are reversed at some point intermediate the terminals, in accordance with the selected one of a plurality of fixed predetermined traffic programs. The particular traffic program is either manually selected by a starter or other system attendant, or is selected during particular hours of the day by a clock mechanism. During night time or periods when the bank of elevators is not used except for irregular and intermittent service, it is common practice to shut down the dispatching system and operate only one or two cars on selective collective operation.

In accordance with the invention, a novel and improved fully automatic dispatching and control system is provided which operates under all traffic conditions at any time of day or night to instantaneously respond in the most effective manner to satisfy the traffic demand registered in the system at a particular time, independent of any limited number of traffic programs. Traffic demand sensing means is provided which is at all times responsive to the demand for travel by the cars operated in the bank and the position and direction of travel of the cars, to control the dispatching of cars from the dispatching floors, the direction of travel and operation of the cars, the automatic starting up and shutting down of the driving means for each of the elevator cars in accordance with the number of cars required by the traffic demand registered in the system at that time, and the selection and maintenance of the selection of cars for special and preferred services.

For a more complete understanding of the above features and other features and advantages of the invention, reference may be had to the following detailed description of the various figures of the accompanying drawings:

Figs. 18, 19, 20, 21, 22, 23 and 24 are electrical schematic diagrams of exemplary embodiments of various control circuits individual to the cars;

Figs. 25 and 26 are electrical schematic diagrams of an alternate embodiment of the dispatching circuits;

Fig. 27 is an electrical schematic diagram of an additional portion of the control circuit of Fig. 1; and Figs. 1A through 27A, inclusive, are straight line diagrams corresponding respectively to Figs. 1 through 27, inclusive, and showing the relative location of relays and contacts in corresponding figures of the drawings.

Figure 1:
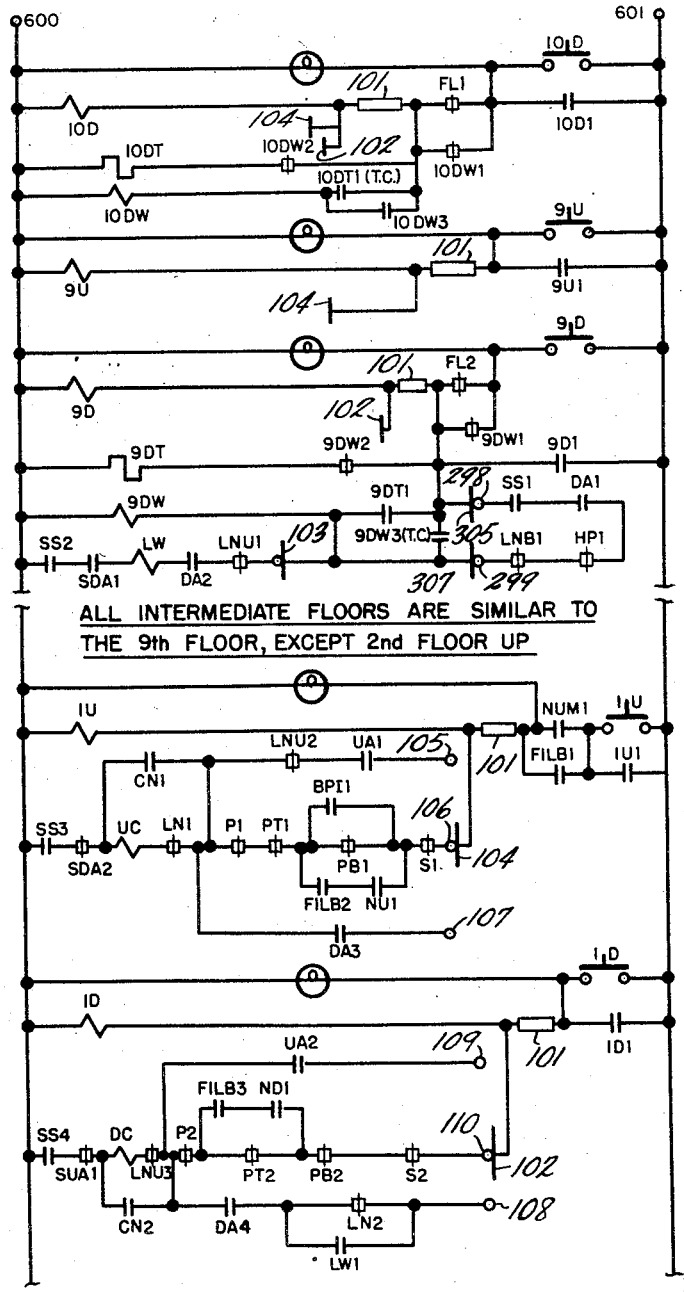
Figure 1 is an electrical schematic diagram of an exemplary embodiment of the hall call registering means common to each of the cars operating in a bank along with hall call pick up means individual to the cars, in accordance with the invention.
Figure 1A:
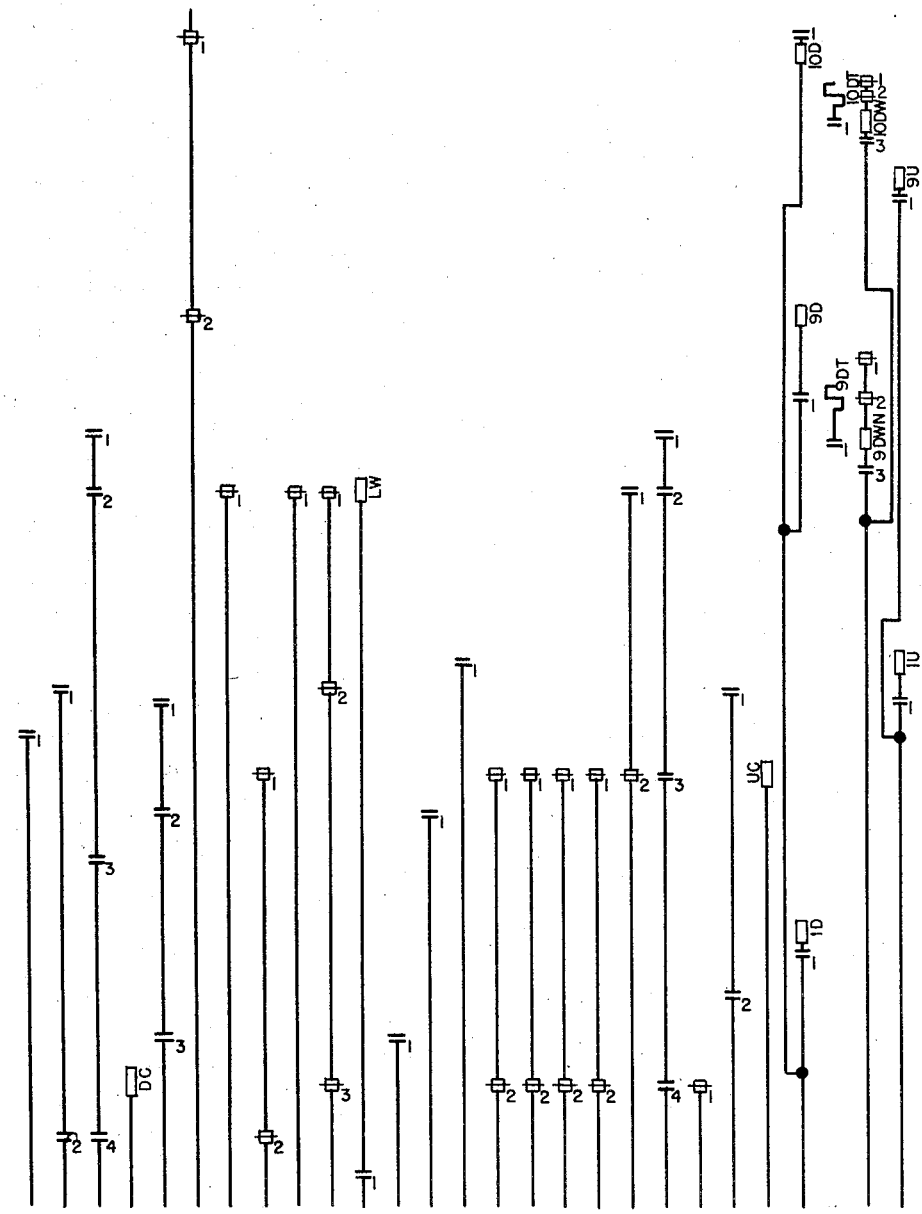

As an aid in understanding the invention as illustrated in the exemplary embodiments of the drawings, each of the various contacts associated with particular relays bear the same letter designation as the respective relay plus a distinguishing numerical suffix. Further, the condition of the contact as shown in the drawings, i. e., open or closed, is the condition of the contact with its controlling relay not energized or dropped out. It will be understood the movable brushes and contact segments, which they are adapted to pass over and contact, are intended to be arranged in a suitable manner on a conventional type of floor selecting mechanism.

The description is based on a system for controlling four elevator cars operating in a bank between eleven floors, the bottom of which is designated as the basement floor and the upper ten floors are designated as 1 through 10, respectively. The 1st floor is designated as the lower dispatching floor, from which cars are dispatched in the up direction, and the 10th is designated as the upper dispatching floor from which cars are dispatched in the down direction. It will be understood that the principles of the invention are equally applicable to elevator installations having different numbers of floors, different numbers of cars, and different floors designated as dispatching floors.

The electrical relays of the dispatching and control system may be energized from any suitable sources of power. In the disclosed preferred embodiment of the invention, the following power supply bus designations are utilized:

L1, L2—Individual elevator incoming power bus.
L10, L20—Individual elevator lighting supply bus.
L11, L12—Common relay panel incoming power bus.
L—, L+—Individual elevator exciter voltage bus.
LD1, LD2—Door operator power supply bus.
300, 301—Individual elevator signal supply bus.
600, 601—Common signal supply bus.

When similar circuits are used at a plurality of different floors, the circuits for intermediate floors have been left out, and it is to be understood that the circuits at the intermediate floors are intended to be similar. It is not intended that the relationship of contact brushes and contact segments shown in the drawing is illustrative of the relationship that would be had in an actual elevator installation when a car associated with all of the contact brushes is located at any one point in the hatchway.

The relays disclosed in the exemplary embodiments in the drawings bear the following functional designations:

A—Motor-generator set starting
AD—Attendant down direction
ADA—Attendant down direction
AR—Alarm signal
AT—Attendant transfer
AU—Attendant up direction
B—Motor-generator set running
BEX—Express service from basement
BP—Master basement preference indication
BPI—Basement floor position indication
BX—Automatic return to 1st floor from basement
BY—Order of selection—up
BZ—Basement zone
CA—Call
CC—Car call
CD—Car call below car
CHC—No car or hall calls registered
CN—Call cancelling
CU—Car call above car
DA—Down direction
DC—Down hall call
DCA—Down hall call auxiliary—sequence
DCL—Door close limit indication
DDA—Down direction arrow holding
DE—Door operator master pilot relay
DF—Dispatcher failure
DFD—Dispatcher failure—down
DFU—Dispatcher failure—up
DO—Door open signal
DOL—Door open limit indication
DOP—Door re-opening from door close protective timer
DOX—Door open button, safety edge, and photoelectric relay indication
DPD—Directional preference—down
DPU—Directional preference—up
DSA—Start button indication
DW—Preferred service call indication
DWA—Down preferred service call above
DWB—Down preferred service call below
DWBS—Down preferred service call below—sequence
DWBU—Car above up preferred service call
DWD—Down preferred service call indication
DWU—Up preferred service call indication
DX—Door interference signal
DZ—Door zone
E—Exciter voltage
EE—Photoelectric door control
EM—Exciter voltage and safety circuits
F—Slow down for 2nd floor
FILA—Master motor-generator shutdown indication
FILB—Master motor-generator shutdown indication—sequence
FILT—Timing for starting 2nd car after all motor-generator sets are shutdown
FL—Down preferred service lights flashing
FLA—Down preferred service lights flashing—sequence
FLAU—Up preferred service lights flashing—sequence
FLU—Up preferred service lights flashing
GS—Start gong control
HD—Hall call below
HLN—Hall lantern initiating signal
HP—Attendant "pass" button
HU—Hall call above
IND—Independent service
K—Intermediate speed
LN—Down preferred service signal
LNB—Down peak anticipation defeat on preferred service car
LNU—Up preferred service signal
LS—Hall call by-pass by loaded car or attendant "pass" signal
LSA—Hall call by-pass automatic reset
LSD—Load weigh indication
LSM—unloaded car
LST—Load weigh timer
LW—Down preferred service call
LWD—Highest down-traveling car
LWU—Highest up-traveling car
MG—Manual motor-generator switch indication
MGB—Master motor-generator running on car in service at bottom terminal floor
MGL—Exciter voltage—sequence
MGT—Master motor-generator running on car in service at top terminal floor
N—Sequence of arrival
ND—Next down signal
NDA—Next down signal auxiliary
NDC—Next down signal cancelling
NDM—Master next down signal indication
NDS—Next down selector
NDSN—Next down selector interrupter
NN—Sequence of arrival interrupter
NU—Next up signal
NUA—Next up signal auxiliary
NUC—Next up signal cancelling
NUM—Master next up signal indication
NUS—Next up selector
NUSN—Next up selector interrupter
NX—Selection position at either terminal
NXA—Next signal—sequence
NXT—Next signal
O—Door operator opening power relay
OS—Failure to start signal
P—Motor and generator fields and brake potential
PB—In service at bottom terminal
PBA—In service at bottom terminal and motor-generator sequence
PF—Power failure indication
PL—Availability for basement preference selection
PRB—Basement preference
PT—In service at top terminal
PTA—In service at top terminal and motor-generator sequence
PTM—Master in service at top terminal indication
R—Re-leveling
RS—Car call manual reset by attendant
S—Starting
SAF—"Stop-run" switch indication
SCL—Door operator closing check indication
SD—Starting—down direction
SDA—Signal for down direction
SDAM—All "in service" cars with signal for down direction
SDS—Top terminal electronic dispatcher
SER—Door opening by safety devices and door time transfer
SH—Door operator shutting power relay
SHX—Door close protective time initiating
SHXA—Door close protective time initiating—and sequence
SS—In service indication
SSM—Indication of only one car in service
SSN—Indication of only two cars in service
SU—Starting-up direction
SUA—Signal for up direction
SUDA—Signal for either direction
SUS—Bottom terminal electronic dispatcher
SX—No down car above up preferred service TCHC—Timing for electronic dispatcher when no demand
TD—Door timer
TDA—Door timer—sequence
TDB—Door timer—sequence
TDC—Door timer—sequence operator
TDX—Door interference signal timer
TFL—Down preferred service lights flasher
TFLU—Up preferred service lights flasher
TNX—Timing for delayed door closing after loss of next signal
TOS—Failure to start timer
TS—Timing for automatic motor-generator shutdown
TY—Order of selection—down
UA—Up direction
UC—Up hall call
UCA—Up hall call auxiliary—sequence
UDA—Up direction arrow holding
UM—Master up-traveling car indication
UW—Lowest down traveling car
X—Up preferred service call registration
Y—Bottom terminal parking quota indication
YA—Bottom terminal parking quota indication—sequence
C—Floor car call
D#—Down traveling car at (designated) floor
D—Floor down hall call
DP—Selection position—down
DT—Floor down hall call timer
DW—Floor down preferred service call
DZ—Floor door zone
PI—Floor position indication
U#—Up traveling car at (designated) floor
U10—Up traveling car approaching 10th floor and in service cat at 10th floor without direction
UP—Selection position—up
UT—Floor up hall call timer
UW—Floor up preferred service call

*Individual car running and operating circuits*

Figure 7:
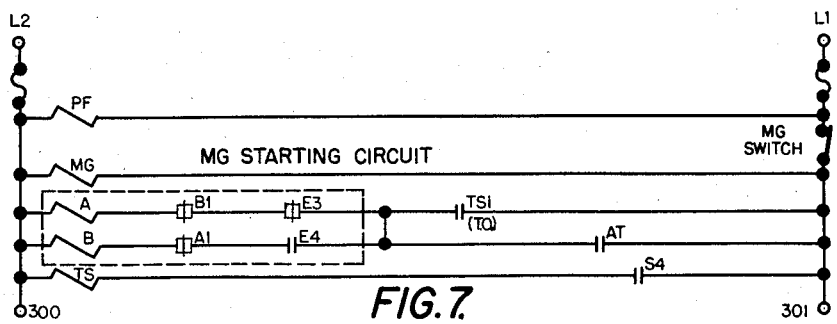
Figs. 7, 8 and 9 are electrical schematic diagrams of exemplary embodiments of basic control circuits for individual cars of the system along with position and direction indicating circuits.
Figure 8:
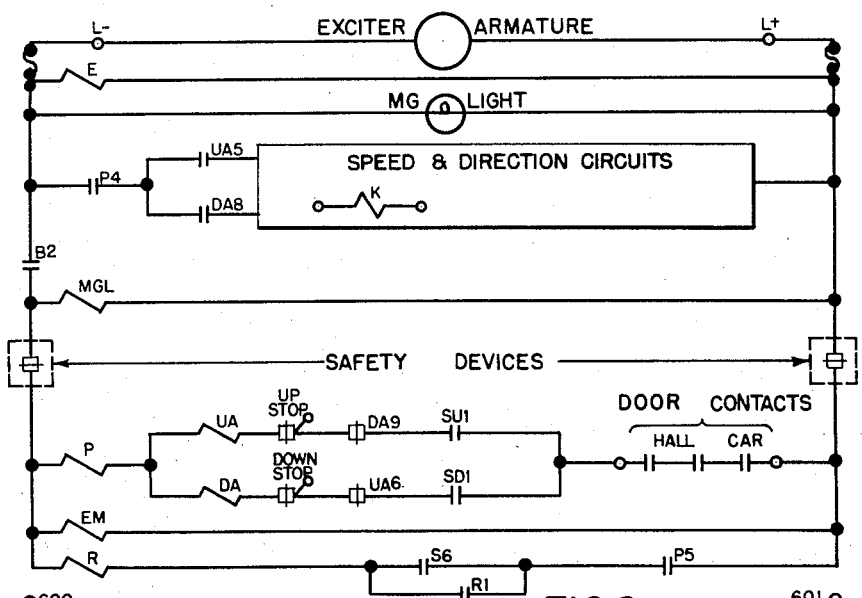

In Fig. 7, the individual elevator incoming power busses L1, L2 are connected through suitable safety means, such as fuses, and an MG switch to a suitable starting circuit operable in a conventional manner to control the operation of the elevator hoist motor, e. g., a motor-generator set (not shown), of the individual elevator car. When the MG switch is in its closed position, the motor-generator set starting relay A is picked up through the normally closed contacts B1 and E3, and a contact AT1, if the car is operating on attendant operation, or through the TS1 contact controlled by the timing for automatic motor-generator shutdown TS relay. The TS relay is picked up whenever the starting relay for the individual car is energized. The TS1 contact is time delayed in opening for a predetermined time interval when the TS relay drops out. Thus, when the starting S relay is picked up in response to demands for service by the car, the A relay is energized. When the A relay picks up, the motor-generator set starts up and a voltage is produced across the exciter armature energizing the individual elevator exciter voltage bus L—, L+. When the exciter voltage builds up to a predetermined value, the exciter voltage E relay picks up and opens the normally closed contact E3 to drop out the A relay, and closes the normally opened contact E4 to pick up the motor-generator set running B relay, as soon as the A relay has dropped out closing contact A1.

When the car is operating on attendant operation, the B relay remains energized until the MG switch is opened manually to shut down the motor-generator of the car. When the car is operating without an attendant, the B relay remains energized until no demand for service by the particular car is made for a predetermined interval of time, evidenced by the opening of the TS1 contact. When the individual elevator incoming power bus L1, L2 is energized and the MG switch for a car is closed, the manual motor-generator switch indication MG relay is picked up. Upon failure of the individual elevator incoming power bus, the power failure indication PF relay drops out, otherwise the PF relay remains energized.

With the motor-generator set for a car running and the individual elevator exciter voltage bus energized, the E relay is picked up, and an indicating lamp MG light is illuminated, and the exciter voltage—sequence MGL relay, positioned across the individual elevator exciter voltage bus behind a normally opened B2 contact, is picked up in response to the energization of the L—, L+ bus and the energization of the B relay, indicating that the motor-generator means for driving the elevator car is operative. Motor and generator fields and brake potential P relay, exciter voltage and safety circuits M relay, releveling R relay, and the up direction UA and down direction DA relays are positioned across the individual elevator exciter voltage bus behind normally closed contacts controlled by conventional safety devices.

Figure 17:
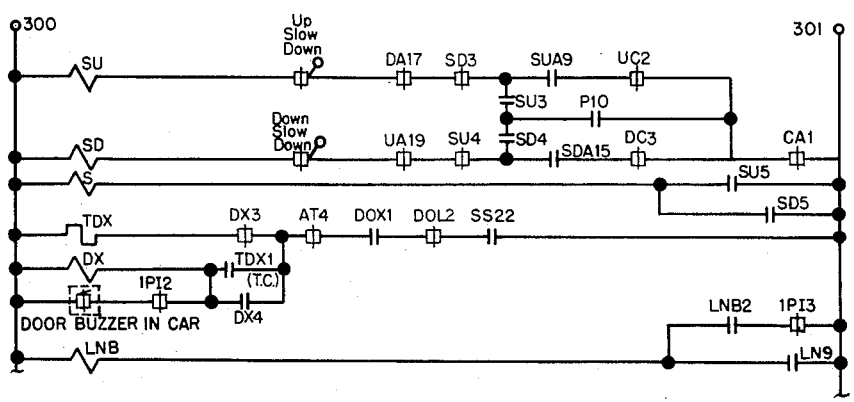
Figures 16A, 17A:
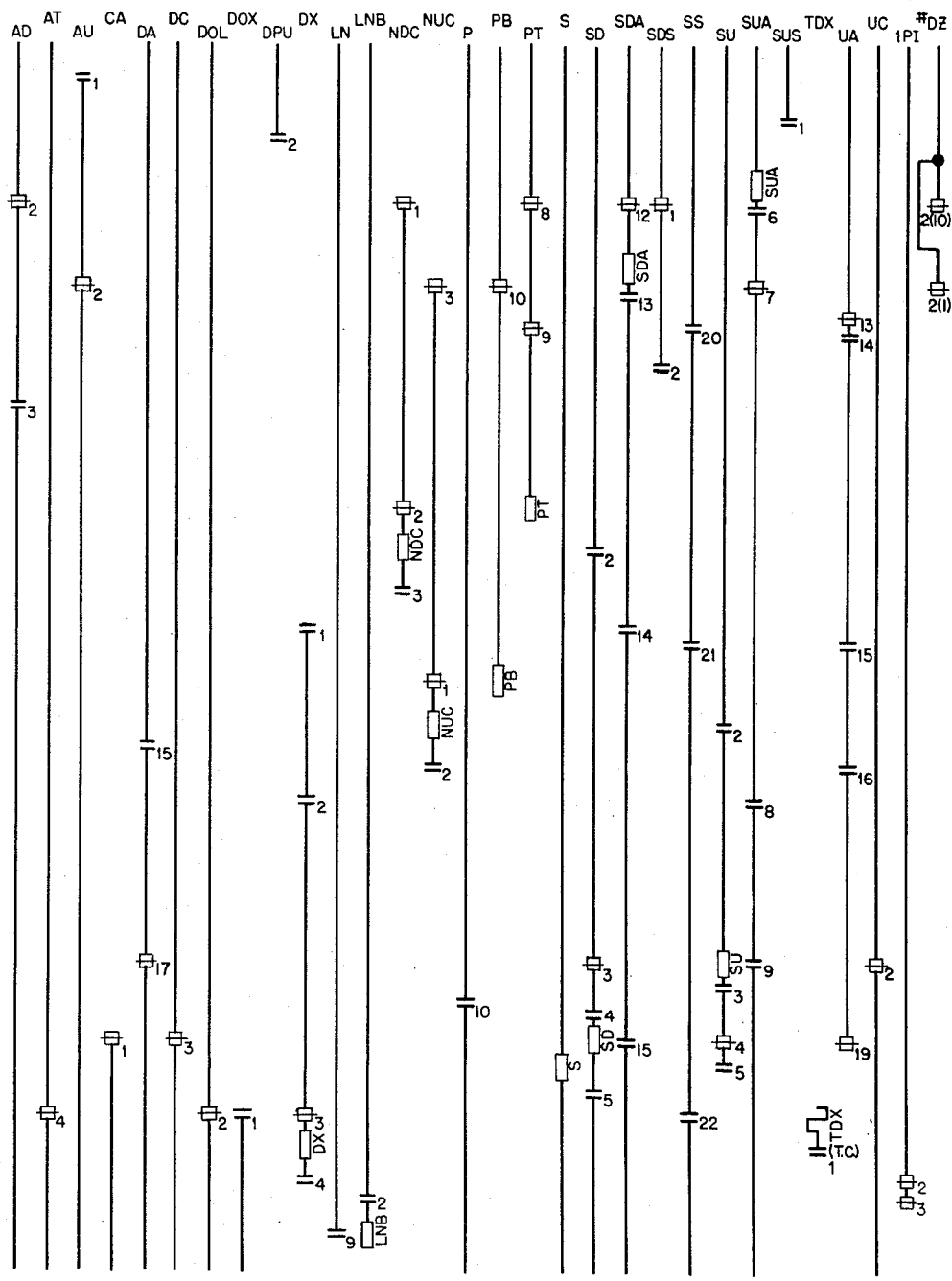

The movement of the car is controlled by the starting-down direction SD and starting-up direction SU relays (Fig. 17). When it is desired that a car will be moved in the up direction, the SU relay picks up and closes the SU1 contact in the energizing circuit for the P and UA relays through a normally closed Up Stop limit switch, a normally closed contact DA9, and closed hall and car door contacts, which are closed when the car door of a particular car and all of the hall doors opening into the hatchway in which the car is traveling are closed. When the P and UA relays pick up, appropriate speed and direction circuits, which may be of any suitable conventional type, are energized through contacts P4 and UA5. When the car starts up and starts to move in the selected direction, and its speed increases to a predetermined amount, such as what may be considered a suitable intermediate speed for travel from one floor to the next floor, an intermediate speed K relay, arranged in the speed and direction circuits in any suitable conventional manner is energized.

The car is stopped in a conventional manner by the dropping out of the starting-up direction SU relay, restoring the contact SU1 to its normally open condition and dropping out the speed and direction circuits. The car is caused to travel in the down direction by the energization of the starting-down direction SD relay closing the SD1 contact and energizing the P and DA relays through a normally closed down stop limit switch and a normally closed up direction contact UA6. The Up-Stop and Down-Stop limit switches are caused to be operated in a conventional manner when the car has traveled to the furthest point of travel in the respective direction within suitable safety limits. The re-leveling R relay is picked up whenever the car is caused to travel in response to the operation of the starting S relay through the contact S6 and the contact P5. During normal floor to floor travel, the R relay seals itself in through the normally opened R1 contact. However, when the car is stopped or is re-leveling at a floor in a conventional manner, the R relay does not pick up.

*Hall call registering and pick-up circuits*

Figure 2:
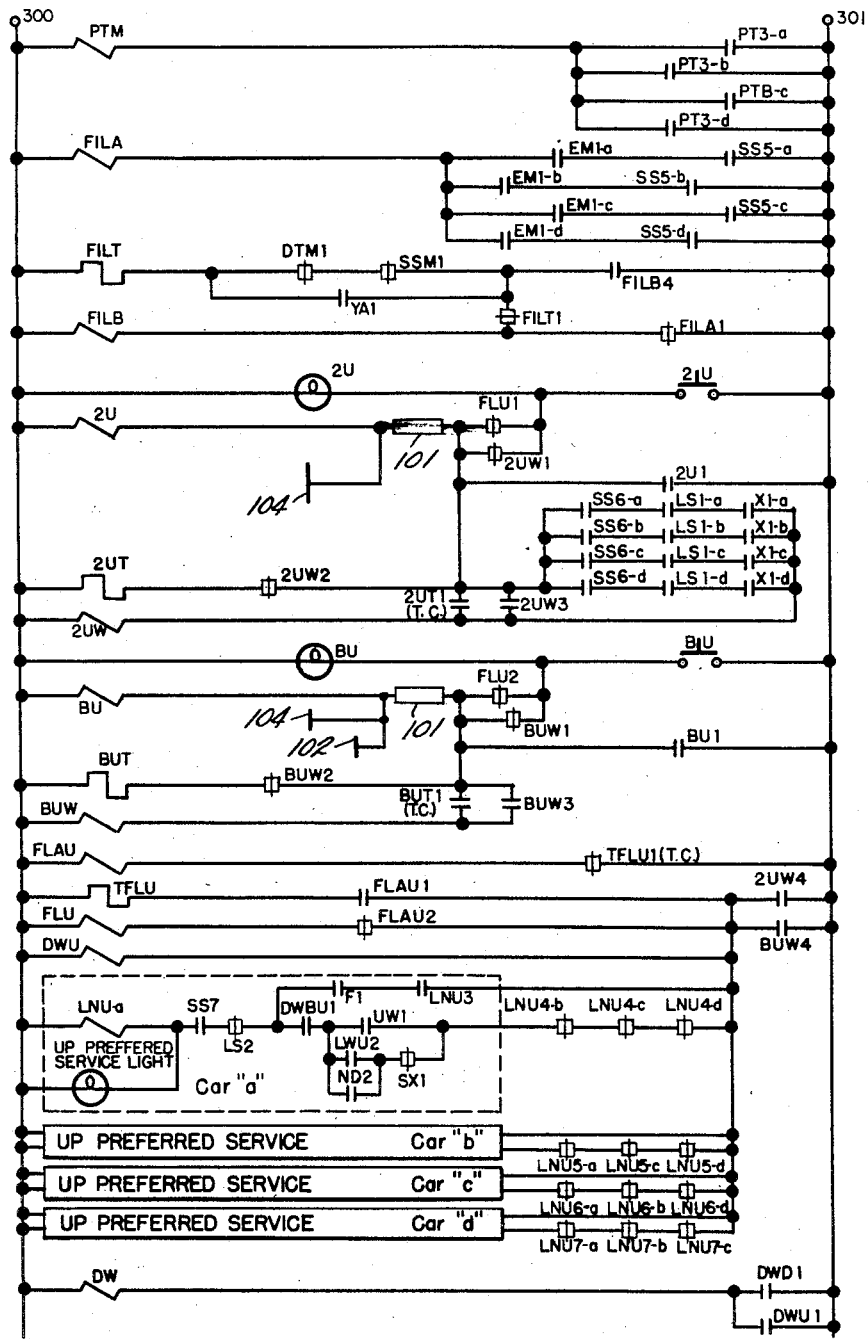
Figs. 2 and 3 are electrical schematic diagrams of preferred service selecting circuits and other circuits, in accordance with the invention.
Figure 2A:
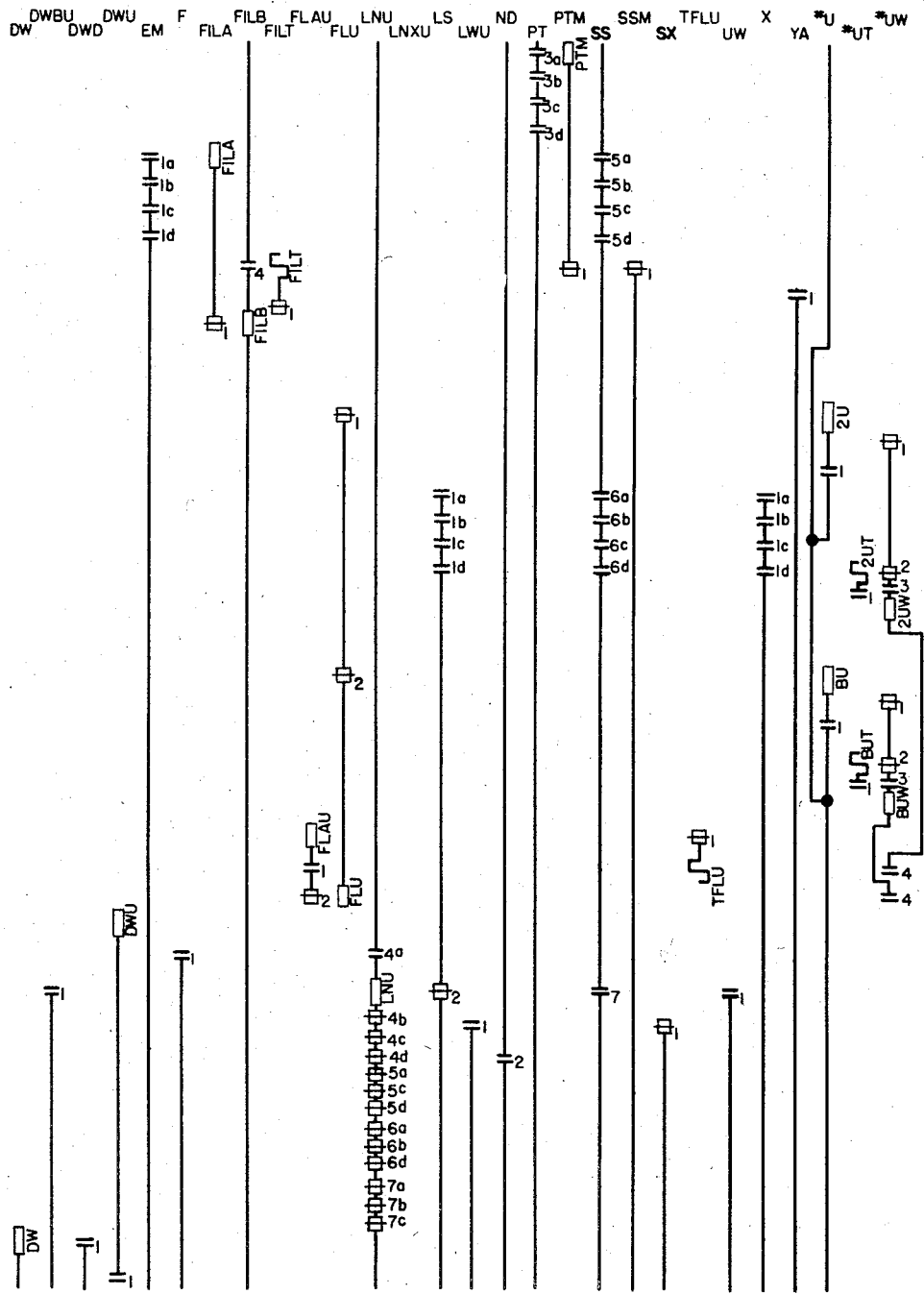

Hall call registering means for registering calls in both the up and down directions are provided at each of the 1st to 9th floors in the disclosed exemplary embodiment of the invention shown in Figs. 1 and 2. Hall call registering means for registering calls in the down direction are provided at the 10th floor and hall call registering means for registering calls in the up direction are provided at the basement floor. Each of the hall call registering means includes a device operable by an intending passenger such as a manually operable push-button controlled registering means. For example, at the first floor a push button 1D is in series with a hall call indicating light which may appear at the particular floor, in panels in each of the elevator cars, and at an indicating panel at the lobby floor. The push button 1D also is in series with a 1st floor down hall call relay 1D through a suitable current limiting resistance 101. When a call is registered by operating the push button 1D, a holding circuit is completed through the normally open contact 1D1 maintaining the relay 1D and the hall call indicating lamp energized until the call is answered. A floor selecting machine contact segment 102 is electrically connected to the hall call registering circuit to permit the hall call to be picked up by one of the elevator cars operating in the bank.

Means are provided at predetermined floors for indicating demands for preferred service. In the disclosed embodiment, preferred service indicating means are provided in association with the down hall call registering means of the 2nd through 10th floors and the up hall call registering means of the 2nd and basement floors. At each of these floors, the preferred service demand indicating means includes, as shown, for example, at the 9th floor (Fig. 1), a floor down hall call timer 9DT which is energized whenever a call is registered by operating the push button 9D, and a down preferred service call relay 9DW, which is energized at the end of a predetermined time interval provided by the down hall call timer 9DT, if the down hall call remains unanswered at the end of the time interval. The 9DW relay is picked up when the 9DT1 contact closes at the end of the time interval. When the 9DW relay picks up, it seals itself in by closing a normally closed 9DW3 contact shunting the 9DT1 contact and drops out the 9DT down hall call timer. The relay 9DW remains energized until the call is answered, when it is dropped out by the opening of the holding contact 9D1.

Figure 3:
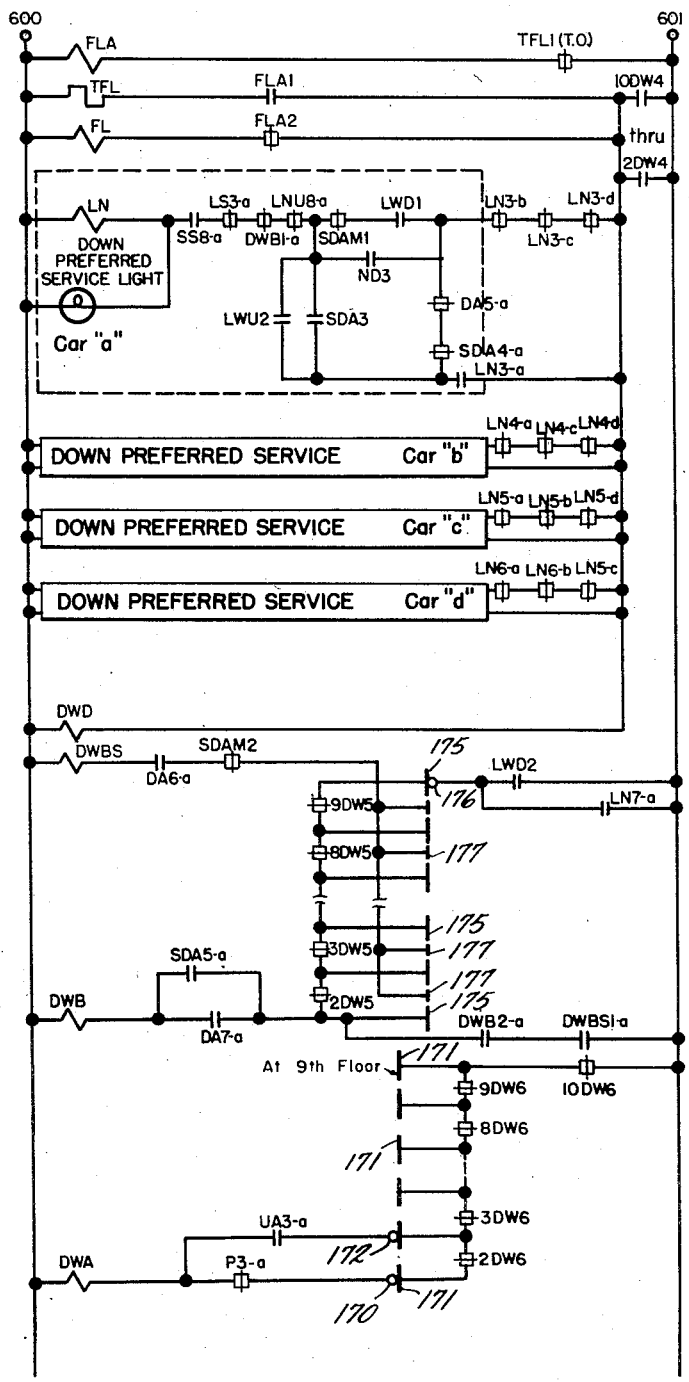
Figure 3A:
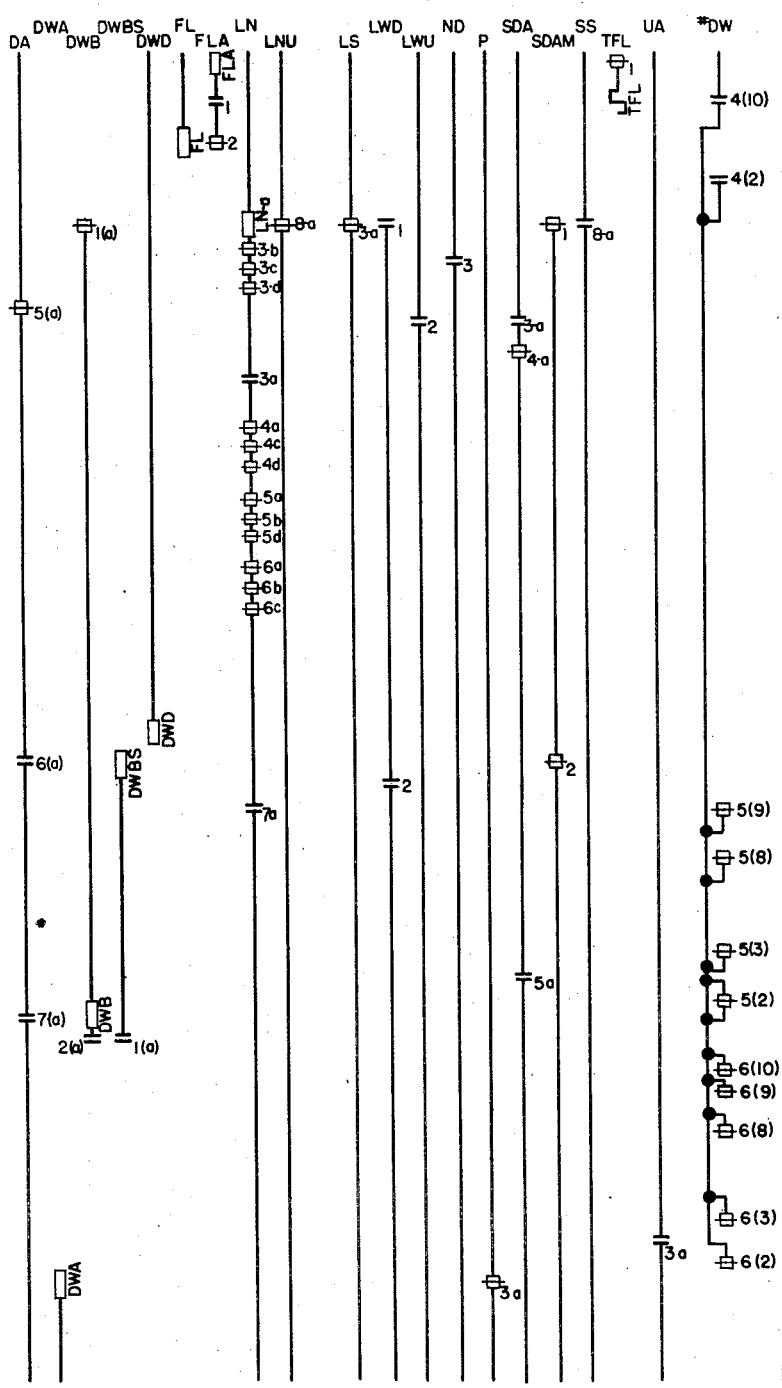

In order to indicate that the down hall call which has been registered at the 9th floor has become a down preferred service call by virtue of the operation of the down hall call timer, the hall call indicating light is flashed. This is accomplished by the 9DW relay causing the 9DW1 contact in the energizing circuit for the hall call indicating lamp to be opened. In shunt relation with the contact 9DW1 is a normally closed contact FL2, which is controlled by the down preferred service lights flashing FL relay (Fig. 3). In Fig. 3, the down preferred service lights flashing-sequence FLA relay is energized across the bus 600, 601 through a normally closed contact TFL1, causing the FLA1 contact in the energizing circuit for the down preferred service lights flasher TFL relay to be closed and the FLA2 contact in the energizing circuit for the down preferred service light flashing FL relay to be opened.

When a down preferred service call is registered as evidenced by the closing of a DW4 contact associated with the down preferred service demand indicating means at a particular floor, the TFL relay picks up and causes the TFL1 contact to open, preferably after a preferred predetermined interval of time, dropping out the FLA relay. When the FLA relay drops out, the FLA2 contact is restored to its normally closed position and a circuit is completed energizing the FL relay. The FLA1 contact is restored to its normally open condition and drops out TFL, which in turn causes FLA to pick up dropping out the FL relay. The re-energization of the FLA relay again causes the TFL relay to pick up and cause the FLA relay to drop out after the predetermined time interval. In that way, a fluctuating on-off action is produced in the FL relay, opening and closing contact FL2 and causing the hall call indicating lamp to flash. A similar flashing action for up preferred service demand indications is accomplished by the FLAU, TFLU, and FLU circuits (Fig. 2).

A contact segment 103 is electrically connected to the floor down preferred service call 9DW relay and other corresponding floor down preferred service call relays at the 2nd through 8th floors, inclusive, to permit a car to be stopped at the respective floors in response to the preferred service demand indications.

A car may be stopped in response to an up hall call registration at a floor by the operation of the up hall call UC relay (Fig. 1). Similarly, a car may be caused to stop in response to a down hall call registering at one of the floors by means of the down hall call DC relay.

When the car is traveling in the up direction, as evidenced by the closing of the contact UA1 and is not selected for up preferred service operation, as evidenced, the UC relay will pick up as a car approaches a floor at which an up hall call is registered when brush 105 makes contact with the contact segment 104 associated with the particular up hall call. This call pickup will occur when the car is in operation under the control of the dispatching and control system as evidenced by the contact SS3 being closed, the car is not set to travel in the down direction as evidenced by the contact SDA2 being in its normally closed condition, and the car is not selected for down preferred service operation, as evidenced by the contact LN1 being in its normally closed condition.

If a car is positioned at a floor when an up hall call is registered, the UC relay may be picked up by the brush 106, individual to the car, contacting the up hall call segment 104 at the particular floor. This will occur, as previously mentioned, if the car is operating under the control of the dispatching and control system as evidenced by the SS3 contact being closed, the car is not set to travel in the down direction as evidenced by the SDA2 contact being in its normally closed condition, the car is not selected for down preferred service operation as evidenced by the LN1 contact being in its normally closed condition, the car is not conditioned for movement as evidenced by the P1 contact being in its normally closed condition, the car is not at the top dispatching floor as evidenced by the PT1 contact being in its normally closed condition, and the starting S relay is not operated as evidenced by the S1 contact being in its normally closed condition. If the car is at the lower dispatching floor or at a floor beyond a lower dispatching floor such as the basement floor and the PB1 contact is open, the call can only be picked up if the car is at the basement floor as evidenced by the PBI1 contact being closed, or the car is selected as next up as evidenced by the NU1 contact being closed and the motor-generator sets of all of the cars operating in the system are shut down or have recently been shut down as evidenced by the FILB2 contact being closed. Also, up hall calls registered at the floors may be picked up if the car is moving in the down direction as evidenced by the DA3 contact being closed when the brush 107 contacts the hall call segment 104, if the SS3, SDA2, and LN1 contacts are closed, indicating that the car is operating under control of the dispatching and control system, is not set for travel in the down direction, and is not selected for down preferred service operation.

With regard to a car picking up down landing calls registered at a floor, the down hall call DC relay is energized under somewhat similar conditions to the above described UC relay. In particular, if the car is operating under the control of the dispatching and control system as evidenced by the SS4 contact being closed, and the car is not set for travel in the up direction as evidenced by the SUA1 contact being closed, and the car is not selected for preferred service operation as evidenced by the LNU3 contact being in its normally closed condition, the car may pick up a down hall call when its down advance brush 108 contacts the down hall call segment 102 at a given floor and the car is traveling in the down direction as evidenced by the DA4 contact being closed, and the car is either not selected for down preferred service operation as evidenced by the LN2 contact being closed, or the down preferred service demand is indicated at the particular floor evidenced by the LW1 contact being closed. Further, if the car is traveling in the up direction as evidenced by the UA2 contact being closed, the DC relay will pick up in response to a down hall call when the brush 109 contacts the segment 102 at the particular floor. Further, if the starting S relay is not operated as evidenced by the S2 contact being in its normally closed condition, the PB relay is not picked up as evidenced by the PB2 contact being in its normally closed condition, the car is not at the top terminal as evidenced by the PT2 contact being in its normally closed condition, or if the car is at the top terminal, the car is selected for next down evidenced by the ND1 contact being closed and all of the motor-generator sets for all of the cars operating in the system are shut down or have recently been shut down as evidenced by the FILB3 contact being in its normally closed condition, and movement of the car is not indicated as evidenced by the PT2 contact being in its normally closed condition, when the brush 110 contacts the down hall call segment 102 at the particular floor at which it is standing.

If a down preferred service demand is indicated at a particular floor, the corresponding contact segment 103 will be energized and the down preferred service call pick up LW relay of a car approaching the floor will be picked up, if the car is operating under the control of the dispatching and control system as evidenced by the SS2 contact being closed, the car is set for travel in the down direction as evidenced by the SDA1 contact being closed, the car is traveling in the down direction as evidenced by the DA2 contact being closed, and the car is not selected for up preferred service operation as evidenced by the LNU1 contact being in its normally closed condition.

The registration of up hall calls at the lower dispatching floor, i. e., first floor, is prevented, except when no car is selected for dispatching from the lower dispatching floor as evidenced by the NUM1 contact being closed in response to the energization of the next up signal indication NUM relay (Fig. 4) through the closed next up signal auxiliary NUA relay contacts NUA1 for each of the cars operating in the system; or when the motor-generator sets for all of the cars operating in the system are shut down or have recently been shut down as evidenced by the FILB1 contact being closed.

Reference has been made to an indication that the motor-generator sets of all of the cars operating in the system are shut down or have recently been shut down, as evidenced by the condition of contacts of the FILB relay. The master motor-generator shut down indication sequence FILB relay (Fig. 2) is energized whenever the motor-generator means for all of the cars in operation under the control of the dispatching and control system are shut down as evidenced by the FILA1 contact being in its normally closed condition. The FILA1 contact is controlled by the master motor-generator shutdown indication FILA relay which is energized through a parallel arrangement of contacts indicating whether each of the respective cars operable in the system are operating under the control of the dispatching and control system, as evidenced by the respective SS5 contacts being closed, and that the motor-generator sets of the respective cars are running in a proper manner as evidenced by the EM1 contacts of the exciter voltage and safety circuits EM relay being closed. When either one or both of those conditions for each of the cars operable under the control of the dispatching and control system are not met, the FILA relay is deenergized and the FILB relay is picked up. The FILB relay seals itself in through a normally open contact FILB4 in series with a normally closed contact FILT1, controlled by the timing for starting second car after all motor-generator sets are shut down FILT relay.

The FILT relay can be energized only when the FILB relay is energized and either the bottom terminal parking quota is not satisfied as evidenced by the YA1 contact being closed or no car operating under the control of the dispatching and control system is positioned at the top dispatching floor as evidenced by the PTM1 contact being in its normally closed condition when two or more cars are in operation under the control of the dispatching and control system as evidenced by the SSM1 contact being in its normally closed condition.

The PTM relay (Fig. 2) is picked up whenever the PT3 contact of one of the cars operating under the control of the dispatching and control system in its position at the top terminal floor.

The SSM relay (Fig. 6) is energized whenever a series combination of matrix contacts SS9, SS10, SS11, SS12, or SS3 for various cars operable under the control of the dispatching and control system are in a closed condition, thereby indicating that only one of the cars operable under the control of the dispatching and control system is in operation. If none of the cars operable in the system are in operation as evidenced by the respective independent service relay contact IND7 and the manual motor-generator switch indication relay contact MG3 being singly or both in an opened condition, the bus 600, 601 will be deenergized (see Fig. 27) and the SSM relay will have dropped out. An additional relay, the SSN relay is also responsive to the SS9, SS10, SS11, SS12, and SS13 contact matrix and is operable when energized to indicate that at least two of the cars operable in the system are not so conditioned. Thus, means is provided for indicating that only one car operable in the system is in operation under the control of the dispatching and control system (the SSM relay picked up), that two cars are in operation (the SSM relay being dropped out but the SSN relay being picked up), and that three or more cars are in operation (both the SSM and SSN relays are dropped out).

*Car call registering, pickup, and dumping*

Figure 11:
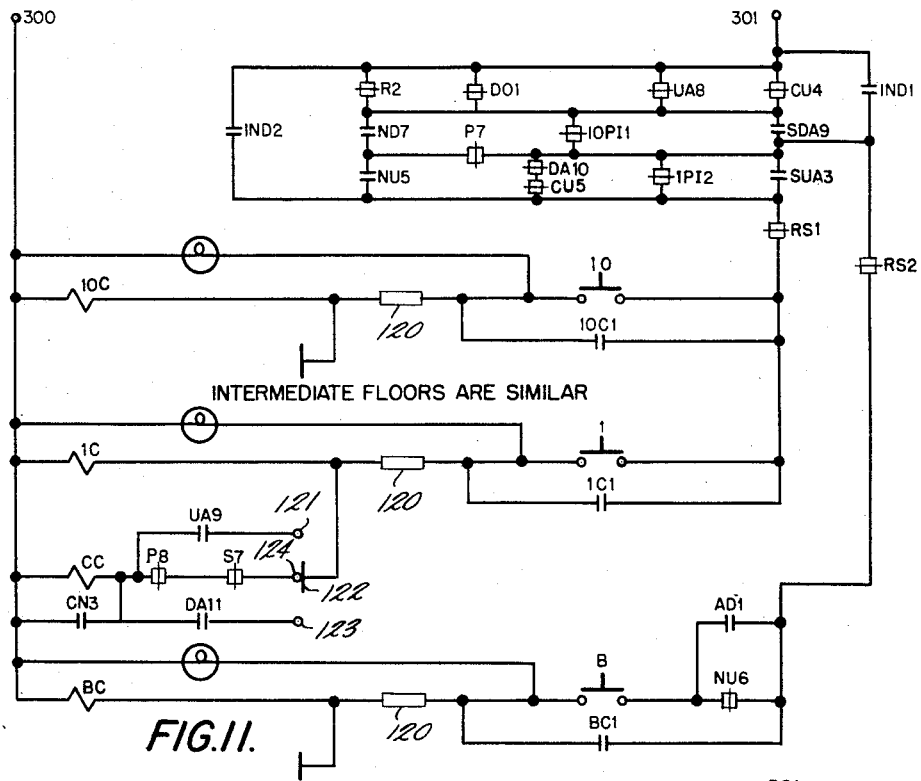
Fig. 11 is an electrical schematic diagram of car call registering and pick up circuits individual to the cars.

In the preferred embodiment of the invention as shown in Fig. 11, car call registering means are energized across the individual elevator signal supply bus 300, 301. Suitable registering means are provided in each of the cars and include means responsive to actuation by the passenger in the car such as a manually operable push button designated in accordance with the particular floor represented thereby. When the car call push button, for example, car call push bottom 1 is operated, an indicating lamp is illuminated and a particular floor car call relay, e. g., 1C, is energized through a current limiting resistor 120. When the floor car call relay 1C picks up, it seals itself in by closing a normally open contact 1C1 shunting the car call push button 1. If a car call is registered for a particular floor, and the car approaches that floor while traveling in the up direction, an advance car call pickup brush 121 contacts an energized floor segment 122 and the car call CC relay is picked up through the contact UA9.

If the car is traveling in the down direction when the down advance brush 123 contacts the floor segment 122, the CC relay is picked up through the DA11 contact. On the other hand, if the car is standing at a floor for which a car call is registered, the brush 124 will be in contact with the floor segment 122 and the car call CC relay will be energized through a closed contact P8, indicating no movement of the car, and the closed contact S7, indicating that the starting relay S is not picked up.

In the normal operation of the system, it is usually intended that demands for service registered in a car by the registration of a car call should be canceled or dumped when a car completes its travel in a given direction. Further, it is desirable that the registration of demands for service in a direction in which the car is not intended to travel be prevented. When the car is operating on independent service, the independent service switch is manually thrown to the on position (Fig. 20) and the independent service IND relay is energized across the individual elevator signal supply bus 300, 301. When the IND relay is picked up, the contacts IND1 and IND2 are closed permitting the registration of demands for service in the car operating under independent service. With regard to the registration of demands for service for the basement floor, the operation is facilitated by the fact that the NU6 contact will be in its normally closed condition, since a car cannot be selected for dispatching when it is operating independently of the dispatching and control system.

Figure 20:
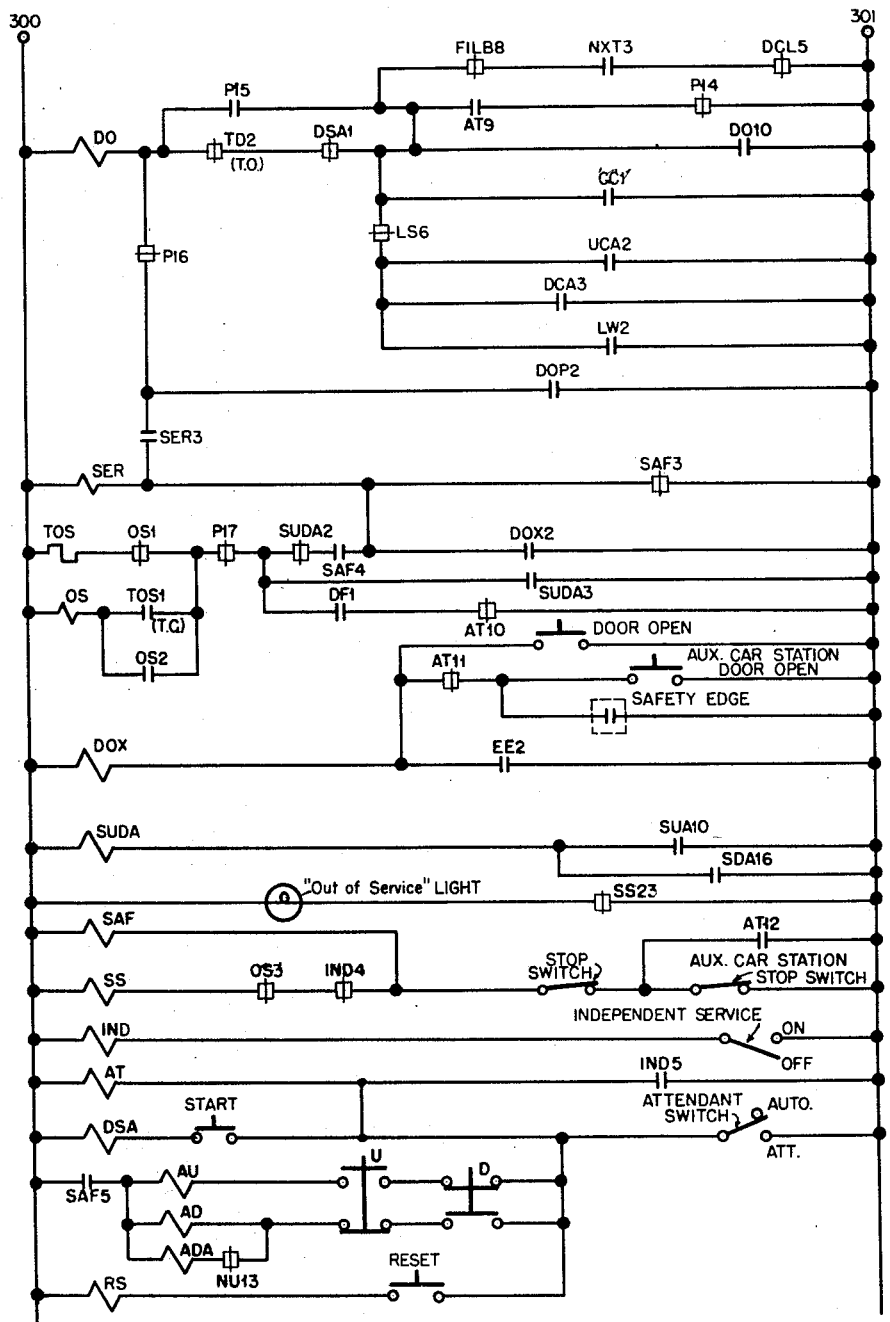
Figure 20A:
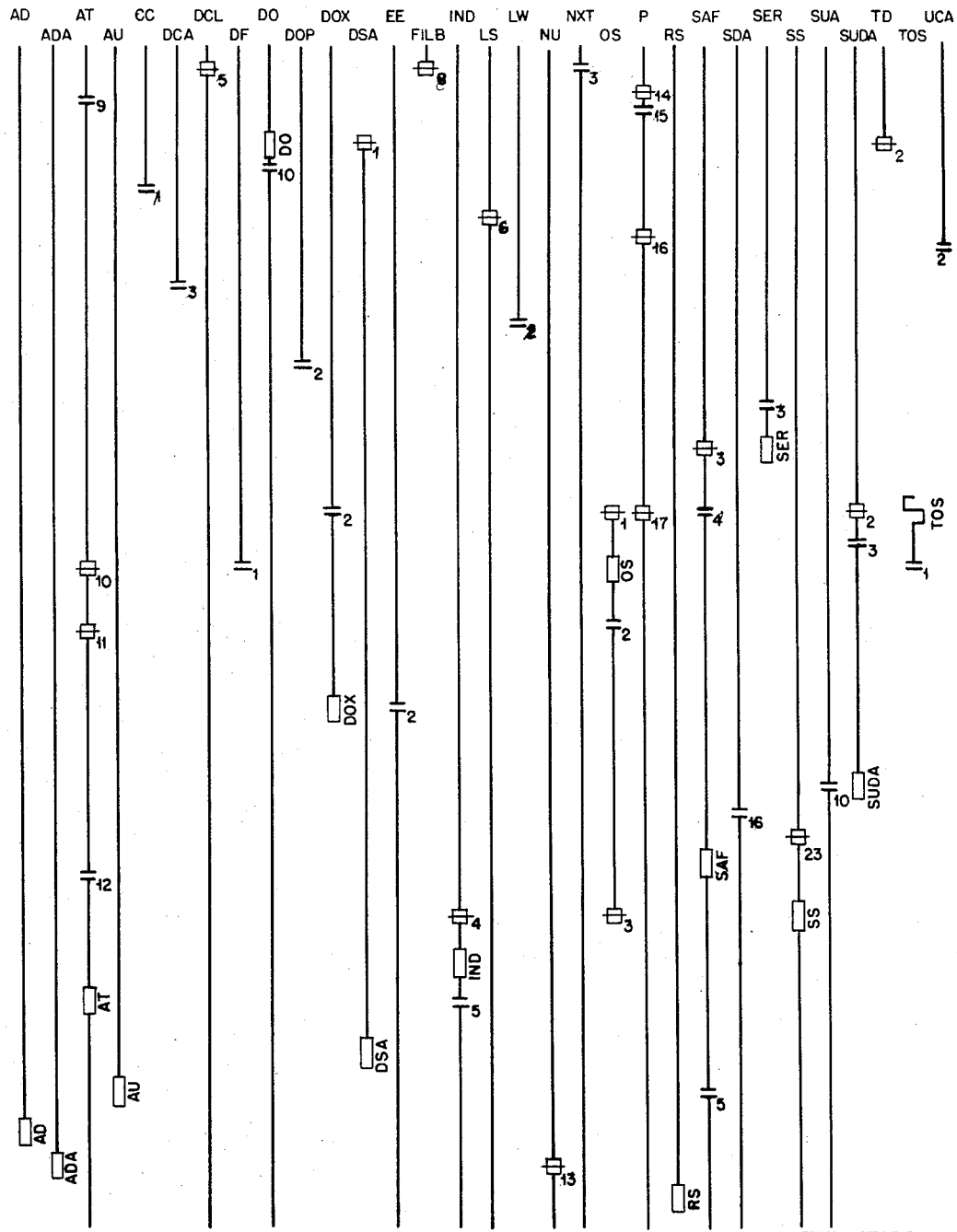

When a car is operating on attendant operation as evidenced by the energization of the attendant transfer AT relay through the attendant switch B in the attendant position, the car calls may be reset by the car call manual reset by attendant RS relay controlled manually by the reset button (Fig. 20).

When a car is operating without an attendant, it is desirable to remove as many controls as possible from the control of a passenger in the elevator. On the other hand, when a car is operating under the control of an attendant, it is desirable to make available to the attendant as large a variety of controls as might be necessary for the most efficient operation of the elevator. Therefore, the attendant transfer relay AT makes available a number of operating features not otherwise available. Since when a car is operating on attendant service, it is desirable to make available the same features, the attendant transfer AT relay is automatically picked up by closing the IND5 contact upon energization of the IND relay.

As an additional feature, when the car is being operated with an attendant and is selected for dispatching in the up direction from the lower dispatching floor, as evidenced by the NU6 contact being in an open condition, the car can be operated to the basement by the attendant. This can be accomplished by the attendant depressing the down D button (Fig. 20) energizing the attendant down direction AD relay, as long as the "stop-run" switch indication SAF relay is not dropped out permitting the SAF5 contact to be restored to its normally open condition. With the attendant down direction AD relay energized, a car call may be registered for the basement.

Figure 15:
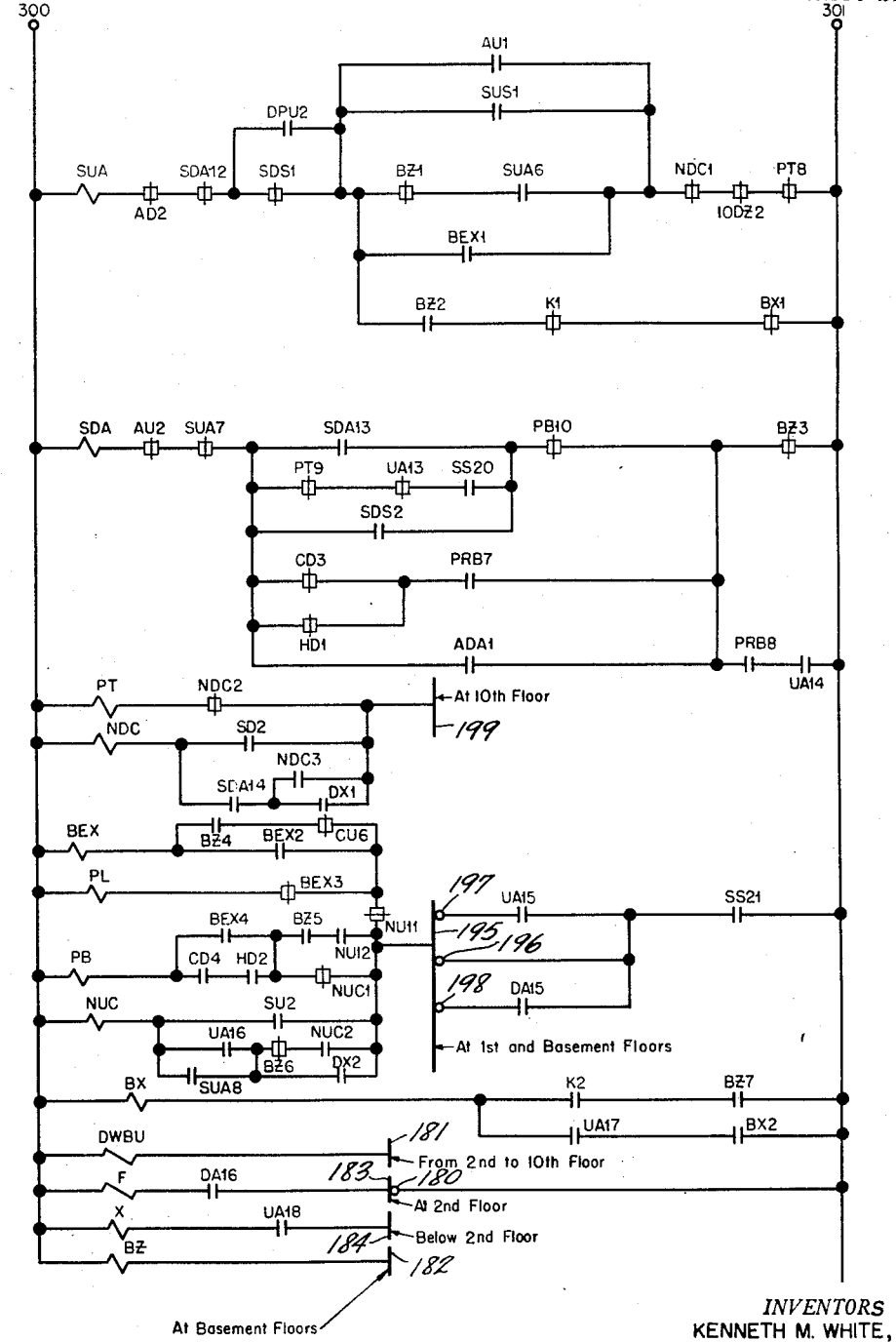
Figs. 15 and 17 are electrical schematic diagrams of directional control circuits individual to cars servicing floors beyond a dispatching floor.
Figure 15A:
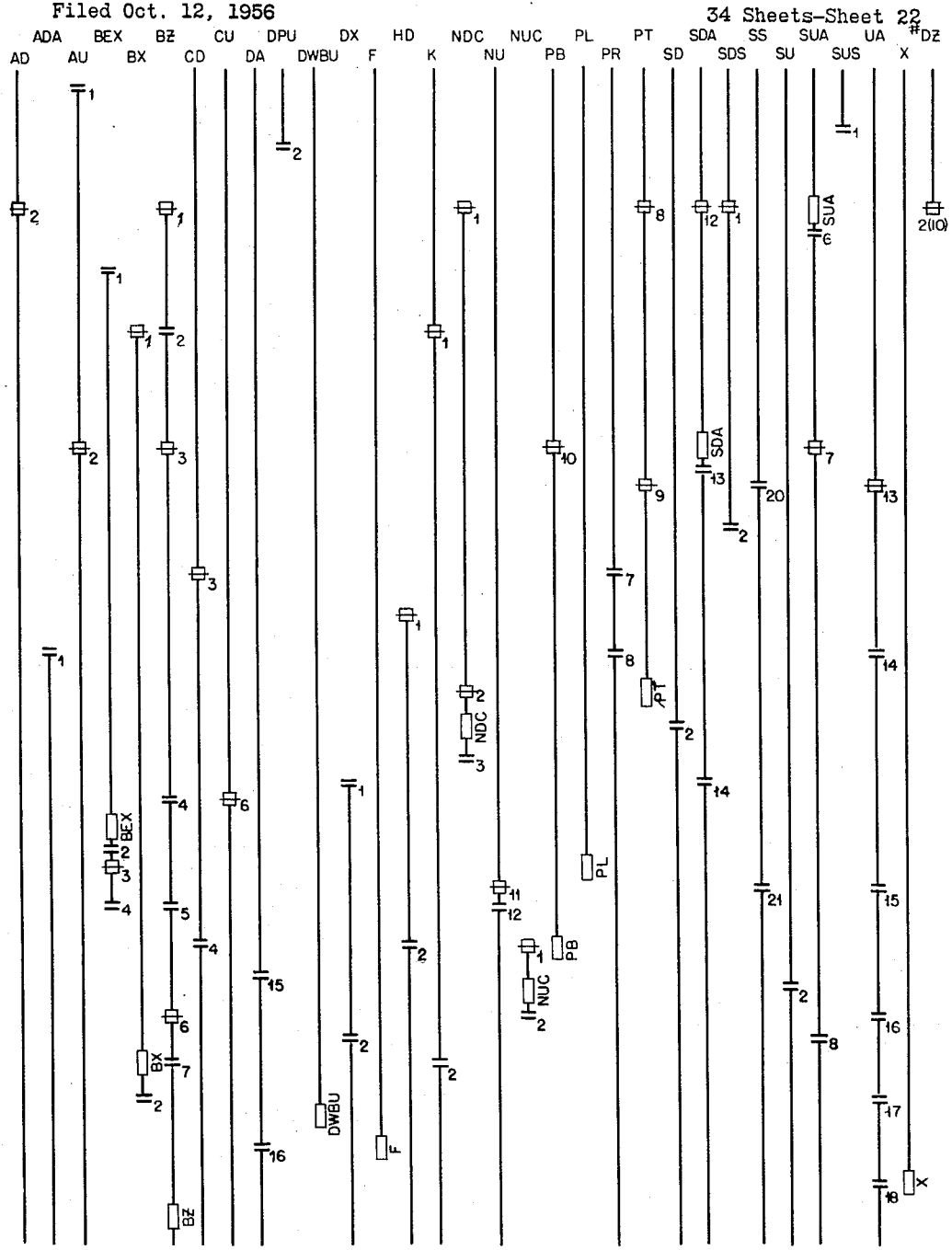

Further, on attendant operation, the car can be caused to travel in the up direction by the attendant pressing the up direction U button, thereby energizing the AU attendant up direction relay through the SAF5 contact. When the car on attendant operation is not selected as the next up car while it is positioned at the lower dispatching floor, as evidenced by the NU13 contact being in its normally closed condition, the car can be caused to travel in a down direction to the basement through energization of the attendant down direction ADA relay, which is adapted to pick up the signal for down direction SDA relay (Fig. 15) through its contact ADA1. Similarly, when the AU relay is picked up, it closes its contact AU1 energizing under suitable conditions the signal for up direction SUA relay (Fig. 15).

Figure 13:
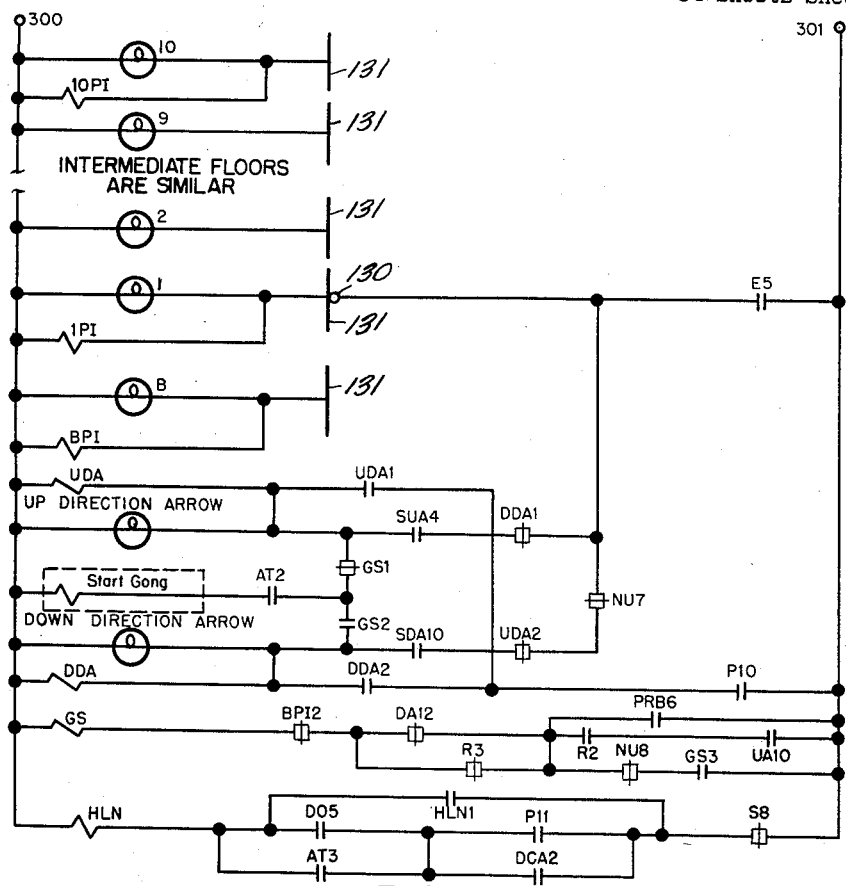

When a car is traveling in the up direction and approaches the upper dispatching floor, i. e. 10th floor, it is desirable to dump all car calls that have been previously registered. This dumping action is accomplished by virtue of the opening of the normally closed contact 10PI1, indicating that the car is approaching or at the 10th floor in response to the operation of the 10PI relay (Fig. 13). Since a car may be selected for dispatching in the down direction as it comes into the 10th floor, it is necessary to first dump the car calls previously registered and then to permit the registration of car calls by incoming passengers at the 10th floor. This is accomplished by a normally open contact in ND7, controlled by the next down signal ND relay, operated when the car is selected as the next car to be dispatched in the down direction, in series with a normally closed contact P7, which will be open while the car is still moving during the stopping and leveling action at the floor. The ND7 and T7 contacts shunt the 10PI1 contact, thereby enabling the energization of the car call registering means from the individual elevator signal supply bus 300, 301.

When the selected car is dispatched in the down direction, it loses its selection as next down car, dropping the ND relay and opening the contact ND7. Since the car is still at the 10th floor at least the brush 130 is still in contact with floor segment 131 energizing the 10PI relay, it is necessary to provide a seal for the car calls which have been registered by the incoming passengers. This is accomplished through the normally open contact SDA9, which is closed in response to the energization of the signal for down direction SDA relay setting the car for travel in the down direction as it is dispatched. In the preferred embodiment, car calls for all of the floors including the basement floor are dumped by the above-described action at the upper dispatching floor.

Similar dumping action is accomplished at the lower dispatching floor by virtue of the 1PI1 contact which will be open when the car is positioned at and approaching the first floor. Further, the NU5 normally open contact in series with a normally closed P7 contact prevents registration of car calls at the 1st floor for floors above the 1st floor until after the car has been selected for dispatching in the up direction. The control of the registration of car calls for the basement floor is independent of the NU5, P7, and 1PI1 contact, and is controlled by either the AD1 or NU6 contacts, in the manner previously described. The SUA3 contact, controlled by the signal for up direction SUA relay provides a sealing action in a manner similar to the SDA9 contact, permitting a car to maintain car call registration until after the car leaves the 1st floor traveling in the up direction.

With regard to 1st floor and basement car call registration, a special problem arises when a car is in the basement and is not selected as the next car to be dispatched from the lower dispatching floor. In that case, when the car returns from the basement to the 1st floor, its doors would not open since it was not selected as next up, as will be described in detail hereinafter. Therefore, it is essential to maintain the registration of a car call for the 1st floor in the car as it travels from the basement to the 1st floor. This would normally not be possible because of the action of the 1PI1 contact which would open as the car approached the 1st floor attempting to dump the car calls, if it was intended that the car should merely come to the 1st floor and park thereat, evidenced by the SUA relay dropping out and opening the SUA3 contact. The 1st floor car call registration is maintained under these circumstances by means of the normally closed CU5 contact which remains closed, when car calls are registered for floors above the car. In order to prevent the CU5 contact from disrupting the dumping and registration control feature at the 1st floor, which is necessary for cars approaching the 1st floor in the down direction and cars that are selected for dispatching in the up direction from the 1st floor, a DA10 normally closed contact is placed in series with the CU5 contact and is opened whenever the car is traveling in the down direction.

While the previous discussions relating to the dumping of car calls have been directed to a car completing its travel in one direction at a terminal or dispatching floor, provision is made for the dumping of car calls, when it is necessary for the car to reverse its direction of travel before arriving at a terminal or dispatching floor. This is accomplished by a parallel circuit including a CU4 normally closed contact which will be open when no car calls are registered for floors above the car; a normally closed UA8 contact which will be open when a car is traveling in the up direction; a normally closed DO1 contact which will be open as the car is brought to a stop at a floor and the signal is given for the doors to be opened; and a normally closed R2 contact which will be open when the car is moving between floors and leveling at a floor, but will be closed when a car is stopped at a floor or is re-leveling thereat. Therefore, when a car is traveling in the up direction with no car calls registered for floors above the car and the car is being brought to a stop at a floor and a signal is given for the doors to be open, all previously registered car calls including car calls registered for the basement are dumped.

Position indicating circuits

In order to control the operation of a bank of cars in a fully automatic manner, it is necessary to have adequate means for sensing at all times the position and direction of travel of each of the cars operating in the bank. Further, in the most efficient operation of an elevator car it is usually desirable to have a car travel toward floors at or for which demands for service are registered, except when the proper distribution of cars in the bank can be best accomplished by having the car operate between terminals.

In Fig. 13, a brush 130 is energized in a car in which the motor generator set is running and the exciter voltage relay E is picked up, as indicated by the contact E5. Lamps are provided which may be located in the respective cars and at an indicating panel at a lobby floor, when the energized brush 130 contacts a floor segment 131 corresponding to the position of the car in the hatchway. In addition to the indicating lamps for indicating the position of the cars, floor positions relays 1OPI, IPI and BPI are placed in parallel with their respective position indicating lamps and are picked up whenever the car is at, approaching, or leaving the corresponding floor. This indication is independent of the direction of travel of a car.

Figure 9:
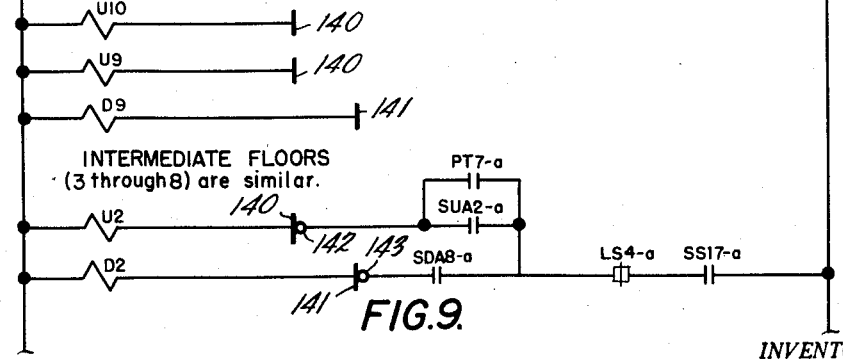
Figures 7A, 8A, 9A:
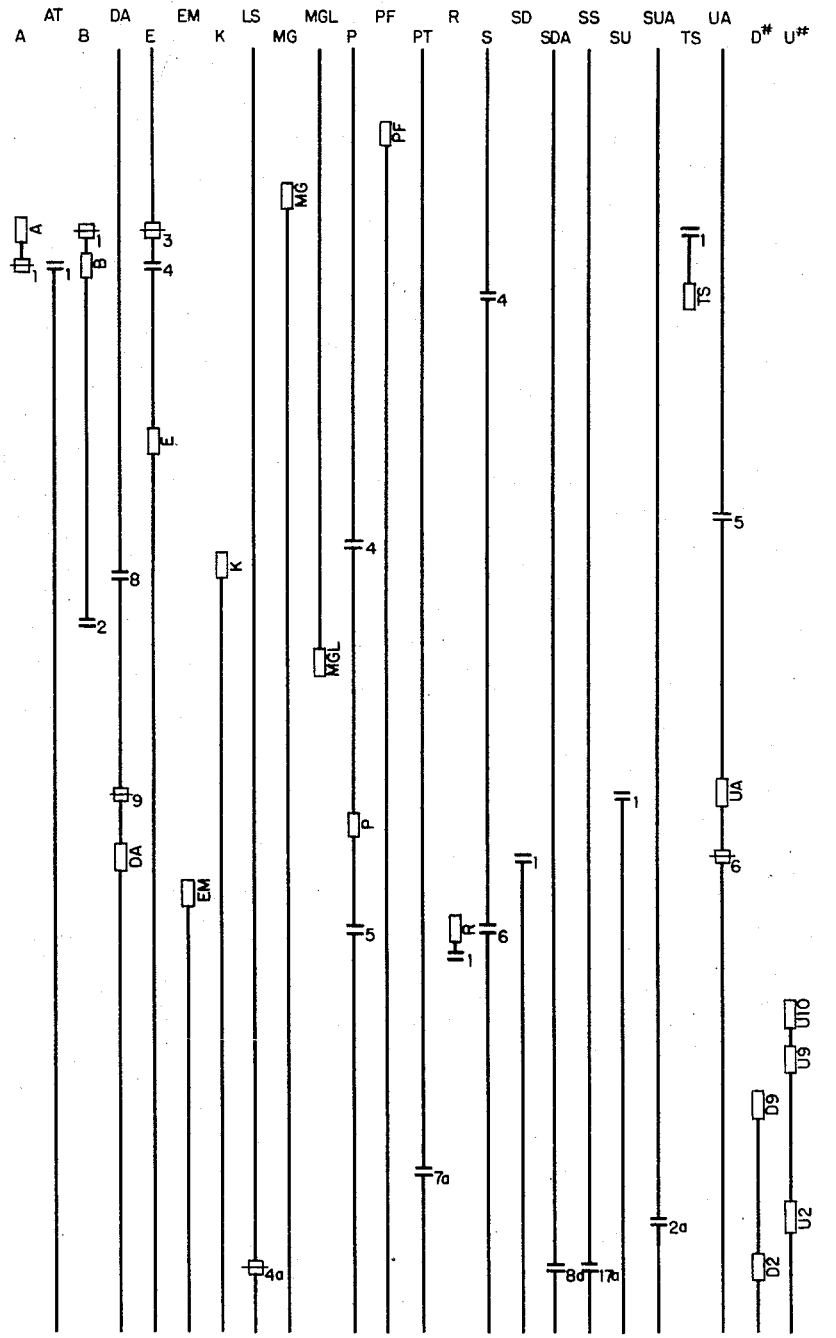

In Figure 9, up traveling car at (designated) floor D#— relays and U#— relays and down traveling car at (designated) floor D#— relays are connected to floor segments 140 and 141, respectively. Individual to each of the cars, an up direction brush 142 and a down direction brush 143 is provided. Thus a car which is operating under the control of the dispatching control systems, as evidenced by the SS17 contact respective thereto being in a closed condition, and not set to bypass a floor, as evidenced by the LS4 contact respective to the car being in its normally closed position, when set for travel in the down direction, as evidenced by the SD8 contact being closed will energize an appropriate floor directional and position indicating relay, e. g. D2. If the same car is set for travel in the up direction, as evidenced by the SUA2 contact being closed, or the car is at the top dispatching floor, as evidenced by the PT7 contact being closed, the appropriate up floor position and directional relay will be energized, e. g. U2.

In order to properly control the operation of the car doors, it is desirable to indicate the zone in which the doors may be operated. This may be accomplished by contacts 150 located respectively at each of the floors at which it is desired to open car doors. When the car is within the door zone at the first floor, a brush 151 contacts a floor segment 150 and energizes the first floor door zone 1DZ. Similarly when the car is at the 10th floor, the brush 151 contacts a floor segment 150 and energizes the 10th floor zone 10DZ relay. At intermediate floors and the basement floor, the brush 151 contacts a respective floor segment 150 to energize the door zone DZ relay. The DZ relay is also energized when the car is at the 1st or 10th floors by virtue of respective contacts 1DZ1 and 10DZ1.

Figure 21:
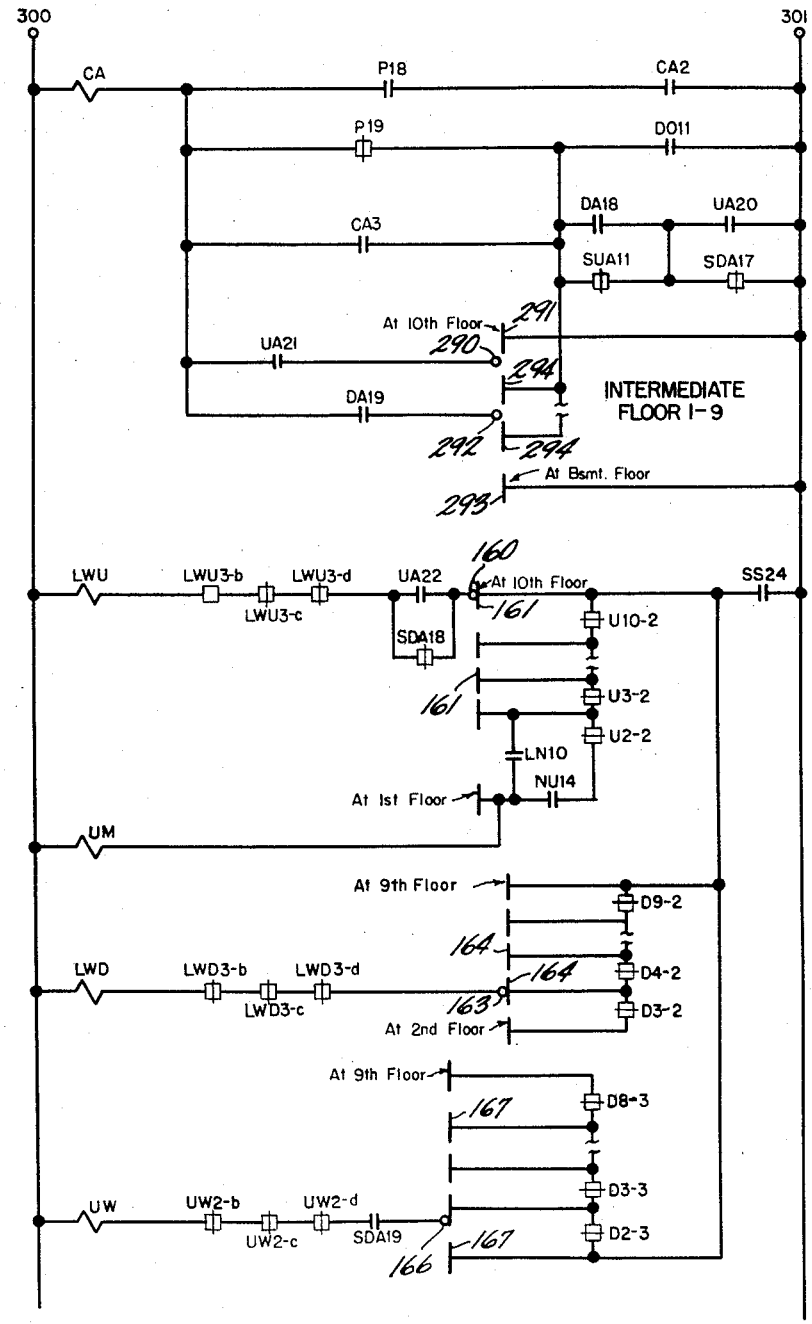
Figure 21A:
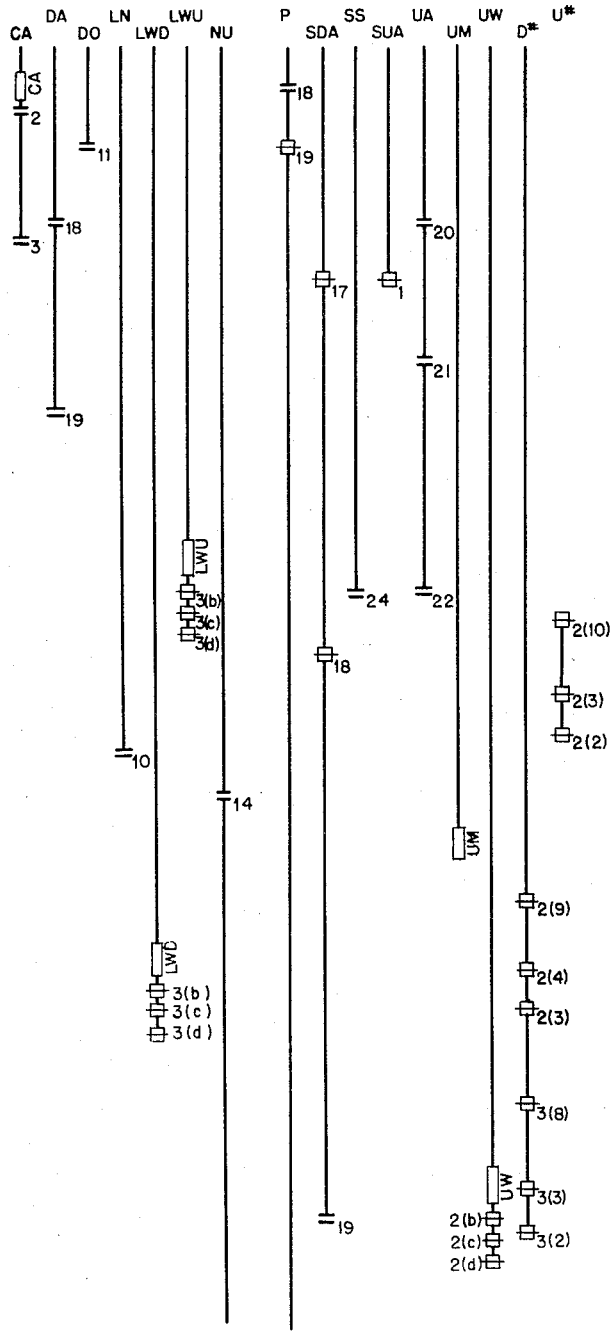

For the purposes of selecting a car for preferred service, it is necessary to determine the position of a car relative to the other cars operating in the bank and traveling in the same or desired direction. In Fig. 21, a determination is made of the highest up traveling car by means of the LWU relay individual to each of the cars which is energized through normally closed contacts associated with the LWU relays of the other cars operating in the bank, a UA22 normally open contact which is closed when the car is traveling in the up direction; or a SDA18 normally closed contact in shunt relation around the UA22 contact, which is closed when the car is not set for travel in the down direction and a brush 160 adapted to move in accordance with the position of the car in contact with floor segments 161 associated with the 1st through 10th floors of the installation. Up traveling car at (designated) floor U#— relays common to all of the cars in the bank control contacts U22 through U102, inclusive, positioned in circuit between each of the floor segments 161. Thus when a car is in operation under the control of the dispatching and control system, as evidenced by the contact SS24 being closed, it may be determined whether the car is positioned above all other cars in the system traveling in the up direction.

When the car is at the 1st floor, it may be selected as the highest up traveling car, if it is selected as the next up car, evidenced by the contact NU14 being closed, and no other cars are traveling in the up direction at any of the higher floors. Also, if the car is positioned at the first floor and is selected for down preferred service operation, as evidenced by the contact LN10 being closed, the car will be selected as the highest up traveling car, even though an up traveling car is positioned at the second floor.

A master up traveling car indication UM relay (Fig. 21) is operated whenever a car is selected for down preferred service and no up traveling cars are positioned between the second and tenth floors; or when the car is selected as the next up car and no cars are positioned at any other higher floors set for travel in the up direction.

The highest down traveling car is selected by a circuit including an LWD relay individual to each car which is energized through normally closed LWD3 contacts associated with the LWD relays of each of the other cars and a brush 163 adapted to contact floor segments 164 positioned at the 2nd to 9th floors. Relay contacts D32 through D92, inclusive, controlled by the common down directional position relays are positioned in circuit between each of the segments 164. Therefore when a car is under the control of the dispatching and control system, as evidenced by the contact SS24 being closed, and its LWD relay is picked up, it is designated as the highest down traveling car. That determination is independent of the actual direction of travel or the particular direction for which the car is set to travel.

The lowest down traveling car is determined by a UW relay (Fig. 21) individual to each car which is energized through a series arrangement of normally closed UW2 contacts associated with the UW relays of each of the other cars operating in the bank and an SDA19 normally open contact, which when closed indicates that the particular car is set for travel in the down direction, and a brush 166 adapted to contact segments 167 positioned at the 1st through 9th floors. The contact segments 167 are separated with normally closed contacts D23 through D83, respectively. When the particular car is operating under the control of the dispatching and control system, as evidenced by the contact SS24 being closed, the UW relay associated with the car will pick up when the car is traveling in the down direction and is below all other down traveling cars.

The determination of whether a down preferred service demand indication is operated at a floor between a car traveling in the up direction or stopped at a floor, is provided by the DWA relay (Fig. 3) individual to each of the cars and energized through a normally closed P3 contact individual to the car, indicating that the car is not conditioned for movement and is therefore assumed to be standing at a floor, and brush 170, and the contact segments 171 positioned at the 1st to 9th floors. The brush 170 is positioned at the floor at which the car is located. An advance brush 172 is positioned at the floor next above the car, and is connected to the DWA relay through a normally open UA3 relay contact individual to the car, indicating that the car is traveling in the up direction. In between each of the contact segments 171 are positioned DW6 contacts associated with the down preferred service demand indicating means at each of the floors. Intermediate the contact segments 171 at the ninth floor and the brush 601, is a normally closed contact 10DW6 or associated with the down preferred service demand indicating means at the 10th floor. When no down preferred service demand indicating means is operated at any floor above the car when it is traveling in the up direction or is stopped at a floor, the DWA relay is energized.

In order to properly select a car for down preferred service operation, it is necessary to be able to determine which car is in the best position to properly serve the preferred service demands. One important condition in selecting a car for down preferred service operation is to determine that the car is positioned above at least one floor at which a down preferred service demand is indicated. This is accomplished by a DWB relay individual to each of the cars operating in the bank and connected through a normally open DA7 contact, which indicates that the car is traveling in the down direction when closed, or a normally opened SDA5 contact, which indicates that the car is set to travel in the down direction, and floor segments 175 positioned at each of the 1st through 9th floors inclusive.

In circuit between each of the floor segments 175 is positioned a DW5 contact which is normally closed indicating that a down preferred service demand is not indicated at the particular floor. For example, a 9DW5 contact associated with the down preferred service demand indicating means at the 9th floor is positioned between the floor contact segment 175 at the 10th floor and the floor contact segment 175 at the 9th floor. A brush 176 movable in accordance with the position of the car is adapted to pass over and contact the floor segments 175 and is connected through either a normally open LWD2 contact, which when closed indicates that the car is selected as the highest down traveling car, or the normally open LN7 contact, which when closed indicates that the car is selected for down preferred service, to the bus 601. Thus when a car is either selected for down preferred service operation or is the highest down traveling car, and the car is either set to travel in the down direction or is traveling in the down direction the respective DWB relay will be picked up when no down preferred service demands are indicated below the car.

Since it is necessary that the floor contacting segments 175 for each of the cars be electrically separated from each other and that they be spaced apart at a distance greater than the space of the brush 176, so that proper effect may be given to the condition of the DW5 contact in circuit between the adjacent floor contact segments 175, the problem arises that when the brush 176 passes from one floor contacting segment 175 to the next floor contacting segment 175 the DWB relay would drop out. When the DWB relay is dropped out, it is intended to indicate that a down preferred service demand is indicated below the car. As will be discussed hereinafter, this condition may be sufficient to select a car for down preferred service.

Therefore, when a car is traveling in the down direction and no down preferred demand indications are operated below the car, it is desirable to maintain the DWB relay continuously picked up. This is accomplished by a DWBS relay also individual to each of the cars, which is connected to a normally open DA6 contact and a normally closed SDAM2 contact to contact segments 177. The contact segments 177, therefore, will be energized from the bus 690 whenever the car is traveling in the down direction, as evidenced by the DA6 contact being closed, and when all of the cars operating in the system are set for travel in the down direction, as evidenced by the SDAM2 contact being in its normally closed condition. Accordingly, when a down traveling car which is either the highest down traveling car or a car selected for down preferred service operation causes its respective brush to pass from a contact segment 175 to the next contact segment 175 it passes over and contacts the intervening contact segment 177 picking up the DWBS relay and closing the DWBS1 contact which is in series with contact in a holding circuit for the DWB2 relay. Thus the DWB relay will remain picked up, and a false indication to the down preferred service selecting circuits is prevented.

Figure 6:
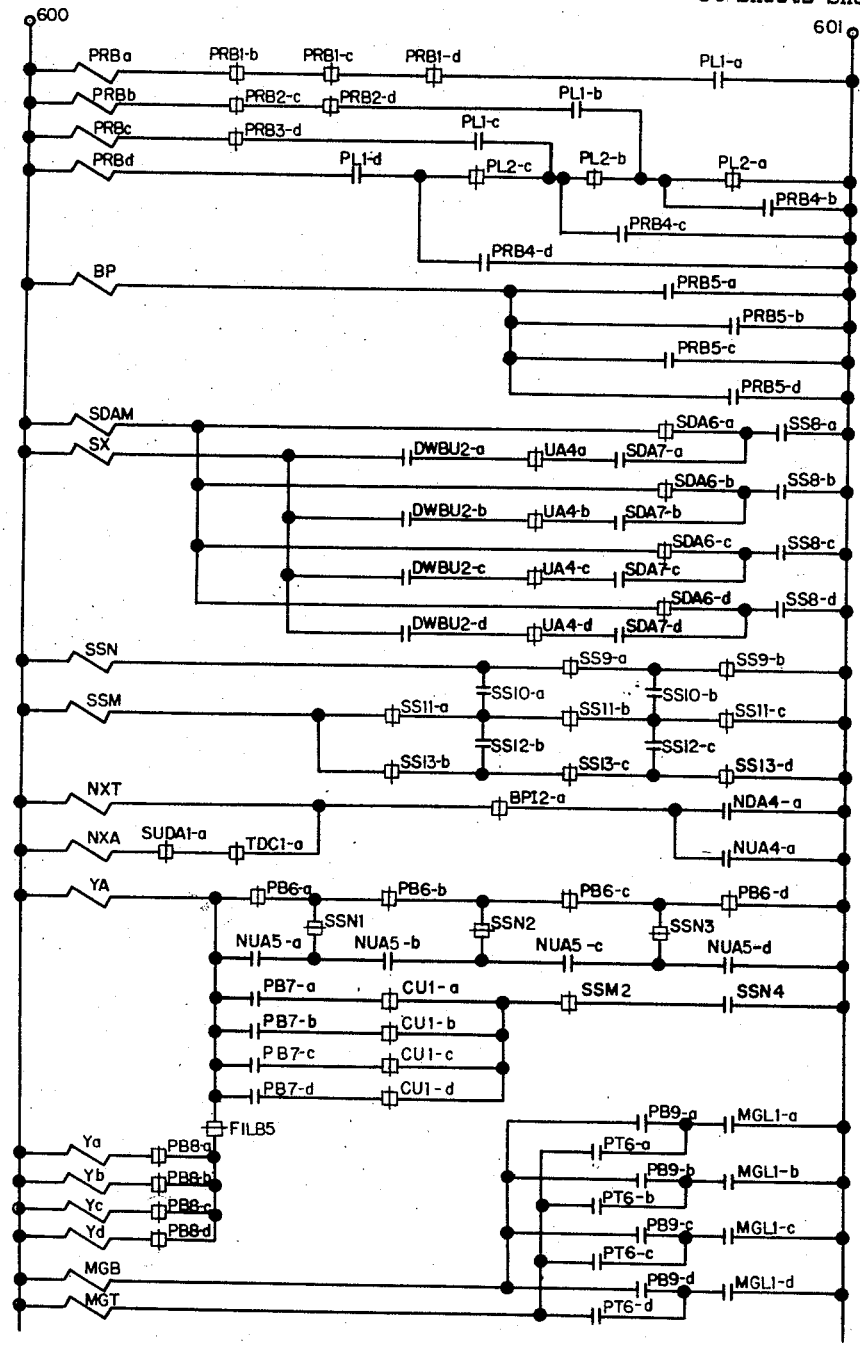
Fig. 6 is an electrical schematic diagram of a number of additional selecting and sensing circuits common to the cars operating in the bank.
Figure 6A:
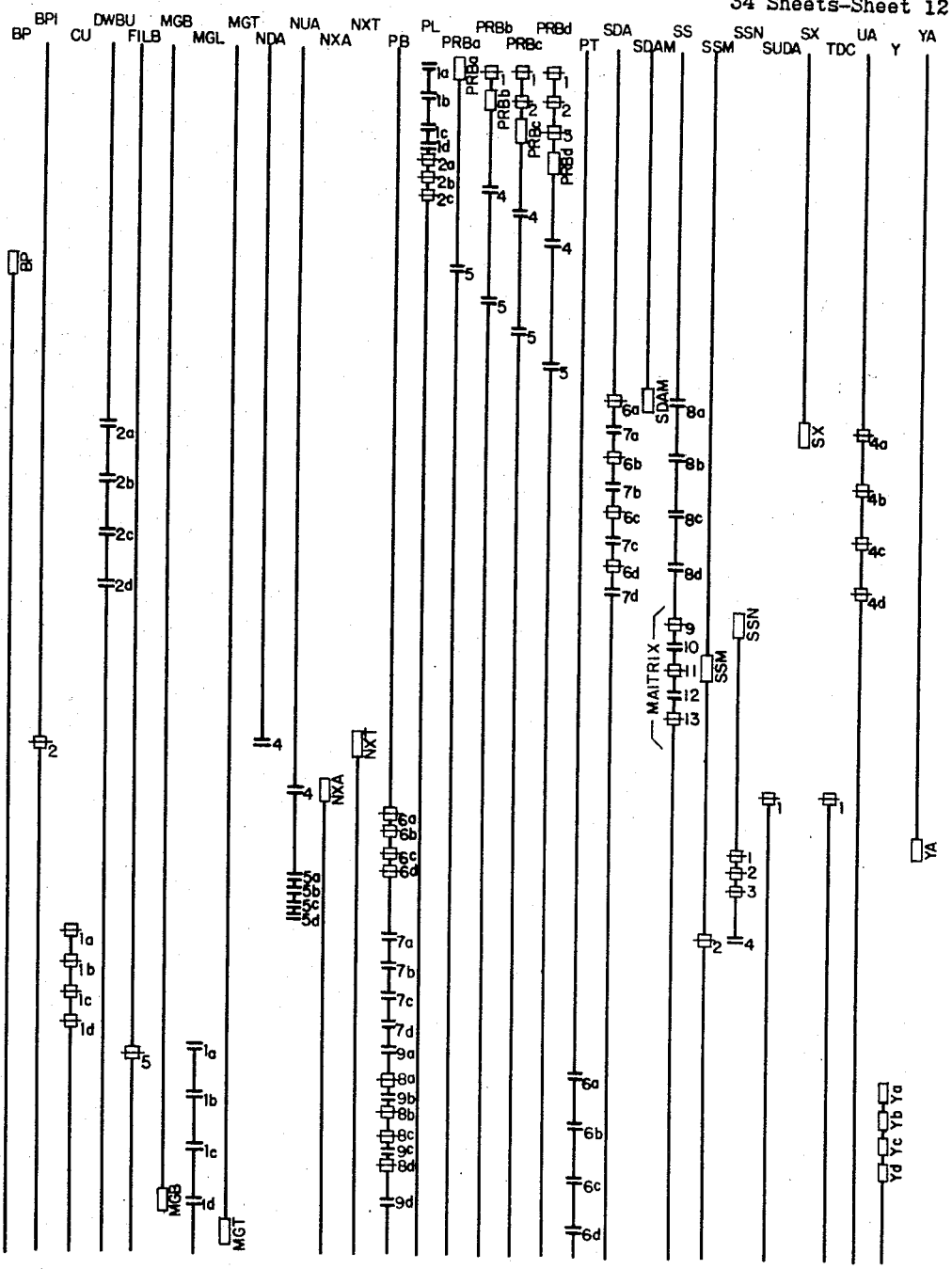

Reference has been had to the SDAM and SX relays for indicating relative operating conditions of all of the cars operating in the bank. In Fig. 6, it is seen that the all "in service" cars with signal for down direction SDAM relay is picked up whenever a car operating under the control of a dispatching and control system, as evidenced by its respective SS8 contact being closed, is not set for down direction travel, as evidenced by the respective SDA6 contact being in its normally closed condition. On the other hand, when all of the cars operating in the bank are set for travel in the down direction, the SDAM relay will drop out.

The no down car above up preferred service demand indication SX relay (Fig. 6) will be energized whenever one of the cars operating in the system is positioned above the 2nd floor, as evidenced by the respective DWBU2 contact being closed in response to the DWBU relay (Fig. 15) being energized by the brush 180 contacting the floor segment 181 extending from a position corresponding to a point above the 2nd floor to the 10th floor; is not traveling in the up direction, as evidenced by the respective UA4 contact being in its normally closed position, and is set for travel in the down direction, as evidenced by the respective SDA7 contact being closed. On the other hand, if no car is positioned above the 2nd floor, as evidenced by its respective DWBU2 contact being open, or if positioned above the 2nd floor is traveling in the up direction or at least is not set for travel in the down direction, the SX relay will be dropped out, thereby indicating that no car is positioned above the 2nd floor which is set to travel in the down direction.

Figure 22:
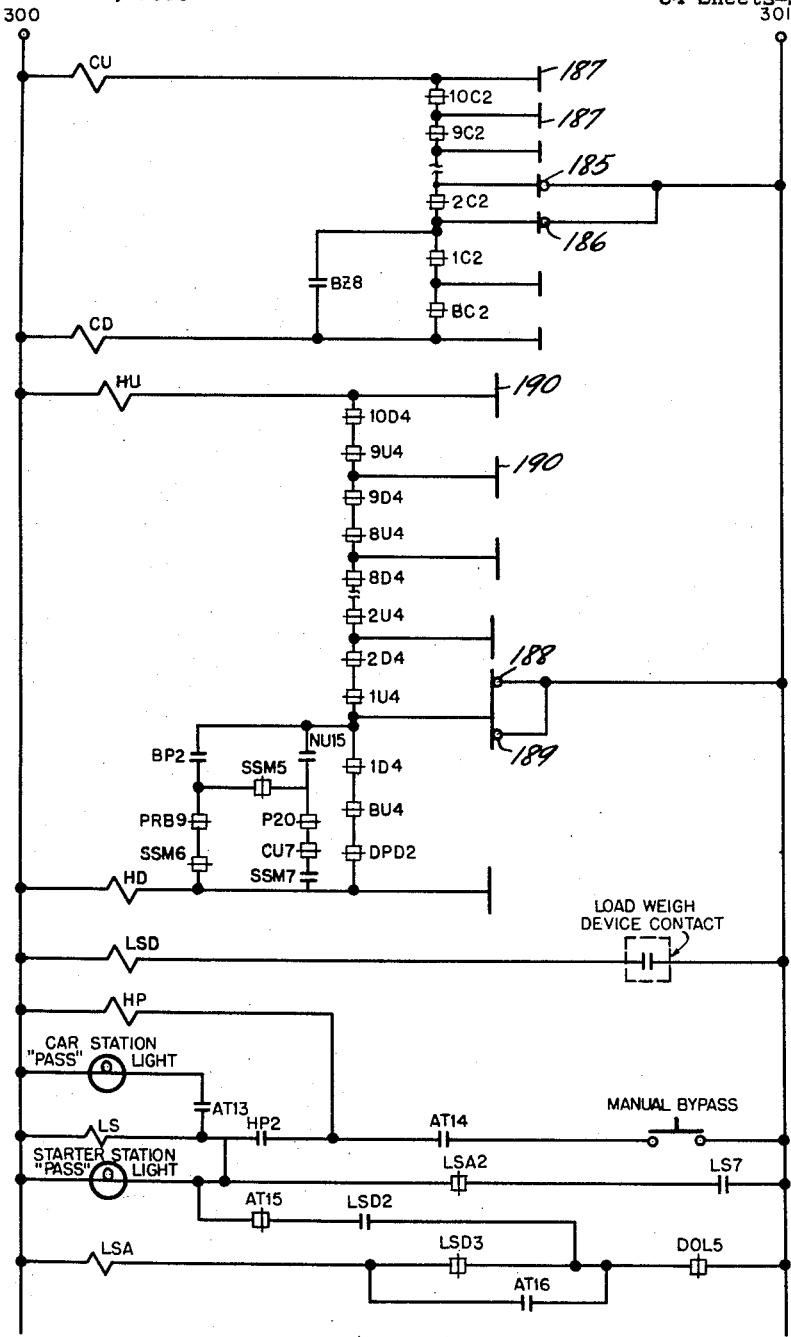
Figure 22A:
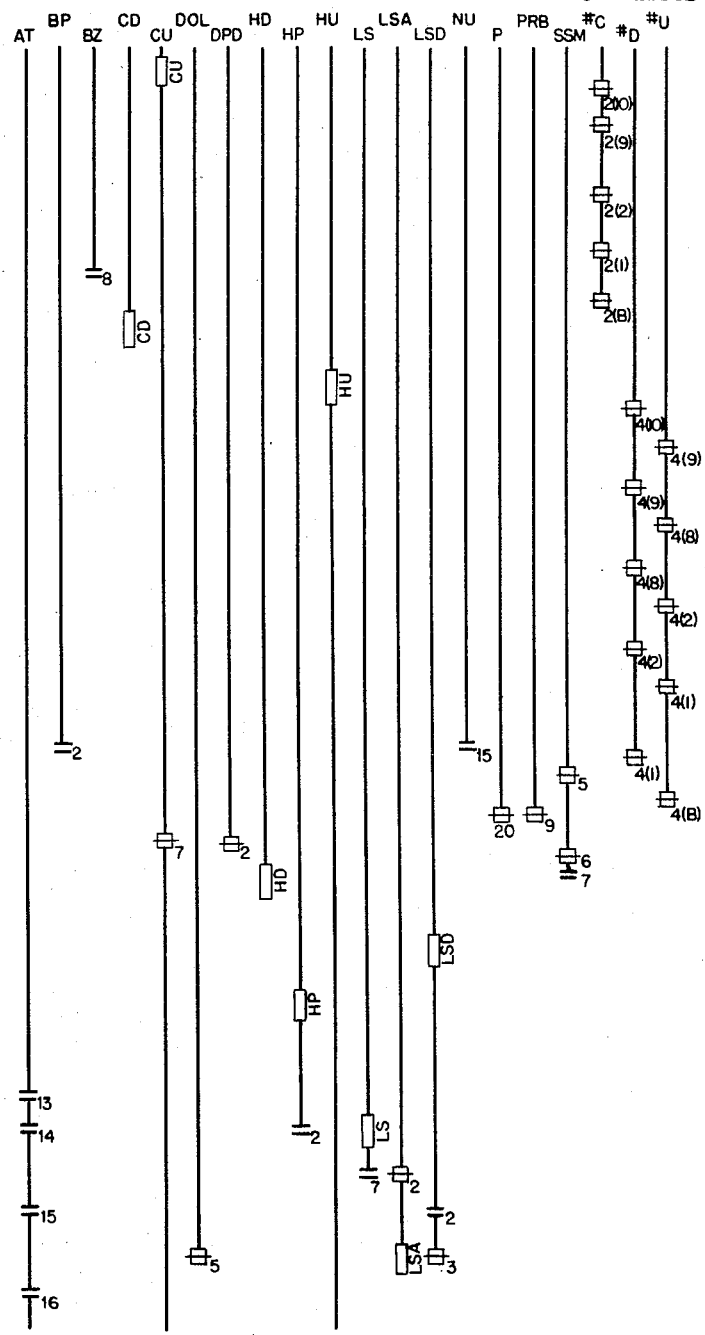

It is also necessary to determine whether car or hall calls are registered above or below a car in order to determine what particular operation should be made by the car. In Fig. 22, the relative position of a car with respect to registered car calls is indicated by the operation of the car call above CU relay and the car call below car CD relay. Brushes 185 and 186 move in accordance with the movement of the respective car and are adapted to contact individual floor contact segments 187. Normally closed C2 contacts, evidencing whether a car call has been registered in the car for a particular floor, are positioned between respective floor contact segments 187. Therefore, when no car calls are registered above the car, the CU relay is energized through the normally closed C2 contacts, the appropriate floor contact segments 187 and either the brush 185 or 186 to the bus 301. Similarly, if there are no car calls registered for floors below the car, the CD relay is energized. On the other hand, when a car call is registered either above or below the car, the appropriate CU or CD relay drops out.

The registration of hall calls above and below the car is indicated by a similar circuit controlling the operation of the hall call above HU relay and the hall call below HD relay. The position of the car is indicated by brushes 188 and 189 adapted to contact floor contact segments 190. Appropriate D4 and U4 normally closed contacts are positioned between respective floor contact segments.

*Selection of cars for dispatching from a dispatching floor*

Figure 16:
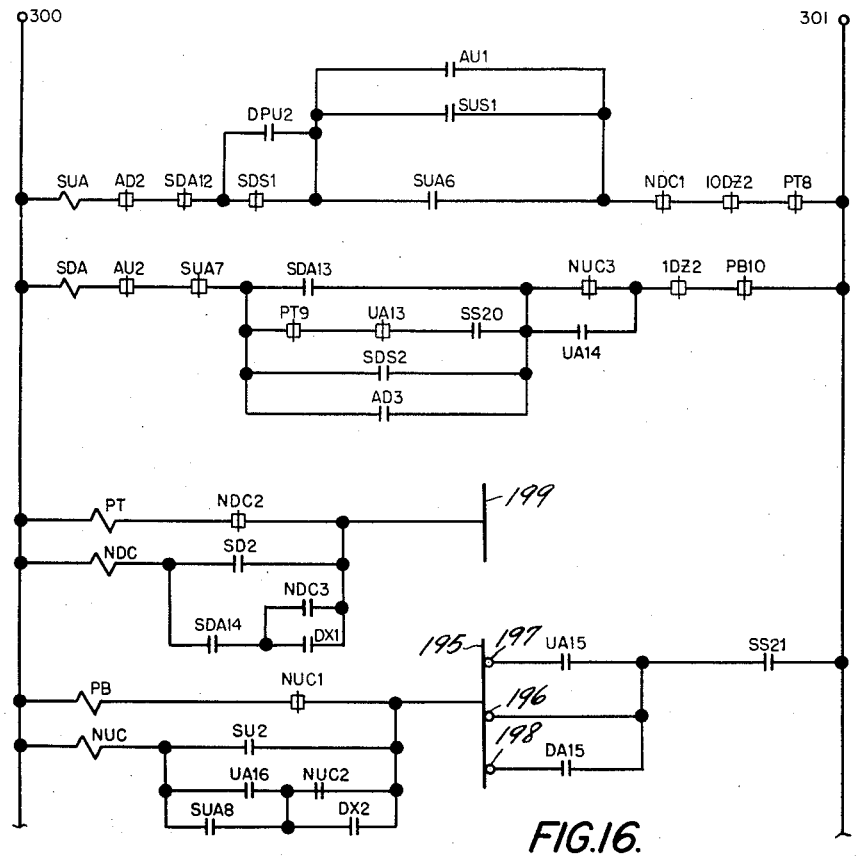
Fig. 16 is an electrical schematic diagram of an alternate embodiment of portions of Fig. 15 suitable for cars not serving a floor beyond a dispatching floor.

The selection of a car for dispatching from a dispatching floor is made when the car is at or approaches the particular terminal dispatching floor. Accordingly, circuits are provided to determine the presence and availability of a car for selection for dispatching from a terminal dispatching floor. In Fig. 16, circuits are disclosed for indicating the presence or absence of an available car at a dispatching floor, when a car operates operates only between the upper and lower dispatching floors and does not operate to a basement floor. A floor contact segment 195 extends through a zone corresponding to the first floor and is adapted to be contacted by brush 196 movable in accordance with the position of the car energized through normally open contact SS21, which when closed indicates that the car is operating under the control of the dispatching and control system. An advance up direction brush 197 is also provided which is energized through a normally open contact UA15, which is closed when the car is traveling in the up direction. An advance down direction brush 198 is positioned through a normally open contact DA15, which is closed when the car is traveling in the down direction. The brushes 196, 197 and 198 are adapted to contact the floor contact segments 195 when the car is located at the first floor.

When the car is at the first floor, the in service at bottom terminal PB relay will be picked through a normally closed NUC1 contact, which is controlled by the next up signal cancelling NUC relay. The NUC relay is picked up whenever a car positioned at the first floor is started in the up direction through the operation of its starting-up direction SU relay, which closes the SU2 contact. The NUC relay seals itself in by means of a normally open NUC2 contact in series with an SUA8 normally open contact, which is closed when the signal for up direction SUA relay is picked up.

If a car is going to reverse at the 2nd floor, the SU and SUA relays will drop out before the brush 196 leaves segment 195 and the PB relay would be reenergized. In order to prevent that operation, the UA16 normally open contact is shunted across the SUA8 contact so that the NUC relay will remain picked up as long as the car is traveling in the up direction.

A similar circuit is provided at the top terminal upper dispatching floor, in which the in service at top terminal PT relay is energized through a normally closed NDC2 and a floor contact segment 199 positioned corresponding to the location of the 10th floor and adapted to be contacted by the brushes 196 and 197. When the car starts in the down direction, as evidenced by the SD2 normally open contact closing, the next down signal cancelling NDC relay picks up dropping out the PT relay by opening the contact NDC2. The NDC relay seals itself in through a normally open NDC contact which is in series with the SDA14 normally closed contact, which is closed when the car is set to travel in the down direction.

In Fig. 15, the circuits shown are for a car adapted to travel beyond the first floor to the basement floor. The circuits at the top terminal are the same as in Fig. 16. However, since the car may travel to the basement floor below the first floor, the floor contacting segment 195 extends to a position corresponding to the basement floor as well as the first floor. The next up signal cancelling relay NUC operates in the same manner as in Fig. 16 to drop out the PB relay when the car starts in the up direction. However, if a car is at the basement floor, as indicated by the basement zone BZ relay being picked up when the brush 180 (Fig. 15) contacts floor segment 182 located in a position corresponding to the basement floor. The BZ relay opens the normally closed contact BZ6 preventing the sealing action by the NUC2.

Additional positional indicating circuits are provided as shown in Fig. 15 by the slow-down for 2nd floor F relay which is picked up when its respective car is traveling in the down direction as evidenced by the DA16 contact being closed when the brush 180 contacts floor segment 183 positioned at a point corresponding to a location in the slow-down zone at the 2nd floor for cars traveling in the down direction.

The up preferred service call registration X relay (Fig. 15) is connected through a normally open UA18 contact, which indicates that a car is traveling in the up direction when it is closed, to a floor contact segment 184 located just below a position corresponding to the second floor.

Figure 4:
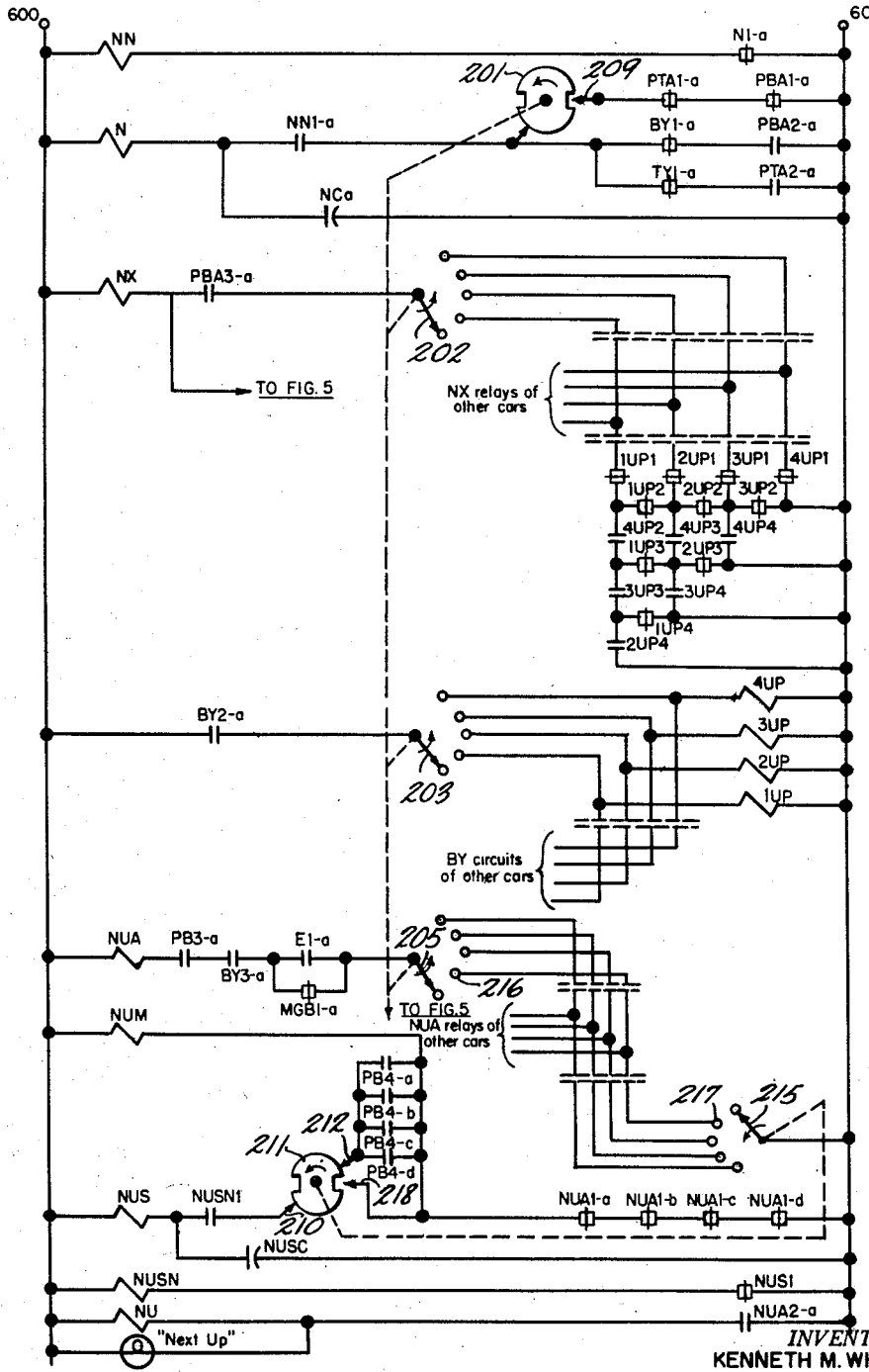
Figs. 4 and 5 are electrical schematic diagrams of an exemplary embodiment of selecting circuits for selecting a car to be dispatched from a dispatching floor on a non-rotational basis in accordance with the invention.
Figure 4A:
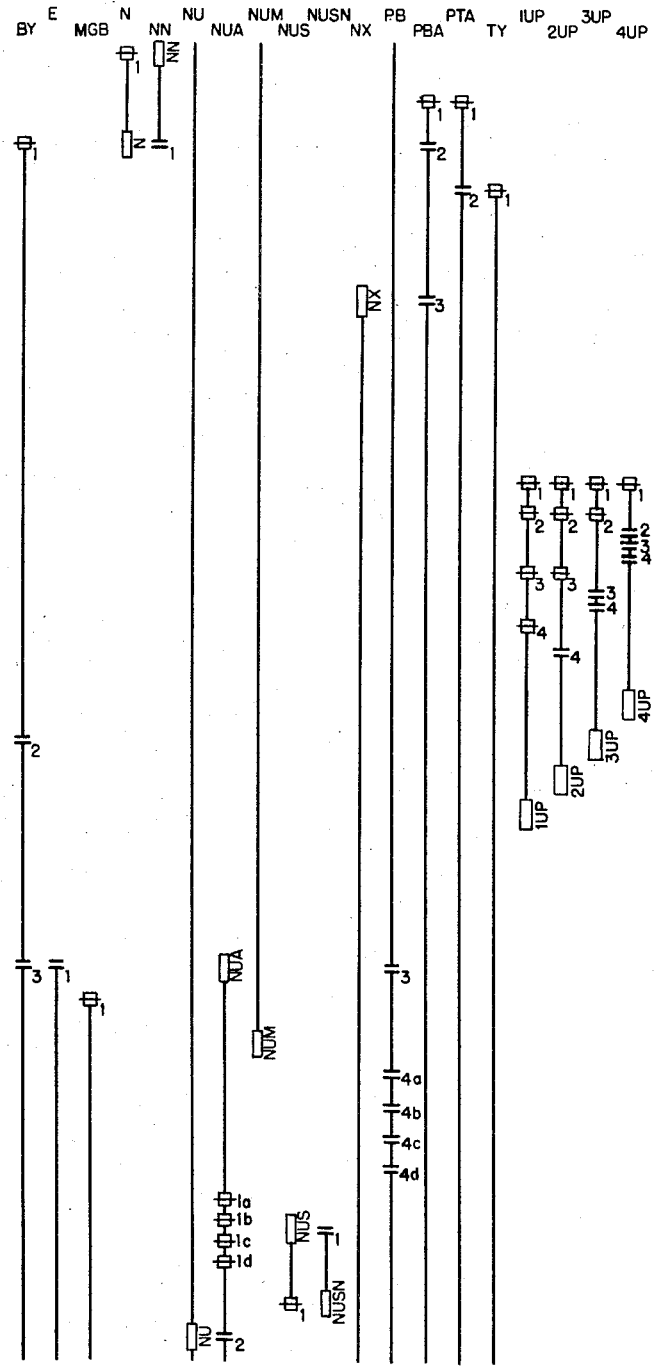
Figure 5:
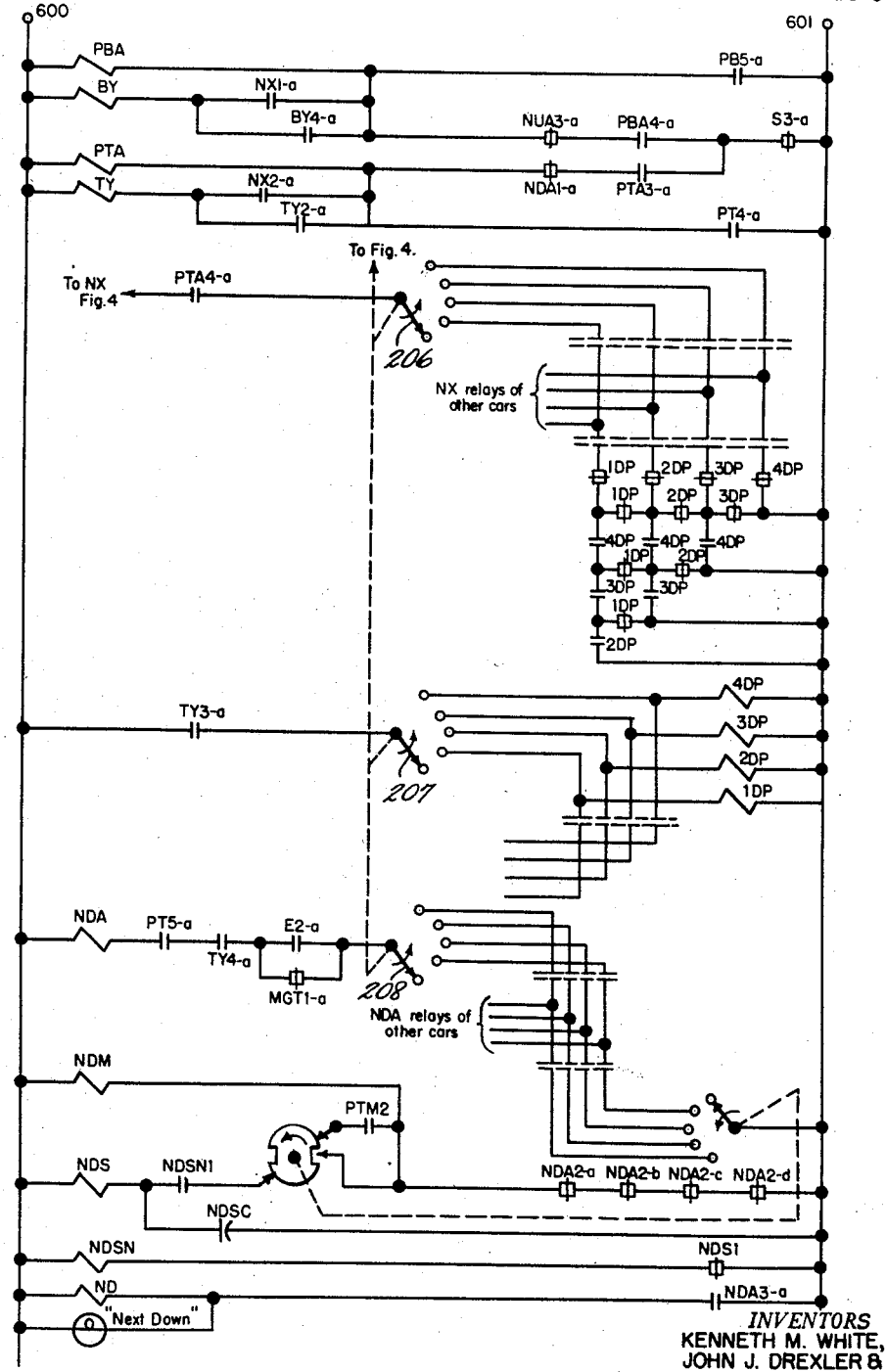
Figure 5A:
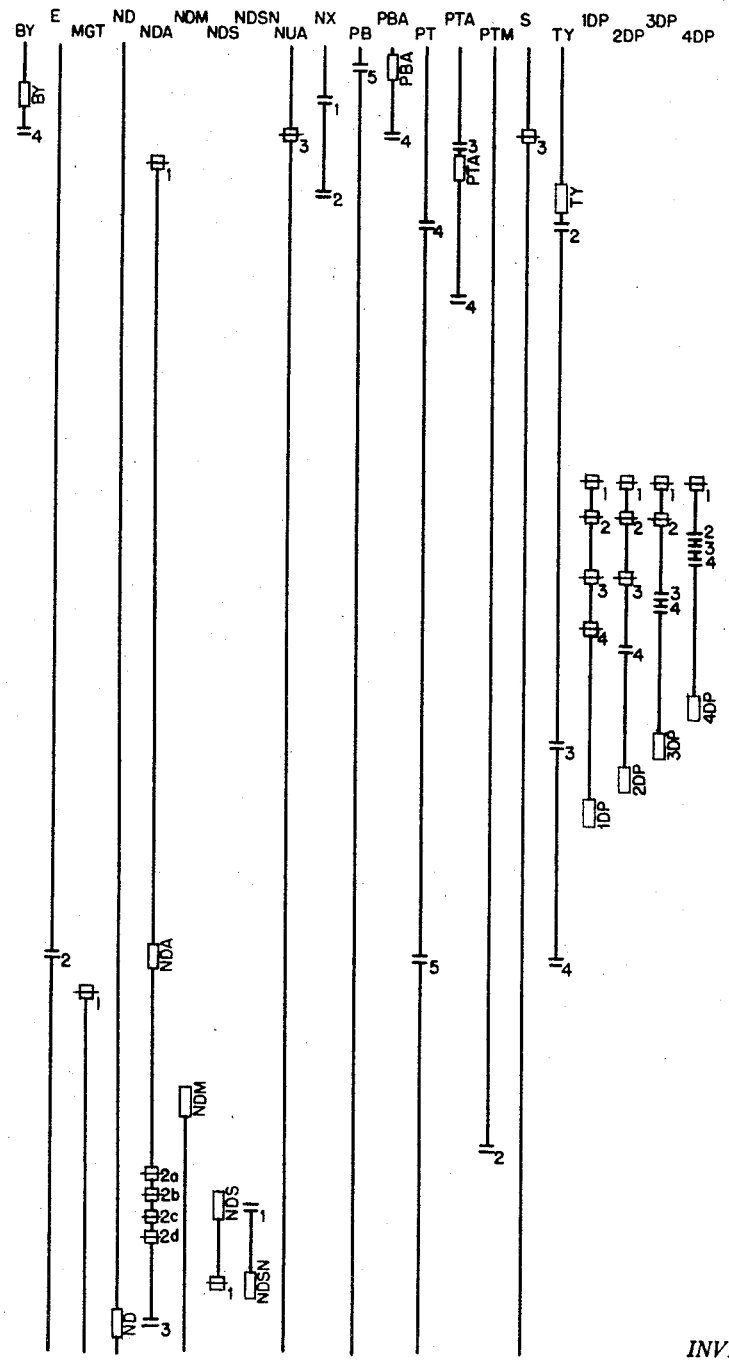

In Figs. 4 and 5, exemplary circuits are disclosed for selecting a car at a dispatching floor for dispatching from the dispatching floor in the order of arrival of the car at the dispatching floor relative to all other cars at the dispatching floor. While the preferred embodiment selects cars in a strict non-rotational or non-sequential manner, it is intended that other modes of selecting may be utilized in accordance with the principles of the invention, for example, selecting the first car to arrive at a dispatching floor for dispatching when one or two cars are positioned at the displatching floor, but when two or more cars in addition to a car selected by the selecting means are positioned at the dispatching floor, the mode of selection of the next following car to be dispatched may be made in any numerical or preferred sequence order.

When a car arrives at the lower dispatching floor or is at the basement floor, if the car is adapted to travel to the basement floor, the respective PB relay will be picked up if the car is available to be dispatched from the lower dispatching floor and contact PB5 (Fig. 5) will be closed energizing the in service at the bottom terminal and motor generator sequence PBA relay across common signal supply bus 600, 601. The PBA relay seals itself in by closing the normally open PBA4 contact. The holding circuit is maintained until the car is selected as the next car to be dispatched as evidenced by the normally closed NUA3 contact opening, or the starting relay for the car picks up, as evidenced by the normally closed contact S3 opening.

In Fig. 4, it is seen that the sequence of the arrival interrupter NN relay individual to the car is energized across the common signal bus 600, 601 through a normally closed N1 contact, controlled by the sequence of arrival N relay. When the car, and in the following discussion it will be assumed that the car is car a, arrives at the bottom terminal and the PBA relay is picked up, normally open contact PBA2 closes and the sequence of arrival N relay is picked up through the NN1 contact which is closed by the NN relay, a normally closed BY1 contact and the now closed PBA2 contact. When the energization circuit for the N relay is completed, a rotating selecting means having a plurality of levels is energized and a control wafer 201 controlled by the selecting means starts to rotate along with a corresponding rotation of selector contact arms 202, 203 and 205, associated with the up dispatching circuits, and 206, 207 and 208, which are associated with the down dispatching selection circuits, and control the operation of different levels of the rotary selector switch means.

The rotating selecting means operates in the manner of a stepping switch in that when the N relay picks up, contact N1 opens dropping the NN relay, which in turn opens contact NN1 dropping the N relay. When the N relay is dropped, contact N1 closes picking up the NN relay and closing contact NN1 to pick up the N relay, thereby energizing the coil of the rotating selecting means in an off-on fashion and producing a stepping action by the switch means. Since the PBA relay is picked up, PBA3 contact is closed and the rotary selector contact arm 202 is connected through the selection position at either terminal NX relay to bus 600. The contact arm rotates in a step-by-step fashion in a counter-clockwise direction, as shown by the arrow, and 1st steps from the neutral position to the 1st selection position connected to the normally closed contact 1UP1. Assuming no other car is at the bottom dispatching floor and no other car has been selected for dispatching by the selecting mechanism, contact 1UP1 will be closed. Similarly, 1UP2, 2UP2, and 3UP2 will be closed.

Therefore, the NX relay will pick up and close contact NX1 (Fig. 5) picking up the order of selection-up BY relay, which seals itself in through contact BY4 and remains energized as long as the corresponding PBA relay remains energized. The BY relay in turn closes contact BY2 permitting the 1UP relay to pick up indicating that the car has selected or preempted selection position #1 at the bottom terminal. Also, the BY relay opens normally closed contact BY1 deenergizing the N relay and causing the rotary stepping selecting means to stop its stepping action. The preemption of this selection position for the car is maintained until the car is selected as the next car to be dispatched from the terminal and leaves the bottom terminal including the 1st floor and basement floor.

When the PB relay of the respective car drops out and the car is either started, as evidenced by the S3 contact being open or the cars NUA relay picks up opening the NUA3 contact, the PBA relay drops out and closes contact PBA1. When that occurs, the N relay will be energized through contact NN1, control wafer 201, brush 209, normally closed contact PTA1, indicating that the car is not at the top terminal, and now closed contact PBA1, and the rotary selecting means will step around through all of the remaining positions until it is returned to the neutral position where it remains until the respective car arrives either at the top terminal and is available for dispatching, or returns to the bottom terminal and is available for dispatching. This home return stepping action has no effect on the rest of the selecting system, since the PBA and PTA relays associated with the respective car are dropped out.

When a car arrived at the bottom terminal and its respective PB relay picked up, the contact PB4 (Fig. 4), respective thereto, closed. The next up selector interrupter NUSN relay is energized through a normally closed NUS1 contact and the common signal supply plus 600, 601. The NUSN relay causes the NUSN1 contact to be closed and permits the NUS next up selector relay to be picked up through brush 210, a control wafer 211 of the next up selector switch common to all of the cars operating in the bank, a brush 212, contact PB4-a, which is closed because of the presence of car a at the bottom terminal, and the normally closed NUA1 contacts controlled by the next up signal auxiliary NUA relay of each of the respective cars operating in the system. When the NUS relay is energized, the common next up rotating selector switch means causes the control wafer 211 and a rotating selector contact arm 215 on a separate level of the common next up selector switch means to rotate in a step-by-step manner similar to the individual rotating selecting means controlling the position selection and preemption of a car by the selecting means.

Since selector contact arm 205 is in the first stepping position and is in contact with contact 216, contact 217 adapted to be contacted by the selector arm 215 is energized by the bus 600 through the NUA relay; the PB3 contact, which is closed because car a is at the bottom terminal; the BY3 contact, which is closed during the maintenance of the preemption of a selecting position by car a; contact E1, which is closed as long as the motor-generator set for car a is running and the exciter voltage E relay is energized; the selector contact arm 205; and contact 216. Therefore, when the selector contact arm 215 during the stepping action of the common next up selector means contacts contact 217, the NUA relay for car a will be picked up. When the NUA relay picks up, the NUA1 contact associated with car a is open and the stopping operation of the common next up selector switch means is stopped. The NUA relay also closes a contact NUA2 in the energizing circuit for the next up signal NU relay and the "Next Up" indicating lamp.

Contact NUA3 for car a is also open disabling the holding circuit for the PBA and BY relays, so that the PBA and BY relays will drop when the PB relay of the respective car is dropped. When that occurs, the PB3 contact in the energizing circuit for the NUA relay of car a is dropped. If another car is positioned at the bottom terminal and has its PB relay picked up, the NUS relay will be energized and the common next up selector switching means will restart its stepping action hunting for the next car to be selected. On the other hand, if no other cars are at the bottom terminal, the common next up selector switching means will be caused to step to its home position by the brush 218 contacting the control wafer 211.

A detailed explanation of the operation of the selecting means for the car terminal will not be made since the circuit shown in Fig. 5 is similar to the circuit shown in Fig. 4 for the selection of cars for dispatching in the up direction and the selection of cars for dispatching for the down direction is accomplished in a similar manner.

*Dispatching in response to traffic demand*

Figure 10:
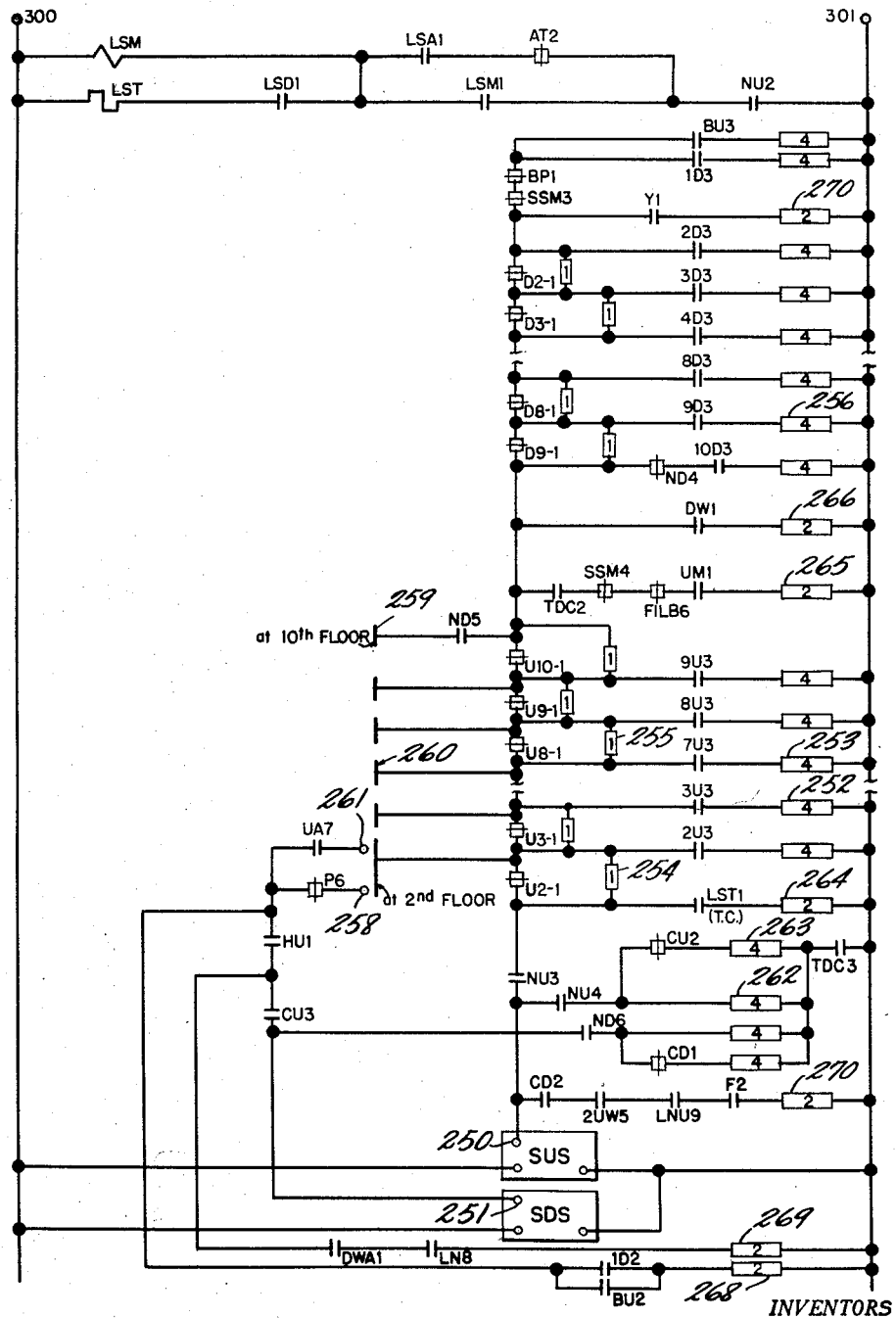
Fig. 10 is an electrical schematic diagram of an exemplary embodiment of dispatching circuits individual to the cars, in accordance with the invention.
Figure 10A:
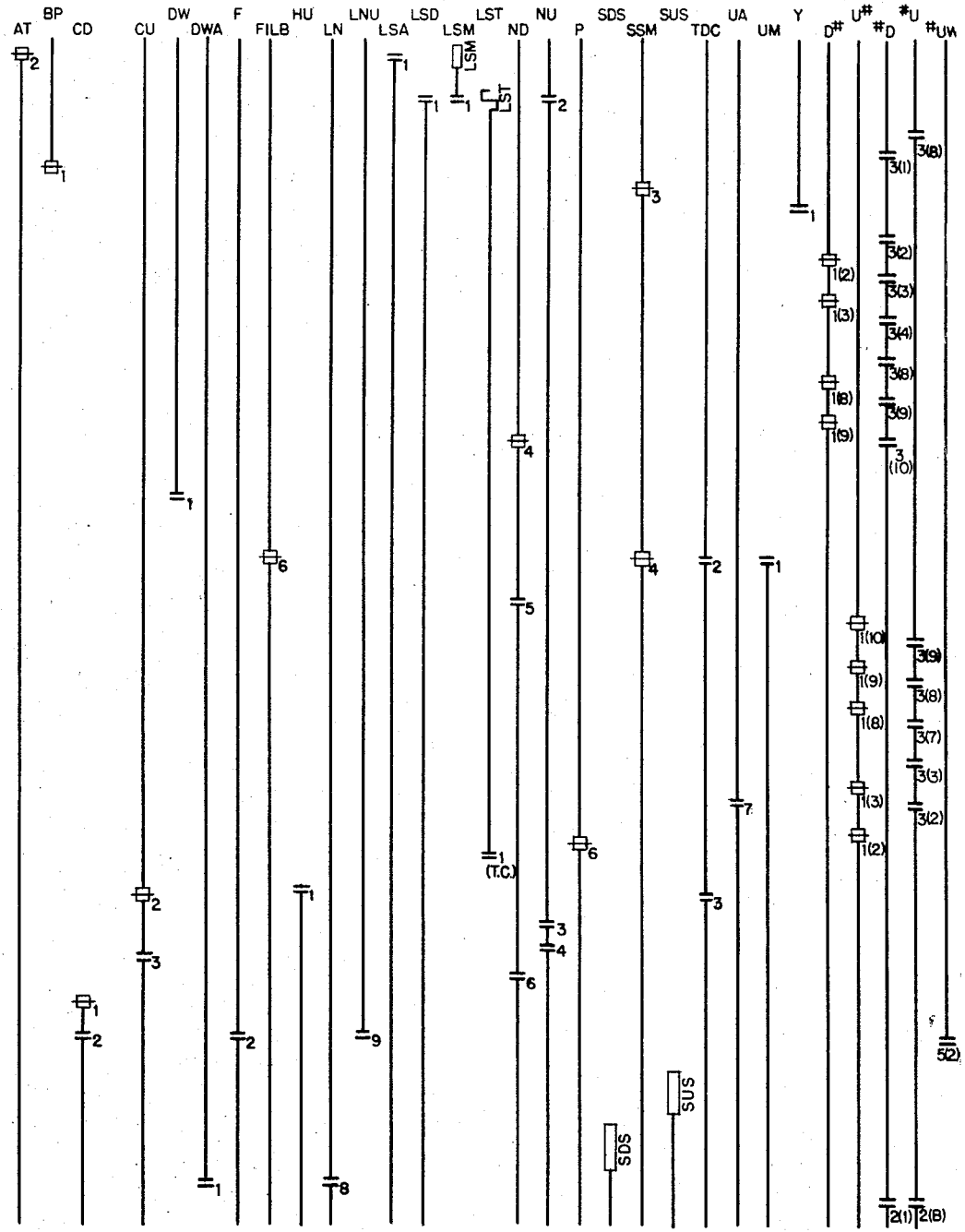

In Fig. 10, traffic demand sensing means for controlling the dispatching of cars from the upper and lower dispatching floors and for causing the reversal of cars at floors other than the dispatching floors is shown. Electronic dispatching means SUS and SDS, individual to each of the cars operating in the bank of elevators may take any suitable form, such as a conventional gaseous Thyratron which will fire whenever an input potential exceeds a predetermined value. For example, a resistive network may be connected to the grid of the Thyratron and the Thyratron will be caused to fire whenever the resistance of the network drops to a predetermined value.

In discussing the operation of the traffic demand sensing means of Fig. 10, it is intended that the rectangular blocks bearing the numerals 1, 2, and 4 represent resistances whose relative values are in the proportion 1:2:4. For example, all of the 4 resistances may have a value of 4,000 ohms, the 2 resistances may have a value of 2,000 ohms, and the 1 resistances may have a value of 1,000 ohms. Further, it is assumed that the SUS and SDS electronic dispatching relays will be energized when the effective resistance of the matrices connected to their respective terminals 250 and 251 are equal to or less than a predetermined value, such as 2,000 ohms. The matrices are so constructed that when a hall call is registered for a floor, a 4,000 ohm resistance is connected into the matrix.

For example, it is assumed that up hall calls are registered at the 2nd and 7th floors. Accordingly, the contacts 2U3 and 7U3 will be closed. When the respective car is selected as the next car to be dispatched, its NU relay will be picked up and the contact NU3 will be closed. Therefore, terminal 250 will be connected through the closed NU3 contact, a normally closed U2–1 contact, which remains closed as long as an up traveling car is not positioned at the 2nd floor, a normally closed U3–1 contact, which is closed as long as an up traveling car is not positioned at the 3rd floor, the closed 3U3 contact and the 4,000 ohm resistor 252 to the bus 301. If no other car is traveling in the up direction and positioned between the 3rd and the 7th floor, the closing of contact 7U3 places a second 4,000 ohm resistor 253 in parallel with the 4,000 ohm resistor 252 for the 3rd floor up hall call. While the one 4,000 ohm resistor at either floor would not be sufficient to operate the SUS relay, the effective resistance of the parallel network of two 4,000 ohm resistors is 2,000 ohms and the SUS relay will be operated.

Now let it be assumed an up traveling car is located at the 2nd floor. In that case, the contact U2–1 will be opened indicating the presence of an up traveling car at the 2nd floor. When the U2–1 contact is opened, the resistance 254 having a value of 1,000 ohms is effectively introduced in the circuit. Thus a resistance of 1,000 ohms is added to the effective resistance of the parallel resistors 252 and 253 of 2,000 ohms, with a resultant effective resistance of 3,000 ohms, too great to cause the SUS relay to be operated.

On the other hand if it is assumed that the next preceding up traveling car was positioned at the 8th floor, so that the U8–1 contact is opened, but that no car is positioned at the 2nd floor, the introduction of the effective resistance of resistor 255 having a value of 1,000 ohms would not affect the operation of the SUS relay, as long as two hall calls are registered in the up direction for floors below the 8th floor.

Let it further be assumed that hall calls are registered at the 7th, 6th, 4th and 3rd floors in the up direction and that an up traveling car is positioned at the 2nd floor. Under those circumstances, contact U2–1 would be opened and resistor 254 would effectively introduce 1,000 ohms into the circuit, the four registered hall calls above the 2nd floor would each introduce 4,000 ohms in a parallel arrangement with an effective resistance of 1,000 ohms, which added to the effective resistance of resistor 254 will produce a resultant effective resistance of 2,000 ohms sufficient to operate the relay SUS.

Thus, the electronic dispatching relay SUS can be energized when the car is selected as the next up car in response to the registration of two or more hall calls between the lower dispatching floor and the next preceding up traveling car. Also, the SUS relay will be operated if four or more hall calls are registered at floors above the next preceding up traveling car. In either case a maximum effective resistance of 2,000 ohms is produced having a value sufficient to operate the SUS electronic dispatching relay.

Further, it is not even necessary that the hall calls be registered in the up direction, for example, let it be assumed that an up hall call is registered at the 3rd floor bringing in the resistance of resistor 252 and that a down hall call is registered at the 9th floor closing contact 9D3 bringing the effective resistance of resistor 256, and that a down traveling car is positioned at the 8th floor, indicated by contact D8–1 being opened. If no car is traveling in the up direction and no car is at the 10th floor or the 9th floor set for travel in the down direction, the SUS relay for the car selected for dispatching from the lower dispatching floor will be operated as the resultant effective resistance will be a maximum of 2,000 ohms.

The operation of the SDS electronic dispatching relay is similar in that if it is assumed that the car is positioned at the 10th floor, which is the upper dispatching floor, the brush 258 of the respective car will be in contact with floor segment 259 at the 10th floor. If the car is selected for dispatching in the down direction from the 10th floor, the ND5 contact will be closed. Since the car is stopped at the 10th floor, indicated by contact P6 in its normally closed condition; and since the car is at the 10th floor, both the HU and CU relays will be picked up so that the contacts HU1 and CU3 will be closed, and the car will be responsive to the registration of demands for service in the system in a manner similar to the operation of the SUS relay. For example, if two or more hall calls for travel in the down direction are registered at floors between the 10th floor and the next preceding down traveling car, the SDS relay will pick up. Also, if four or more down hall calls are registered below the next preceding down traveling car, the effective resistance will be sufficient to cause the SDS relay to operate. It is evident that various other combinations of calls, wherein the resultant effective resistance has a value of 2,000 ohms or less will be sufficient to operate either the SUS or SDS electronic dispatching relays, depending upon the position of a car.

Further, let it be assumed that the car is traveling in the up direction and is positioned at the 7th floor so that the brush 258 contacts floor segment 260, if no hall calls are registered for floors above the up traveling car for either the up or down directions of travel, but that hall calls are registered at the 5th and 6th floors for travel in the down direction. Under those circumstances if no other car is positioned above the car at the 7th floor, so that the effective resistance presented to terminal 251 is of a maximum of 2,000 ohms, the SDS electronic dispatching relay will operate and cause the car to reverse its direction of travel. Because of the HU1 and CU3 contacts, this reversal could not be initiated until no hall calls and no car calls are registered above the up traveling car.

Similarly, even when the car is actually traveling in the up direction, as evidenced by the contact UA7 being closed, the operation of SDS relay can be initiated when the advance brush 261 contacts floor segment 260 under the above described hall call registrations of demands for service.

Under the above described situations, it was necessary that demands for service be registered at a predetermined plurality of floors, so as to produce an effective resistance of 2,000 ohms before either the SUS or SDS relays would be operated. Since cars would only be dispatched under those conditions when two or more hall calls were registered between the car at a dispatching floor or in a position to be reversed at some floor intermediate the dispatching floors, before the dispatching relays could be operated, it is necessary to provide means for causing the dispatching relays to be operated when a lesser amount of demands for service are registered. For example, while a car selected for dispatching in the up direction is not required to be dispatched immediately in response to the registration of only one hall call for a floor between it and the next preceding up traveling car, it is desirable that the car be dispatched in response to the lesser traffic demand after some interval of time following the selection of the car as the next car to be dispatched during which the car would be responsive to the predetermined greater traffic demand. Accordingly, selectively operable means is provided for causing the dispatching relay SUS to be responsive to the registration of demands for service at a lesser number of floors.

In particular, after a predetermined amount of time following the selection of a car as the next to be dispatched from the lower dispatching floor, the TDC3 contact will close and introduce the resistance of resistor 262 having a value of 4,000 ohms into the circuit through closed contact NU4, thereby simulating the registration of a demand for service at one floor. After the TDC3 contact is closed, it will only be necessary to have one hall call registered at a floor between the lower dispatching floor and the next preceding car dispatched from the lower dispatching floor to cause the operation of the SUS relay. Whenever that additional call is registered subsequent to the closing of the TDC3 contact, the SUS electronic dispatching relay will be operated.

Since it is also desirable to have the car dispatched from the dispatching floor in response to the registration of demands for service in the car itself in the form of car calls for floors above the position of a car, a normally closed contact CU2, which will be closed only when the car call is registered for a floor above the car, will introduce when it is closed a 4,000 ohm resistor 263 into the circuit. Since the effective resistance of the resistors 262 and 263 in parallel is 2,000 ohms, the SUS dispatching relay may be operated after the predetermined interval of time controlled by the contact TDC3, but not before that interval of time.

A similar means for simulating demands for service after the end of predetermined intervals of time is provided for controlling the operation of the SDS electronic dispatching relay for starting a car to travel in the down direction.

Special service means operable to simulate the registration of demands for service at one or more floors also include means responsive to the load conditions in a car, means responsive to the presence or absence of cars at given floors other than the dispatching floor and at the dispatching floor itself, the operation of preferred service demand indicating means at one or more floors in the bank, the selection of a car for a particular preferred service operation, and the registration of demands for service in a car under special circumstances and the registration of demands for service at predetermined floors.

When a car has been selected as the next car to be dispatched from a terminal floor, and it becomes loaded with passengers to a predetermined percentage of full load sufficient to make it undesirable for the car to pick up passengers at any floors during its trip in the direction in which it is to be dispatched until the load condition has been reduced, it is preferred that the car be dispatched as soon as possible. In particular, the load weigh indication LSD relay (Fig. 22) is provided which is actuated in response to a suitable load weigh device contact which may be operated in any conventional manner to cause the LSD relay to be energized whenever the load conditions in the car exceed a predetermined percentage of full load. Suitable means for determining the load condition of a car are well known in the art and include such means as mechanical devices for determining the load on the cable supporting the elevator car, and the load condition on the car platform, among others. It is further intended that load-responsive indicating means such as disclosed in copending U. S. patent application Serial No. 614,396, filed October 8, 1956, for "Load Responsive Control Means," in the name of Kenneth M. White, might be incorporated in a system such as disclosed in the present application.

When the load condition in the car exceeds the predetermined value and the LSD relay picks up, the LSD2 contact in the energizing circuit for the hall call by-pass by loaded car or attendant "pass" signal LS relay is closed, enabling the LS relay to be picked up when the car is standing at the dispatching floor with its doors open, as indicated by the normally closed DOL5 contact being in its closed condition. When a car is operating with an attendant, it may be desirable to permit the attendant to determine what the desired load conditions and other operating condition of the car should be. Accordingly, a normally closed contact AT15 is placed in series with the LSD2 contact. A contact LSD3 is opened in response to the energization of the LSD relay to drop out the hall call by-pass automatic reset LSA relay, which normally would be picked up when the car is stopped at a floor with its doors open. If a car is loaded as it comes into and stops at a floor, to the point that the LSD relay is picked up and then sufficient passengers are discharged from the car so that the LSD relay drops out, the LSA relay picks up and opens the LSA2 normally closed contact in series with the LS7 normally open contact which is used to seal in the LS relay when it is picked up either automatically in response to load conditions in the car, or in response to the operation of a manual by-pass button by an attendant. The manual by-pass button is operable only when the AT14 contact is closed, under which conditions it will pick up the attendant "pass" button HP relay, which in turn closes the HP2 contact energizing the LS relay. As a further means for giving the attendant operating a car when the car is being operated with an attendant full leeway as to when a car will by-pass a floor, a contact AT16 is shunted across the contact LSD3, thereby disabling the holding circuit for the LS relay and providing a by-pass action only when the manual by-pass button is actually being pressed by the attendant.

In Fig. 10, the load-weigh timer LST relay will be picked up in the response to the energization of the LSD relay, closing contact LSD1 when the load conditions in the car exceed a predetermined percentage of full load. This action, however, takes place only when the car has been selected as the next car to be dispatched from the lower dispatching floor, as evidenced by the NU2 contact being closed, and also that the car is unloaded at the time that it is initially selected to be dispatched as the next up car, as evidenced by the LSM1 contact being closed. The LSM unloaded car relay picks up when the LSA relay has picked up and closed the LSA1 contact, if the NU2 contact is closed, provided that the car is not operating with an attendant, as evidenced by the AT2 contact being in its normally closed position. When the LST relay is energized, it operates a contact LST1 and closes that contact after a predetermined delay to bring into the circuit the 2,000 ohm resistor 264. In that way, when a car is selected as the next car to be dispatched in the upward direction, as evidenced by the NU3 contact being closed, and a sufficient number of passengers have entered the car while it is standing with its doors open at the lower dispatching floor to cause the LSD relay to operate, a special service demand equivalent to the registration of two hall calls at floors behind the next preceding up traveling car is simulated to cause the immediate operation of the SUS electronic dispatching relay, even though no hall calls may actually be registered.

Special service means are provided for simulating a demand for service at the upper dispatching floor when, after a predetermined interval of time from the selection of a car as the next car to be dispatched, as evidenced by the closing of the TDC2 contact, and two or more cars are operating under the control of the dispatching and control system, as evidenced by the SSM4 contact being in its normally closed condition; the motor generator sets for at least some of the cars are operating, as evidenced by the FILB6 contact being in its normally closed condition; and the fact that no cars are traveling in the up direction when a car is selected for dispatching at the lower dispatching floor, or that a car may be traveling in the up direction and positioned at the second floor, but the car is selected for down preferred service operation and no other cars are traveling in the up direction above the second floor, as evidenced by the contact UM1 being closed, thereby placing the 2,000 ohm resistor 265 in the circuit.

Another special service means for simulating demands for service at a predetermined plurality of floors is operable in response to a contact DW1 being closed whenever either a down or up preferred service demand indicating means is operated at any floor for bringing into the circuit a 2,000 ohm resistor 266 at a location corresponding to the 10th floor thereby simulating a special demand for service at the 10th floor. This special service demand is sufficient to cause a car to be dispatched in the up direction from the lower dispatching floor if no other car is traveling in the up direction or positioned at the 10th floor, and also is sufficient to cause a car traveling in the up direction to have its direction of travel reversed in response to the operation of the SDS dispatching relay when there are no higher car or hall calls registered above the car.

If two or more cars are operating under the control of a dispatching and control system as evidenced by the contact SSM3 being in its normally closed condition; and no car is selected as a preferred car for basement service, as evidenced by the contact BP1 being in its normally closed condition, the registration of the hall call either at the basement for up direction travel or at the first floor for down direction travel to the basement places in circuit a respective 4,000 ohm resistor effecting the dispatching of a car from the upper dispatching floor. Under certain circumstances it is desirable to cause the registration of a demand for service involving basement travel, such as by the registration of a down hall call at the 1st floor or an up hall call at the basement to be sufficient to cause a car traveling in the up direction to reverse its direction of travel and start in the down direction when no car or hall calls are registered above the car. This is accomplished by means of the 1D2 and DU2 contact, either one of which when closed will simulate a special demand for service at the basement floors by introducing a 2,000 ohm resistor 268 into the circuit affecting the SDS dispatching relay.

When a car is selected for down preferred service operation, it is desirable to have the car when it is traveling in the up direction reverse its direction of travel as soon as possible to service the preferred service demand indicating means in the down direction. Accordingly, when a car is selected for down preferred service operation, as evidenced by contact LN8 being closed, and there are no down preferred service calls registered between the up traveling car and the upper displatching floor, as evidenced by the DWA1 contact being closed, a special service demand is simulated by introducing a 2,000 ohm resistor 269 into the circuit affecting the operation of the SDS dispatching relay. If desired, this special service demand may be made indifferent as to whether hall calls are registered above the car, as long as no car calls are registered in the car for floors above the car, as evidenced by the CU3 contact being closed, when the DWA1 contact is closed.

When a car is selected for up preferred service operation, it is desirable under certain conditions to have the car when traveling in the down direction reverse at a floor above the lower dispatching floor in response to the operation of an up preferred service demand indicating means at the floor above the lower dispatching floor. For example, when it is desired to have a car reverse at the second floor in response to up preferred service demand indicating means operated at the second floor, a special service demand is simulated by introducing a 2,000 ohm resistor 270 into the control circuit for the SUS relay, independent of its selection as a next up car, when there are no car calls below the down traveling car, as evidenced by the CD2 contact being closed; an up preferred service demand indicating means is operated at the second floor, as evidenced by the 2UW5 contact being closed; the car is selected for up preferred service operation, as evidenced by the LNU9 contact being closed; and the car is traveling in the down direction and is in the slow-down zone for the second floor, as evidenced by the F2 contact being closed.

During the normal operation of an elevator system, it is desirable, if possible, to maintain a predetermined number of cars at the lower dispatching floor. To accomplish this, a bottom terminal parking quota indication Y relay is provided individual to each of the cars. If three or more cars are operating in the system, it is preferable to have at least one car in addition to the car which is selected to be dispatched in the up direction parked at the lower dispatching floor. Accordingly, a control matrix is provided (Fig. 6) involving a combination of PB6 contacts, indicating that respective cars are not available for selection for dispatching at the bottom terminal floor when in their normally closed condition; and NUA4 normally open contacts individual to each of the cars for indicating when a car has been selected as the next car to be dispatched. When three or more cars are in operation, as evidenced by the SSN1, 2, and 3 contacts being in their normally closed condition, the matrix is effective to provide a complete series energizing circuit whenever no cars are at the bottom terminal, or only the car selected to be dispatched from the lower dispatching floor is at the bottom terminal. When the matrix is so conditioned, the bottom terminal parking quota indication-sequence YA relay is energized.

In addition, if the motor generator sets of at least one of the cars is and has been operating, as evidenced by the FILB5 contact being in its normally closed condition, the Y relay for a car not positioned at the bottom terminal floor, as evidenced by its respective PB8 contact being in its normally closed condition will be energized. If the Y relay for the car is energized, the Y1 contact of the respective car (Fig. 10) is closed to introduce a 2,000 ohm resistor 270 into the traffic demand sensing matrix at a position corresponding to the location of the first floor, thus registering a special service demand simulating the registration of hall calls on two different floors at the lower dispatching floor.

If only two cars are in operation, it is not desirable to attempt to have one car at the dispatching floor in addition to the car selected as the next car to be dispatched. Therefore, the SSN1, 2, and 3 contacts open and disable the PB6 and NUA4 contact matrix. However, when no cars are available for dispatching at the bottom terminal, the Y and YA relays will be energized through the series circuit of normally closed PB6 contacts. In addition, when two cars are in service, as evidenced by the SSN4 contact being closed and the SSN2 contact also being closed, and when car calls are registered in a car positioned at the bottom terminal for floors above the car, the Y and YA relays will be energized. In that way, a special service demand simulating the registration of two down hall calls at the lower dispatching floor is registered as soon as a demand for service is registered in a car positioned at the bottom terminal, without waiting for the car to leave the bottom terminal.

When only one car is in operation, the Y and YA relays will only pick up in response to a condition where there are no cars positioned at the bottom terminal available for dispatching.

At times when no service demands have been registered in the system for a considerable length of time, all of the cars operating in the system under the controls of the dispatching and control system will have their motor-generator sets shut down. Accordingly, the FILB relay will be picked up and the Y relays are disabled by the FILB5 contact being opened. If one or more demands for service are registered which cause the car selected as the next up car to start up its motor generator set and be dispatched from the lower dispatching floor, the FILB5 contact remains open for a predetermined time interval controlled by the operation of the FILT relay, previously described, to prevent the registration of a special service demand for simulating demands for service at the bottom dispatching floor until the car which has been dispatched from the bottom terminal has had a reasonable chance to return.

The manner in which the dispatching relays SUS and SDS, individual to each of the cars are operated, has been discussed. Since it is intended that the cars are primarily to operate as a fully automatic elevator system without the use of attendants in the cars or starters at the lobbies, it is necessary to have the electronic dispatching relays directly control the signal for up direction SUA relay and the signal for down direction SDA relay.

In Fig. 16, the SUA and SDA relays are operable to cause the cars to travel between the upper and lower dispatching floors. When the respective car is not positioned at the top terminal, as indicated by the PT8 contact being in its normally closed position, the 10DZ2 contact being in its normally closed condition, and the NDC1 contact being in its normally closed condition; the car is not being operated in the down direction by the attendant, as evidenced by the AD2 contact being in its normally closed condition; the car is not set for travel in the down direction, as evidenced by the SDA12 contact being in its normally closed condition; and the SDS1 contact being in its normally closed condition, indicating that no attempt is being made to dispatch the car in the down direction; the car may be dispatched in the up direction in response to the operation of the SUS electronic dispatching relay when the contact SUS1 closes. The SUA relay seals itself in by means of a holding circuit including a normally open SUA6 contact. If the car is operating with an attendant, the car can also be set for travel in the up direction by means of the AU1 contact closing.

As shown in Fig. 15, if the car is adapted to serve a basement floor, a normally closed contact BZ1 is included in series with the SUA6 contact to interrupt the holding circuit for the SUA relay when the car is positioned at the basement floor in order to insure the ability to stop the basement car as it travels towards the 1st floor, unless the SUS dispatching relay has picked up.

When a car is operating to the basement another problem arises in that if car calls are registered in the car by passengers entering the car at the basement floor for floors above the 1st floor, it is desirable to maintain the direction setting of the car for the up direction by means of the SUA relay being maintained energized. This is accomplished by the BEX relay closing the BEX1 contact. Thus, the up direction setting is maintained even though the car may stop at the first floor.

When a car goes to the basement floor and is not selected for dispatching, it is necessary to return the car to the 1st floor, this is accomplished by energizing the SUA relay through a BZ2 contact which is closed when the car is in the basement zone, a K1 contact which is normally closed except when a car reaches intermediate speed, and a BX1 contact which is normally closed except when the car reaches intermediate speed, as evidenced by the closing of the K2 contact, and when the car is in the basement zone, as evidenced by the BZ7 contact being closed. The BX relay seals itself in by means of a BX2 contact in series with a UA17 contact which is closed when a car is traveling in the up direction. Thus, the car is automatically started in the up direction from the basement floor and the initiating circuit for the SUA relay is dropped out as the car is moving toward the 1st floor.

If a car is in the basement zone, as evidenced by the BZ4 contact being closed and one or more car calls are registered for floors above the 1st floor, as evidenced by the CU6 contact being in its normally closed condition, the express service from basement BEX relay will pick up, as long as the car is not selected as the next car to be dispatched from the bottom terminal floor, as evidenced by the NU11 contact being in its normally closed condition. In that way, if no car calls are registered for the 1st floor, the car will start up from the basement and proceed directly to the floors above the 1st floor without stopping at the 1st floor. In order to make this express service from the basement independent of the registration of a car call for the 1st floor, or for the basement floor, a normally open contact BZ8 is shunted across the normally closed contacts 1C2 and BC2 in the energizing circuit for the CU and CD relays (Fig. 22).

A car is set for travel in the down direction by the energization of its SDA relay (Fig. 16) when the AU2 contact controlled by the attendant for operation in the up direction is in its normally closed condition; the car is not set for travel in the up direction, as evidenced by the SUA7 contact being in its normally closed condition; the PB relay is not operated for the car, as evidenced by the PB10 contact being in its normally closed condition; the car is not positioned in the 1st floor down zone, as evidenced by the 1DZ2 contact being in its normally closed condition; the NUC relay is not picked up, as evidenced by the NUC3 contact being in its normally closed condition or if the NUC relay is picked up, the car is traveling in the up direction as evidenced by the normally UA14 contact shunting the NUC3 contact; the car may be started in the down direction in response to the operation of the SDS electronic dispatching relay closing the contact SDS2. The SDA13 contact closes when the SDA picks up to seal itself in.

When the car is operating on attendant operation the car may be started in the down direction by closing the AD3 contact. The purpose of the UA14 contacts shunting the NUC3 contact is to permit the reversal of direction of travel at the 2nd floor of a car which is started from the 1st floor and is proceeding toward the 2nd floor and to permit instantaneous direction transfer.

An automatic home landing return circuit is provided by means of a normally closed PT9 contact, indicating that the car is not at the top terminal; a normally closed UA13 contact, indicating that the car is not traveling in the up direction; and a normally open SS20 contact, which will be closed when the car is operating under the control of the dispatching and control system.

The operation for setting the direction of travel for down direction of a car adapted to move to the basement floor is similar, as shown in Fig. 15, except for the omission of the NUC3 and 1DZ2 contacts from the energizing circuits of the SDA relay. However, if the car is positioned in the basement zone, the BZ3 contact opens to prevent the direction being set for travel in the down direction while the car is in the basement.

Since it is not desirable to have cars other than those selected for basement preference operation respond to car or hall calls for travel to the basement floor, the CD3 normally closed contact, indicating that the car call is registered for a floor below the car; and the HD1 normally closed contact, indicating that a hall call is registered for a floor below the car; are ineffective to cause the pick up of the SDA relay, unless the car is selected for basement preference, as indicated by the PRB7 contact being enclosed.

While it is desirable to permit the attendant to cause the car to travel in the down direction under most circumstances, it may not be desirable to permit the attendant to do so when the car is selected to be dispatched as the next up car. Accordingly, provision is made whereby the attendant down direction relay ADA cannot be picked up by the operation of the attendant down button when the car is selected for the next up dispatching as evidenced by the NU13 contact being in its normally closed condition (Fig. 20).

If a car selected for basement service operation is traveling in the up direction, it may be reversed and sent down to the basement even when the car is in the basement zone, when the car is selected for basement operation, as evidenced by the PRB8 contact being closed and the car is traveling in the up direction as evidenced by the UA14 contact being closed.

The actual starting of the car in either the up or down direction is controlled by the starting-up direction SU relay and starting-down direction SD relay (Fig. 17). For example, the SU relay may be energized in response to the energization of the SUA relay causing the SUA9 contact to close when the car is not traveling in the down direction, as evidenced by the DA17 contact being in its normally closed position; it is not intended to start the car traveling in the down direction, as evidenced by the SD3 contact being in its normally closed condition, an up hall call is not registered at the floor at which the car is stopped, as evidenced by the UC2 contact being in its normally closed condition, and the call CA relay is not operated, as evidenced by the CA1 contact being in its normally closed condition; as long as the car has not traveled to a point in the top of the hatchway at which the Up slow down limit switch is operated.

When the car starts to move in response to the operation of the SU relay and the starting S relay which is picked up by closing the contact SU5, it seals itself in through contact SU3 and contact P10.

Similarly, when the SDA relay is energized and closes the SDA15 contact, the SD relay will pick up as long as the car is not traveling in the up direction, as evidenced by the UA19 contact being in its normally closed condition; it is not intended that the car is to be started in the up direction, as evidenced by the SU4 contact being in its normally closed condition; a hall call is not registered at the floor at which the car is standing for down travel, as evidenced by the DC3 contact being in its normally closed condition; and the call relay is not operated, as evidenced by the CA1 contact being in its normally closed condition; as long as the car is not in that portion of the bottom of the hatchway where the down slow-down manual limit switch would be operated.

Figures 23A, 24A, 25A, 26A, 27A:
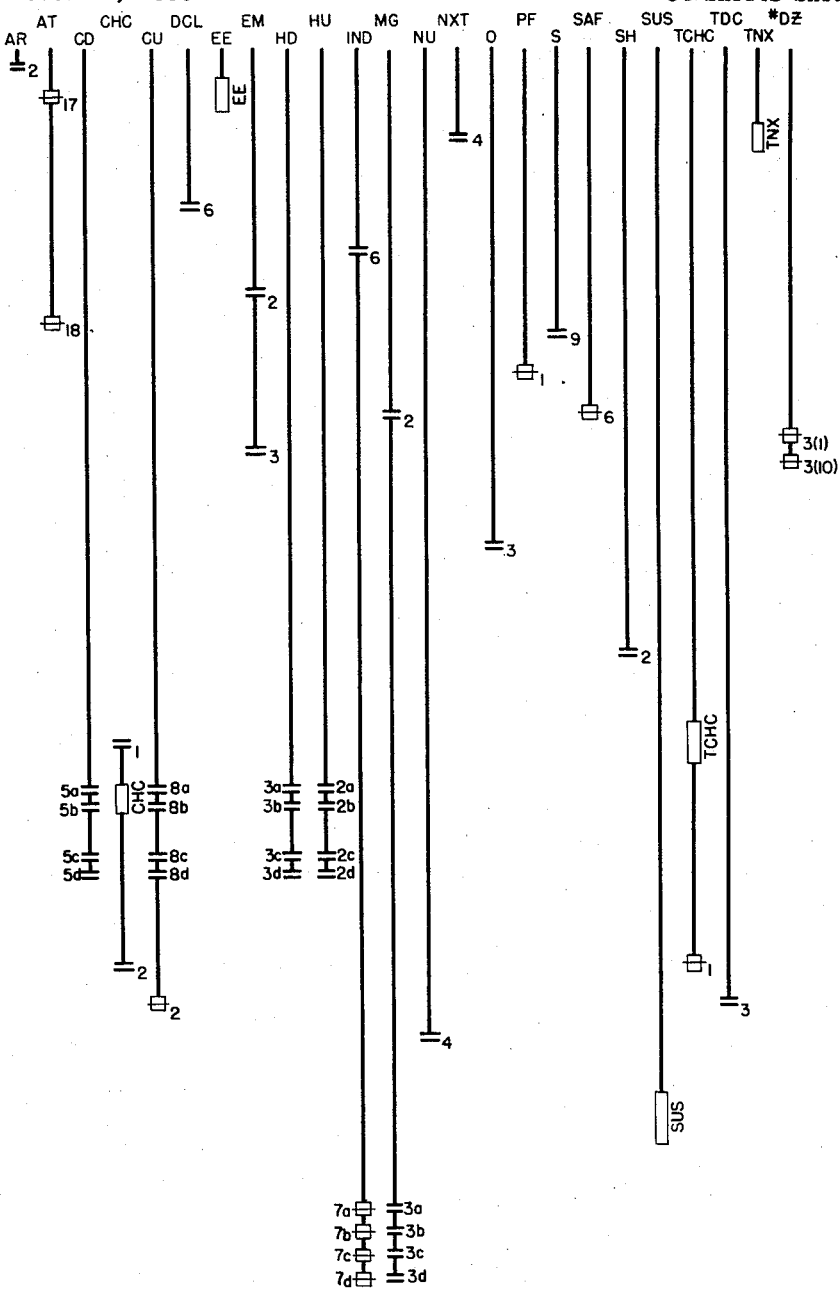

Under some circumstances, it is required by building or other regulations, that means be provided for causing a car to be dispatched from at least one of the dispatching floors at intervals of time, even though no demands for service are registered in the system. This may be accomplished by means of the no car or hall calls registered CHC relay (Fig. 26), which is energized when the HU, HD, CU, and CD relays for all of the cars operating under the dispatching and control system are picked up indicating the absence of demands for service, as evidenced by contact HU2, HD3, CU8, and CD5 for each of the cars in series arrangement being closed. When the CHC relay picks up, it closes a CHC1 contact initiating the operation of timing mechanism TCHC, which may be of any suitable conventional type such as the type the operation of which may be initiated by a control circuit and in which the mechanism times out a predetermined time interval, which operates after a predetermined interval of time to open normally closed contact TCHC1. The contact TCHC1 is in series with the normally open contact CHC2 in shunt relation around the normally closed CU2 contact, in the demand simulating circuit for the SUS relay (Fig. 26). In that way, if at the time that the TDC3 contact closes, no demands for service of any type are registered in the system, a special service demand is registered by simulating demands for service sufficient to cause the dispatching of a car from the lower dispatching floor. If there is a continuous indication of no demands for service in the system until the end of the timing interval provided by the TCHC timing mechanism, cars will be dispatched from the bottom terminal at the end of a predetermined interval of time from when they are selected as the next car to be dispatched, as evidenced by the closing of the TDC3 contact, until the TCHC1 contact is opened in the control matrix for the SUS dispatching relays of the individual cars.

*Basement preference car selection and operation*

When two or more of the cars in a bank of elevators are adapted to operate to a floor beyond the lower dispatching floor such as to a basement or subbasement or combination thereof, or even to a greater plurality of floors below the lower dispatching floor, it is desirable to select one of the cars capable of traveling to the basement floor as a preferred service operation car for serving the basement, regardless of whether a service demand is registered for or at the basement. On the other hand, it is not desirable to have a car which is selected to be dispatched in the up direction be operable in response to demands for service to and from the basement, as long as other cars are available within a reasonable time. Accordingly, when a car approaches the first floor traveling in the down direction, its brush 198 (Fig. 15) contacts the floor contact segments 195 and if the car is not selected as the next car to be dispatched in the up direction, as evidenced by the NU11 contact remaining in its normally closed condition, the availability for basement preference selection PL relay (Fig. 15) is picked up, as long as the BEX3 contact is in its normally closed condition.

Assuming that the PL relay for car *a* is energized when car *a* arrives at the 1st floor, contact PL1 (Fig. 6) for car *a* is closed and the basement preference PRB relay individual to car *a* is energized, provided no one of the other cars adapted to move to the basement are then selected for basement preference, as evidenced by the PRB1 contacts of the other cars of the system remaining in their normally closed condition. When a car is selected for basement preference operation by its PRB being picked up, its respective contact PRB5 closes in the energizing circuit for the master basement preference indication BP relay (Fig. 6) energizing that relay.

If two or more cars are at the 1st floor in addition to the car selected as the next car to be dispatched, in the preferred embodiment the cars are selected for basement preference in a predetermined rotational order. For example, it is assumed that cars *b* and *c* are at the 1st floor and are not selected for next up. Therefore, the PL1 contact is closed for car *b* and car *c*. Also, the PL2 contacts are open for cars *b* and *c*. Accordingly, only the PRB relay can be energized through the normally closed PRB2 contacts for contacts C and D, the closed PL1 contacts for car *b*, and the closed PL2 contacts for car *a*. In contrast, the PL2 contact for car *b* is open preventing the energization of the PRB relay for car *c*. Therefore, it is seen that when two or more cars are at the first floor in addition to a car selected as the next up car, the basement preference car is selected on a rotational basis.

As previously mentioned, the SDA relay (Fig. 15) is not responsive to the registration of car or hall calls for floors below the 1st floor when the car is at the bottom terminal except when the car is selected for basement preference, as evidenced by the PRB7 contact being closed. Accordingly, when more than one car is operating under the control of the dispatching and control system it is desirable to prevent the HD relay (Fig. 22) of cars other than the car selected for basement preference to be responsive to the registration of hall calls in the down direction at the 1st floor or in the up direction at the basement floor. This is accomplished by shunting, the normally closed contacts 1D4, BU4, DPD2 by a normally closed contact SSM6, indicating that at least one car is in operation; and a normally closed PRB9 contact indicating when closed that the car is not selected for basement preference; and a normally opened contact BP2, which when closed indicates that a car is selected for basement preference service operation. Therefore, the car not selected is independent of demands for service for the basement for demands for basement service.

If only one car is at the 1st floor, and it is selected for the next up car, as evidenced by the contact NU15 being closed, it also is not responsive to demands for service for basement operation, as long as two or more cars are in service because of a normally closed contact SSM5. However, if only one car is operating under the control of the dispatching and control system, as evidenced by the SSM7 contact being closed and the SSM5 and SSM6 contacts being open, the car at the 1st floor when selected as the next up car will be responsive to demands for service for basement operation unless the car is standing at the floor, as indicated by contact P20 being in its normally closed condition, and a car call is registered for operation to a floor above the 1st floor, as evidenced by the contact CU7 being in its normally closed condition.

If a car is at the 1st floor, and a demand for service to the basement is indicated either by the CD4 contact being open or the HD2 contact being open (Fig. 15), the PB relay individual to the car will drop out. It is understood, however, from the above description that the HD relay is only responsive to the registration of calls to and from the basement when the car is selected as the basement preference car or under the limited conditions when only one car is in operation in the system and it is selected for dispatching in the up direction, provided no car calls are registered for floors above the 1st floor.

Also, as previously mentioned with regard to the description of car call registration as shown in Fig. 11, basement car calls cannot be registered in a car unless it is not selected as the next car to be dispatched in the up direction, as evidenced by the NU6 contact being in its normally closed condition, or the car is operating with an attendant and the attendant has caused the AD relay to be picked up.

Further, it is noted that if the BEX relay is energized by the registration of car calls for floors above the 1st floor when the car is in the basement zone, the car cannot be made to lose its bottom terminal indication by the registration of car or hall calls for the down direction while it is in contact with the floor segment 195 because the normally open BEX4 relay contact is closed. The BEX4 contact also permits selection of a car as the next up car under conditions where car calls or hall calls might be registered for the basement floor after the car had been to the basement and passengers have entered the car indicating an intention to go to floors above the 1st floor.

*Cars stopping, door operation, and direction preference maintenance*

While the manner in which calls are picked upon by a car traveling between the floors of the installation has been described, the actual control of the stopping and manner of operation of the car door while the car is stopped at a floor is controlled in the following manner. When the up hall UC relay picks up in response to an up hall call being registered at a floor which the car is approaching or at which the car is stopped, the contact UC1 (Fig. 12) is closed picking up the UCA up hall call auxiliary-sequence relay, which in turn closes the UCA2 contact (Fig. 20) in the energizing circuit for the door open signal DO. Similarly, when the down hall call DC relay picks up in response to the car approaching or being stopped at a floor at which a down hall call is registered, contact DC1 (Fig. 12) is closed picking up the down hall call auxiliary-sequence DCA relay, which in turn closes the DCA3 contact (Fig. 20) in the energizing circuit for the DO relay. Also, if a car picks up a down preferred service demand indication at a floor which the car is at or approaching, the down preferred service call LW relay will pick up closing the LW2 contact in the energizing circuit for the DO relay.

In any one of the above cases if the car is not set to by-pass the particular floor because of a load condition or the operation of the attendant "pass" signal as evidenced by the LS6 contact being in its normally closed position and the start button indication relay DSA, which is operable only when a car is on independent service or is operating with an attendant, is not picked up, as evidenced by the DSA1 contact being in its normally closed condition, the DO relay will be energized through the normally closed contact TD2, or if the car is moving at the time that the call is picked up, the DO relay will be energized through the contact P15. Further, the DO relay may be picked up in response to the operation of the car call CC relay closing the CC1 contact, independent of whether the car is set to by-pass a floor. When the DO relay picks up it seals itself in by a contact DO10, and will only be dropped out when the start button is operated by an attendant, or the TD door timer times out an interval opening the TD2 normally closed contact.

The DO relay will also pick up under certain other special conditions. For example, when the car is operating with an attendant as evidenced by the AT9 contact being closed, and the car is not moving as evidenced by the P14 contact being in its normally closed condition, the DO relay will be picked up through the normally closed TD2 and DSA1 contact. Also, when a car is parked at a dispatching floor with its doors closed, as evidenced by DCL5 contact being in its normally closed condition, and is then selected as the next car to be dispatched in the up direction, as evidenced by the NXT3 contact being closed, provided the motor-generator sets have been running for a predetermined interval of time, is evidenced by the FILB3 contact being in its normally closed condition, the DO relay will be picked up through the TD2 and DSA1 contacts. The NXT3 contact is closed whenever the NXT relay (Fig. 6) picks up in response to the car being selected either as the next up car as evidenced by contact NUA4 being closed, or as the next down car, as evidenced by the contact NDA4 being closed, provided the car is not at the basement floor, as evidenced by the contact BPI2 being in its normally closed condition.

Also if the car is not moving as evidenced by the contact P16 being in its normally closed condition, the DO relay will pick up in response to the detection of interference with the door operating mechanism, as evidenced by the DOX2 contact being closed. When the DOX2 contact is closed, it picks up the door opening by safety devices and door time transfer SER relay, which in turn closes the contact SER3 enabling the DOX2 contact to pick up the DO relay.

The door open button, safety edge and photoelectric relay indication DOX relay detects interference with the door operating mechanism by being energized whenever the door open button or the auxiliary car station door open button, provided the car is not operating with an attendant as evidenced by the AT11 contact being in its normally closed position, are pressed.

Also, the DOX relay is picked up when the photoelectric door control EE relay (Fig. 23) detects an object passing through or positioned in the way of the doors of the car, as evidenced by the EE2 contact being closed. Also, when the car is not operating with an attendant, as evidenced by the AT11 contact being in closed condition, interference with the safety edge of the car will pick up the DOX relay. In some installations, it is preferred to have the safety edge operative at all times whether with or without attendant operation.

When the DO relay picks up, it closes contact DO9 (Fig. 19) which picks up the door operator master pilot relay DE, provided the car is not traveling at intermediate speed as evidenced by the contact K3 being in its normally closed condition, and the car is positioned within the door zone of the particular floor at which it is to stop, as evidenced by the contact EZ2 being closed.

The DE relay closes the normally opened contact DE2 in the energizing circuit for the door operator opening power relay O, which is picked up provided the interlocked contact SH1 is in its normally closed condition, and remains energized until the door reaches its fully opened position, at which time the mechanically operated limit switch "DOL" opens. If the car is not operating with an attendant, as evidenced by the contact AT8 being in its normally closed condition, the O relay seals itself in by means of contact O1 until the "DOL" mechanical limit switch opens. Thus, when the car door starts to open, when the car is operating without an attendant, it will fully open before it can be closed. On the other hand, when the car is operating with an attendant the O relay can be dropped out, before the door reaches the fully opened position. The "DOL" relay indicates when the door is in the fully opened position by being energized at all times except when the "DOL" mechanical limit switch contact opens.

The door timer TD may take any suitable conventional form, wherein the operation of the timer is initiated by the completion of a circuit between two terminals, i. e. 280 and 281, and the duration of the time interval provided by the timer may be controlled by the amount of resistance placed across the two terminals i. e. 282 and 283. The operation of the door timer TD (Fig. 18) is initiated when a connection is completed between terminals 280 and 281. When the car is not moving, as evidenced by the normally closed contact P11 being closed; the car is operating without an attendant, as evidenced by the normally closed contact AT7 being closed; the DO relay is picked up, as evidenced by the contact DO7 being closed; the door closed protective time initiating and sequence SHXA relay not having been picked up, as evidenced by the SHXA1 contact being in its normally closed condition; and no object being detected by the EE relay as evidenced by the EE1 contact being in its normally closed condition, a circuit is completed between terminals 280 and 281 thereby initiating the timing operation of the TD door timer.

If the car has stopped at a floor intermediate the dispatching floors or at the dispatching floors when it is not selected as the next car to be dispatched, from the dispatching floor, or at the basement floor, a long door time interval, preferably on the order of 4 to 6 seconds, is provided by the TD timer, since resistance 284 is placed across terminals 282 and 283 by means of the normally closed contact NXA1, normally closed contact SHXA1, and normally closed contact SER1. Assuming that no passengers pass in or out of the car and no interference is made with the operation of the car doors, as evidenced by the DOX relay staying deenergized and the door opening by safety devices and door time transfer SER relay staying deenergized, the TD timer will operate to open the TD2 contact (Fig. 20) dropping the DO relay, which in turn opens contact DO9 dropping the DE relay restoring the contact DE3 in the energizing circuit for the door operator shutting power relay SH. When that occurs, the SH relay picks up through the interlock normally closed contact O2, the SAF1 contact which will be closed, as long as the bus 300, 301 is energized and the stop switches (Fig. 20) are closed, the DE3 normally closed contact and the "DCL" mechanical limit switch, which opens when the doors are fully closed to drop out the SH relay at that time.

The O and SH relays energize respectively the door operator opening power circuits and door operating shutting power circuits (Fig. 24), which may take any suitable conventional form, by means of respective contacts O3 and SH2.

During the closing operation of the door, when the door is within a few inches of being closed, the "SCL" mechanical limit switch closes picking up the door operator closing check indication SCL relay, which in turn opens contact SCL1 to drop out the door close limit indication DCL relay, thereby indicating that the car door is closed or almost closed.

If the door operation is interfered with as detected by the operation of the DOX relay, the SER relay picks up through the DOX2 contact and opens the SER1 contact and closes the SER2 contact, thereby transferring the time interval control of the TD timer from the long door time influenced by the resistor 284 to a short door time influenced by resistor 285, preferably on the order of two seconds. The resistor 285 is placed across the terminals 282 and 283 through normally closed contacts NXA1, SHX1, and now closed contact SER2 and a normally closed contact DOL3 which is in its normally closed condition when the doors are fully opened. In that way, when passengers enter or leave the car or the operation of the door operating mechanism is interfered with in any way, the door timer automatically switches from a long door time interval to a short door time interval.

If the doors are not fully opened, as evidenced by the DOL4 contact being closed; the car is not moving, as evidenced by the P12 contact being in its normally closed condition; but the car doors are not within the few inches of being closed necessary to operate the "SCL" mechanical limit switch, as evidenced by the DCL4 contact being closed; the SHX door close protective time initiating relay will pick up when the DE relay drops out closing the contact DE1. When the SHX relay picks up, it opens contact SHX1 and closes contact SHX2 placing door protective time resistance 286 across terminals 282 and 283 through the normally closed contact NXA1. The door protective time resistance is preferably set to provide a timing interval of five seconds for the TD timer. When the SHX relay picks up, it closes contact SHX3 picking up the door close protective time initiating and sequence SHXA relay. The SHXA relay opens contact SHXA1 and closes contact SHXA2 in the initiating circuit for the TD timer.

Since the DO relay drops out before the DE relay drops out under the above described conditions necessary to the operation of the SHX relay, contact DO8 is in its normally closed condition and the initiating circuit for the TD timer is complete. When the SHXA relay picks up, it also closes contact SHXA3 enabling the door re-opening from door close protective timer DOP relay to be picked up, provided the contact TDA1 is closed. When the TD timer is operated, it closes contact TD1 picking up the door timer-sequence TDA relay, closing the contact TDA1. A further timing sequence step is completed when the TDA relay closes contact TDA2 picking up the door timer-sequence TDB relay. A still further timing sequence is completed when the TDB relay closes contact TDB1 picking up the door timer sequence operator TDC relay.

When the DOP relay picks up, it closes contact DOP2 (Fig. 20), which in turn picks up the DO relay, provided the car is not moving as evidenced by the P16 contact being in its normally closed condition, and causes the doors to be re-opened. When that occurs, the initiating circuit for the TD timer is temporarily interrupted to insure that the contact TD2 will be in its normally closed condition to permit the DO relay to seal itself in by means of the DO10 contact. The temporary interruption in the initiation of the TD timer is accomplished by the combination of contacts DO7, DO8, SHXA1, and SHXA2.

If the car is selected as the next car to be dispatched from either of the dispatching floors, as evidenced by either the NDA4 contact or the NUA4 contact (Fig. 6) being closed, the next signal-sequence NXA relay individual to the car will be picked up, provided the SUA or SDA relays for the car have not been picked up as evidenced by the SUA10 contact being closed or the SDA16 contact being closed, which will cause the signal for either direction SUDA (Fig. 20) relay to pick up as evidenced by the SUDA1 contact being in its normally closed condition; and the door timer-sequence operator TDC relay has not picked up to cause the TDC1 contact to open; and further provided that the car is not positioned at the basement floor, as evidenced by the BPI2 contact being in its normally closed condition.

When the NXA relay picks up it opens the NXA1 contact disabling the door protective time circuit, the long door and short door time circuits. However, the NXA2 contact is closed placing resistor 287 which is preferably set for a twenty second terminal door time interval across the terminals 282 and 283. The terminal door time interval provided by the TD timer operates to enable the car doors to be closed at the end of that interval, if they have not been previously closed by the operation by the attendant of start button (Fig. 20) or the NXA relay has not been dropped by the operation of the SUA or SDA relays individual to the the cars.

However, if at the time that the operation of the TD timer causes the DO relay to drop out, the car is still selected as the next car to be dispatched from the bottom terminal floor, as evidenced by the NXT2 contact being closed (Fig. 19) in the energizing circuit for the DE relay, the car doors will remain open, provided that the motor-generator set for at least one of the cars operating in the system under the control of the dispatching and control system is running, as evidenced by the FILB7 contact being in its normally closed condition.

It is also noted that while the initiating circuit for the TD timer is normally inoperative when the car is operating with an attendant, because of contact AT7, or when the EE relay is energized, as evidenced by the EE1 contact, neither condition affects the initiating circuit for the TD timer when the car is selected as the next car to be dispatched in the up direction and the NXA relay is picked up, closing contact NXA3 in the initiating circuit for the TD timer. When the NXA3 contact is closed, the only requirement for the initiating of the TD timer is that the P11 contact be closed indicating that the car is not moving.

Further, in addition to the above described sequence in operation of the TD, TDA, TDB, and TDC relays, when the car is selected as the next car to be dispatched, as evidenced by the contact NXT1 being closed, a holding circuit for the TDB and TDC relays is provided by a TDB2 contact. Also, if the SAF relay (Fig. 20) is dropped out, because of the operation of the stop switch, the doors of cars cannot be shut until the motor-generator set for the particular car is shut down, as evidenced by the MG1 contact shunting the SAF1 contact in its normally closed condition.

Figures 18A, 19A:
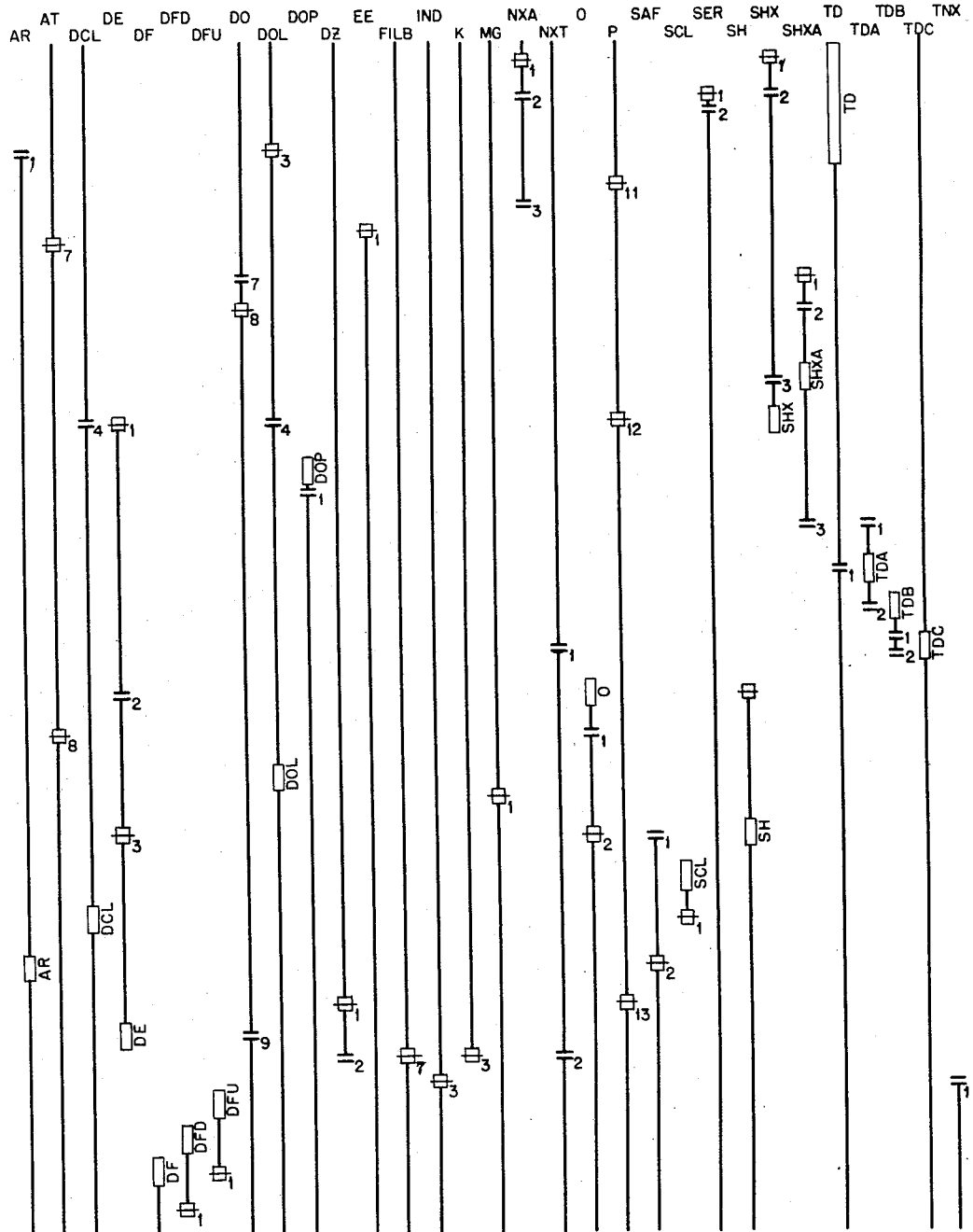
Figures 18, 19:
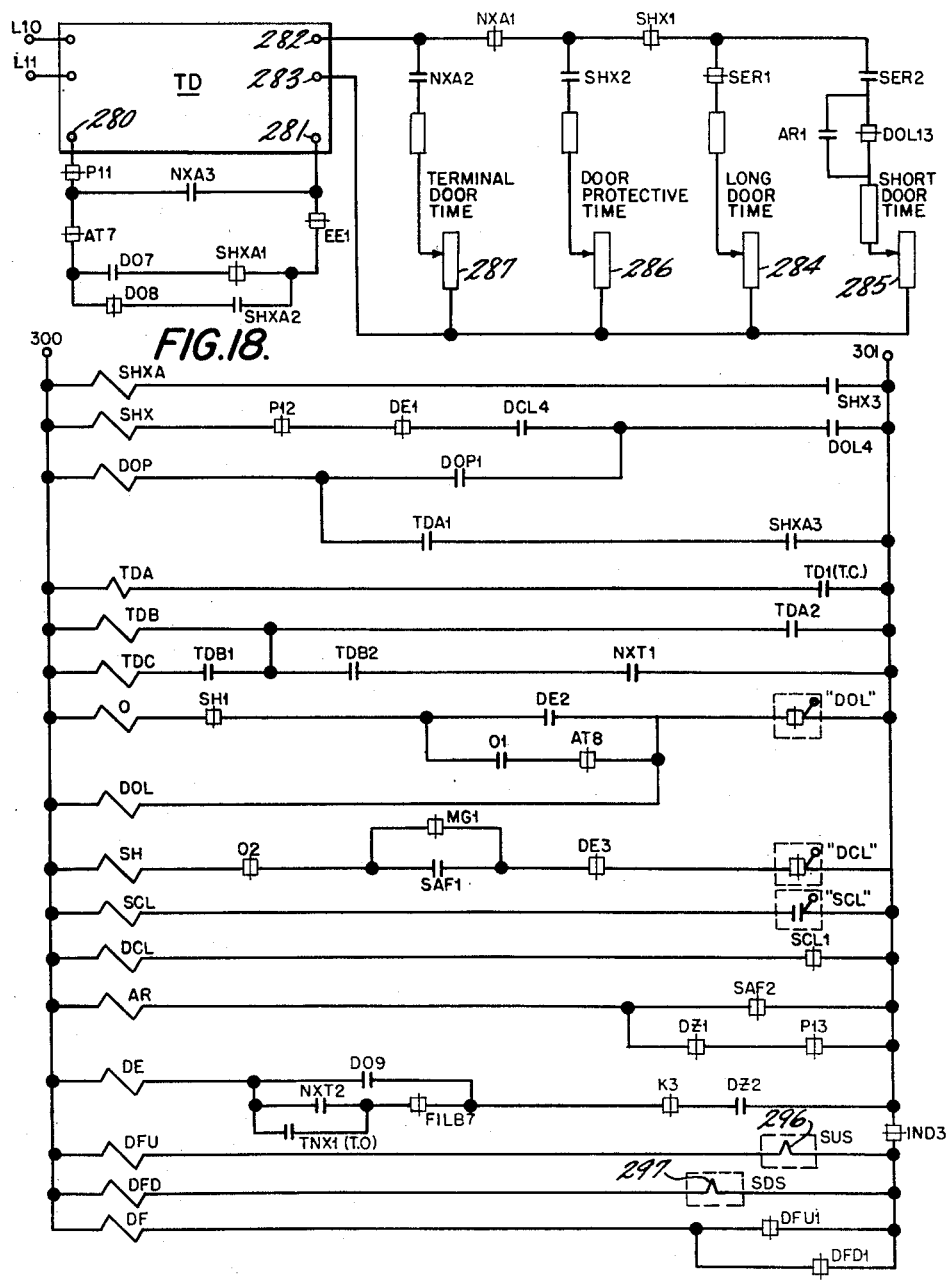

When a car is operating without an attendant, as evidenced by the AT17 contact being in its normally closed condition (Fig. 23), it is desirable to provide an additional small interval of time after a car loses its selection as the next car to be dispatched from the dispatching floor before the car doors are closed. Accordingly, the NXT4 contact, which is closed when the car is selected as the next car to be dispatched, energizes the TNX timing for delayed door closing after loss of next signal relay, which closes contact TNX1 shunting contact NXT2 in the energizing circuit for the DE relay (Fig. 19). When the car loses its selection as the next car, the TNX relay starts to drop out but maintains the TNX1 contact closed for the small interval of time.

Figure 12:
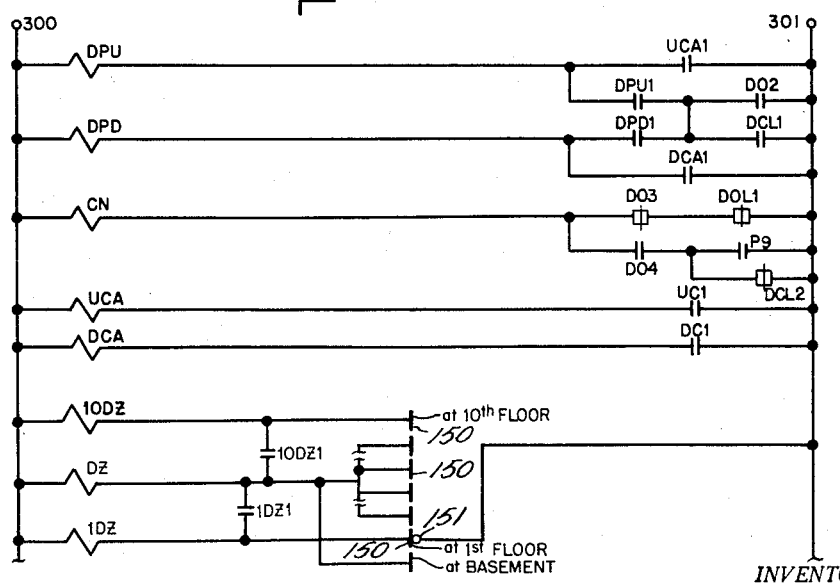
Figs. 12 and 13 are electrical schematic diagrams of control and position indicating circuits individual to the cars.
Figures 11A, 12A:
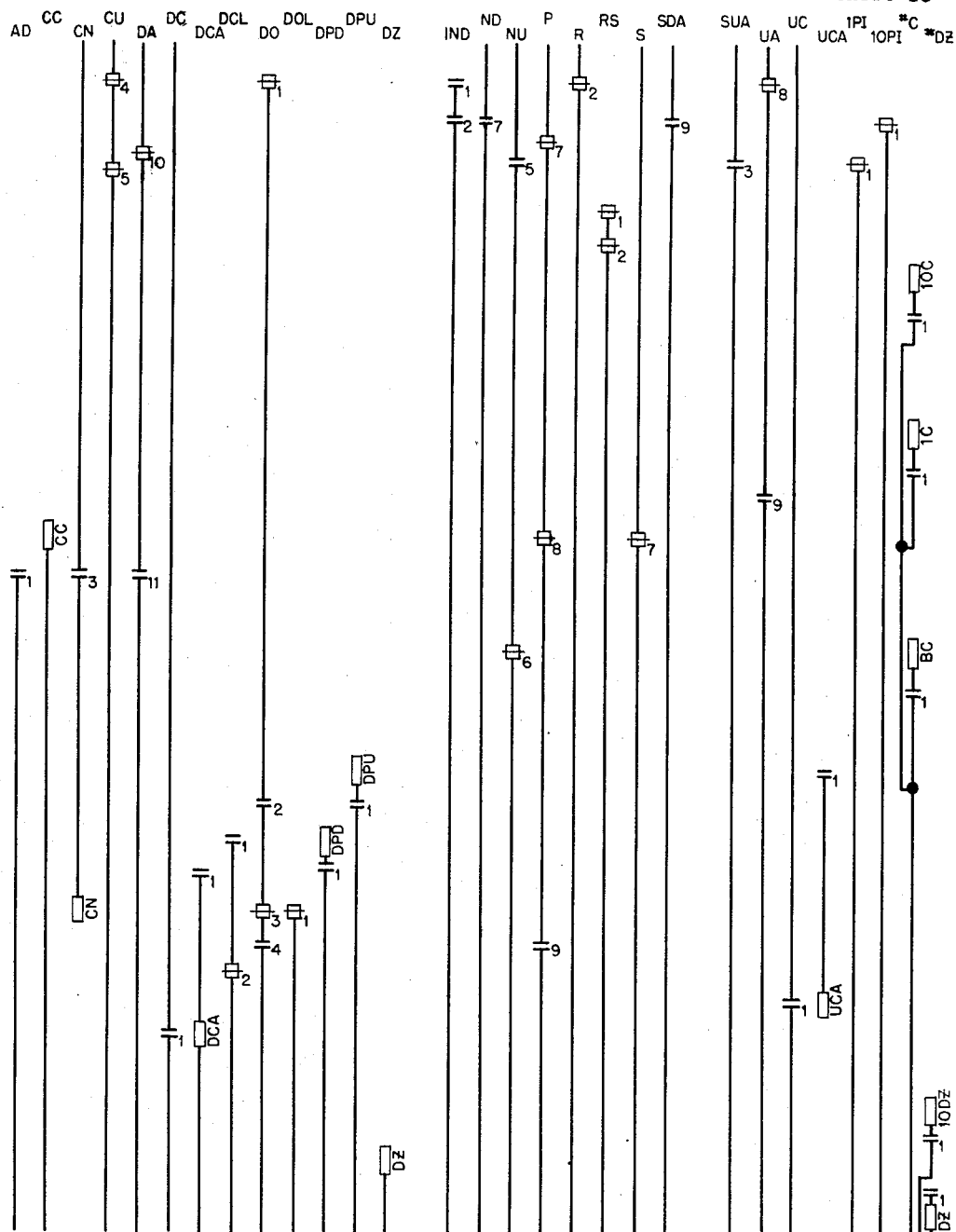

When a car stops at a floor in response to picking up a hall call which is registered for a particular direction of travel, it is desirable to maintain the car set for that direction for at least a predetermined interval of time. Accordingly, suitable direction preference maintaining circuits should be provided, such as the circuits controlling the operation of the directional preference-up DPU and directional preference-down DPD relays (Fig. 12). If a car stops in response to the operation of a UC relay, the UCA relay will be operated and closed, contact UCA1 picking up the directional preference-up DPU relay, which seals itself in by closing normally open contact DPU1, provided the door open signal DO relay is picked up as evidenced by the DO2 contact being closed, or the door is open or at least more than a few inches from being closed, as evidenced by the DCL1 contact being closed. Thus, the DPU relay will remain picked up during the period that the door is open, remains open and starts to close until the door arrives within a few inches of being closed.

One effect of the DPU relay operation is to close the DPU2 contact in the energizing circuit for the SUA relay. The DPU2 contact is in shunt relation around the SDS1 contact, thereby preventing the down direction electronic dispatching relay from causing the car to change its direction setting to the down direction during the time that the direction preference is maintained by the DPU relay. The direction preference-down DPD relay operates in substantially the same manner, picking up when the car stops in response to the operation of the DC relay and remains picked up until the doors have been opened and the doors are returning to within a few inches of the closed position.

The DPD relay performs its direction preference maintenance function by opening a contact DPD2 in the energizing circuit for the HD relay.

During the above descriptions of the various operating features of the invention, reference had been made to the operation of the UC, DC, and CC relays which pick up demands for service at particular floors. When a car arrives at a particular floor and stops thereat in response to the operation of the UC, DC, or CC relays it is necessary to both cancel the service demand registration and drop out the call pick up relay. This is accomplished by the call cancelling CN relay (Fig. 12) which controls contacts CN1, CN2 and CN3 in shunt relation around the relays UC, DC and CC, respectively. When the DO relay is picked up in response to the operation of the call pick up relays, the contact DO4 is closed permitting the CN relay to be picked up through the P9 contact which will be closed as long as the car is moving. Before the car stops and the doors start to open, the DCL relay is dropped out and the DCL2 contact is closed. As the doors start to open, the DCL2 contact will open thus permitting hall calls to be registered at that floor while the car is positioned thereat. When the DO relay drops out the DO3 contact is closed and the CN relay is energized as long as the doors are in their fully opened position.

The actual cancelling operation is a result of the appropriate CN contact shorting out the respective car or hall call relay and also the floor down hall call, floor up hall call, or floor car call relay, thus cancelling the registration of the demand for service. Thus, advance cancelling is provided for car and hall calls as a car approaches and starts to stop at the floor for which the car is registered, and also for additional calls that have been registered while the car is stopped at the floor before the car leaves the floor. Further, by virtue of the DCL2 contact, if a car is at a floor with its doors closed when the DO relay is picked up, the CN relay will pick up through the DCL2 normally closed contact.

The actual stopping of the car is also accomplished by the CA relay (Fig. 21) picking up when the car is traveling in the up direction, as evidenced by the contact UA21 being closed, and brush 290 contacts 10th floor contact segment 291; or the car is traveling in the down direction, as evidenced by contact DA19 and brush 292 contacts the basement floor contact segment 293. When the CA relay picks up, it drops out the SU or SD relay, whichever is energized, causing the car to be stopped. Also, if a car is traveling in the up direction, evidenced by the UA20 contact being closed; and the SUA11 contact closes, in response to the car losing its up direction setting; the car will be stopped at the next available floor when brush 290 contacts the appropriate floor contact segment 294. Similarly, if the car is traveling in the down direction, as evidenced by the DA18 contact being closed, and the SDA relay has dropped out, closing contact SDA17, the car will be stopped at the next available floor when the brush 292 contacts the appropriate floor contact segment 294.

When the CA relay picks up, it seals itself in by contact CA2, if the car is moving, as evidenced by the contact P18 being closed. Otherwise, the CA relay seals itself in by the contact CA3 being closed under the conditions when the car is traveling in one direction and is not set to travel in that direction, and when the DO relay is picked up, as evidenced by the DO11 contact being closed. Further, if the car is not moving, as evidenced by the P19 contact being in its normally closed condition, the CA relay will pick up in response to the operation of the DO relay closing the contact DO11.

If a car is operating under the control of the dispatching and control system, as evidenced by contact SS22 (Fig. 17) being closed; the car doors are fully open, as evidenced by the contact DOL2 being closed; the car is operating without an attendant, as evidenced by the contact AT4 being closed; the door interference signal timer TDX relay will pick up, provided a continuous interference with the door operating mechanism is detected by the DOX relay, as evidenced by the DOX1 contact being closed for a predetermined interval of time, such as 15 seconds.

When the TDX relay picks up after the predetermined interval of time, it closes the contact TDX1 picking up the door interference signal DX relay, which opens the DX3 contact, dropping out the TDX relay. However, the DX relay seals itself in through the DX4 contact. When the DX relay has picked up, a door buzzer in the car is operated, as long as the interference with the door operating mechanism continues. If desired, the door buzzer can be made inoperative when the car is positioned at the first floor by means of a normally closed contact 1PI2.

When the car is positioned at either of the terminals, and the appropriate SUA or SDA relay is energized to dispatch the car in the appropriate direction, the operation of the DX relay at the end of the predetermined time interval of continuous interference with the door operating mechanism closes a contact in series with the direction setting relay contact, thereby picking up the next up or down signal cancelling relay and dropping out the terminal indication. For example, when the car is at the top terminal floor, and the SDA relay has picked up closing contact SDA14 (Fig. 15), but the doors are held open for the predetermined time interval, the DX1 contact will close and pick up the NDC relay opening the NDC2 contact and dropping out the PT relay. When the PT relay drops out, the car will lose its selection as the next down car. However, it will still be in operation under the control of the dispatching and control system.

If the interference with the door operating mechanism continues, as evidenced by the contact DOX2 (Fig. 20), the failure to start timer TOS will be energized through a normally closed contact OS1; normally closed contact P17, indicating that the car is not moving; normally closed contact SUDA2, which will be closed if the SUA or SUDA relays have not picked up; and the SAF4 contact which will be closed, as long as the stop switches are closed. After a predetermined time interval of say 45 seconds, the TOS relay will cause the TOS1 contact to close, causing the OS failure to start signal relay to pick up. The OS relay drops out the TOS relay by opening contact OS1 and seals itself in by closing contact OS2.

If the SUA or SDA relays for a car are operated, as indicated by the SUDA3 contact being closed, for a time interval sufficient for the TOS relay to time out, the OS relay will also be picked up. In either case when the OS relay picks up, the normally closed contact OS3 will open dropping out the SS in service indication relay, automatically taking the car out from under the control of the dispatching and control system. When the condition causing the car to be taken out of service is abated, or is corrected, the OS relay will drop out and the SS relay will be picked up restoring the car to operation under the control of the dispatching and control system.

When the car is not operating on independent service, as indicated by the IND3 contact being in its normally closed condition (Fig. 19), an indication is provided as to the operability of the electronic dispatching relays. For example, elements 296 and 297 in the SUS and SDS relays respectively may be responsive to voltage or current conditions in the respective dispatchers or may be connected in series with filaments of various electron tubes in the electronic dispatching relays. Failure of the dispatcher is indicated when the element 296 opens, interrupting the energization of the dispatcher failure-up DFU relay. Similarly, if element 297 is interrupted in the dispatcher relay SDS, the DFD dispatcher failure-down relay will drop out. In either case, the dispatcher failure DF relay will pick up in response to the closing of the respective contact DFU1 or DFD1.

When a car is operating without an attendant, and the dispatching relays individual to the car fails, it is desirable to take the car out of service if that condition obtains for a predetermined interval of time. Accordingly, the contact DF1, which is adapted to be closed when the DF relay picks up, is placed in series with a contact AT10, which is normally closed when the car is not being operated with an attendant, in the energizing circuit for the TOS and OS relays (Fig. 20), so that if either or both the SUS or SDS dispatching relays fail and they remain in that condition for the predetermined interval of time established by the TOS relay, the car will be automatically taken out from under the control of the dispatching and control system.

*Preferred service operation*

When preferred service demand indicating means are operated at one or more of the floors, it is desirable to immediately select one of the cars that is operating under the control of the dispatching and control system and is in the best position to serve the demands for preferred service as a preferred service operation car. Accordingly, when one or more of the floor down preferred service call DW relays operate, the corresponding DW4 contact is closed (Fig. 3). If a car, for example, car $a$ is operating under the control of the dispatching and control system, as evidenced by the contact SS8 being closed; the car is not set to by-pass floor calls, as indicated by the contact LS3 being in its normally closed condition; and no other one of the cars operating under the control of the dispatching and control system is selected as a down preferred service operation car, as evidenced by the LN3 contact respective to each of the other cars being closed; car $a$ will be selected as the down preferred service operation car, if it is selected as the next car to be dispatched from the upper dispatching floor, as evidenced by the contact ND3 being closed. The selection of the car for down preferred service operation is indicated by the energization of the LN relay individual to car $a$ and the operation of its corresponding contacts.

If car $a$ is not selected as the next car to be dispatched in the down direction but is the highest up traveling car, as indicated by the contact LWU2 being closed, and all the other conditions obtain, car $a$ will be selected for down preferred service operation and its respective LN relay will pick up. Further, if car $a$ is not selected as the next down car, and is not the highest up traveling car, but is the highest down traveling car, as indicated by the contact LWD1 being closed; and all of the cars operating under the control of the dispatching and control system are set for travel in the down direction, as indicated by the contact SDAM1 being in its normally closed condition; the car will be selected for down preferred service operation and its LN relay picked up, provided at least one down preferred service demand indicating means is operated at a floor below the car, as indicated by the contact DWB1 being in its normally closed condition.

As soon as the car is selected for down preferred service operation, the LN relay seals itself in by means of the contact LN3, and will maintain its selection for down preferred service operation as long as it does not become set to by-pass a floor, which would cause the LS3 to open; no preferred service demand indicating means is operated at a floor below the car when it is set to travel in or is traveling in the down direction, which would be indicated by the DWB1 contact opening; or a combination of all of the following conditions: the car is no longer set to travel in the down direction, which would be indicated by the SDA3 contact being opened; the car is not selected as the highest up traveling car, which would be indicated by the LWU2 contact being opened; and the car is not selected as the next car to be dispatched from the upper dispatching floor.

If a car has been selected for down preferred service operation, as indicated by contact LN9 (Fig. 17) being closed, the down peak anticipation defeat on preferred service car LNB relay is picked up. The LNB relay seals itself in by means of the LNB2 contact and remains held in until the car arrives at the 1st floor, as indicated by the normally closed contact 1PI3 opening.

If an up preferred service demand indicating means is operated at either the second or basement floors, as evidenced by the 2UW4 or BUW4 contacts closing, a car will be immediately selected for up preferred service operation and its respective LNU relay will be picked up if the car is operating under the control of the dispatching and control system, as evidenced by the SS7 contact being closed; the car is not set to by-pass a hall call, as evidenced by the LS2 contact being in its normally closed condition; the car is positioned above the 2nd floor, as evidenced by the DWBU1 contact being closed; the car is the lowest down traveling car, as indicated by the contact UW1 being closed; and no other one of the cars operating under the control of the dispatching and control system is selected for said up preferred service operation, as evidenced by the respective LNU4 contact being closed.

If the car is not the lowest down traveling car, but is the highest up traveling car and no car is positioned above the 2nd floor other than a car traveling in the up direction or if traveling above the 2nd floor a car is not set for down direction travel, and the other conditions obtain, the car will be selected as the up preferred service car and its respective LNU relay will be picked up. The indication that the car is the highest up traveling car is provided by contact LWU1 and the indication that no car is positioned above the 2nd floor other than a car traveling in the up direction or one not set for down direction travel, is provided by the normally closed contact SX1.

Further, if the car is selected as the next car to be dispatched in the down direction as evidenced by the contact NBU being closed, when no car is positioned above the 2nd floor other than a car traveling in the up direction or one not set for down direction travel, the next down selected car will be selected for up preferred service operation, provided the other conditions obtain.

If a car which is selected for up preferred service operation, as evidenced by the contact LNU4a of car a for example, being closed; is traveling in the down direction and is within the slow down zone for the 2nd floor, as evidenced by the contact F1 being closed; it will maintain its selection as the up preferred service car, as long as up preferred service demand indicating means are operated at floors below the 2nd floor, such as the basement floor.

If a car is selected for up preferred service operation, the contact LNU8 in the down preferred service selecting circuits for the particular car will be opened preventing the selection of the car as the down preferred service car, or if the car has already been selected as the down preferred service car causing the car to drop its selection.

When a car is loaded so that it by-passes a floor, it indicates that traffic conditions are becoming heavy in the direction of travel of the car and that peak conditions in that direction may be anticipated. Accordingly, means are provided in association with the down hall call registering means for causing a car operating under the control of the dispatching and control system, as evidenced by the contact SS1 being closed; traveling in the down direction, as evidenced by the contact DA1 being closed; not having its manual by-pass means operated by an attendant, as evidenced by the contact HP1 being in its normally closed condition; and not being then selected for down preferred service operation or had been selected for down preferred service operation during its travel on that particular down trip, even though no longer selected for preferred service operation, as evidenced by the LNB1 contact being in its normally closed condition; the brushes 298 and 299 contact special floor contacting segments 305 and 307, which are positioned respectively across the contacts DT1 and DW3, so as to cause the DW relay at the particular floor to be picked up if a down hall call is registered at that floor. Thus, a down preferred service demand indication is operated at the floor, even though the hall call had not been registered for the predetermined interval of time required by the DT timing relay, as long as the car had not been set to by-pass the floor by the manual operation of the attendant "pass" button and the car had not been previously during that trip operating as a down preferred service car. In that way, the act of by-passing the floor tends to set up conditions anticipating peak travel conditions in the down direction.

A somewhat similar circuit is provided for the 2nd floor up hall call circuit, whereby a car operating under the control of the dispatching and control system, as evidenced by the contact SS6 being closed; the car being positioned at a point just below the 2nd floor and traveling in the up direction, as indicated by the contact X1 being closed; and the car set to by-pass the floor either in response to the manual operation of the "pass" button by the attendant or because of load conditions in the car, as evidenced by the LS1 contact being closed; the 2UW floor up preferred service call relay will be picked up, as long as an up hall call is registered at the 2nd floor thereby causing an up preferred service demand indication to be operated at the 2nd floor.

When an up preferred service demand indication is operated anywhere in the system, the DWU relay (Fig. 2) will pick up and close the contact DWU1 energizing the DW relay. Similarly, the operation of a down preferred service demand indicating means at any of the floors in the installation will cause the DWD relay to be energized and close its DWD1 contact, picking up the DWD relay. In that way, the DW contacts in the traffic demand sensing means, Fig. 10, indicate the registration of up or down preferred service demands.

In operation when a car is selected for up preferred service operation and is traveling in the up direction, its UC relay (Fig. 1) will not respond to up hall calls registered above the 2nd floor, because of the LNU2 contact being opened. Also, when the up preferred service operating car is traveling in the down direction it will not respond to any down hall call even when a down preferred service demand indicating means is operated at the floor because of the LNU3 contact being open in the energizing circuit for the DC relay (Fig. 1).

Similarly, a car selected for down preferred service operation will not respond to any up hall calls registered when it is traveling in the up direction because of the contact LN1 in the energizing circuit for the UC relay being opened. Also, when a down preferred service car is traveling in the down direction, it will not respond to hall calls registered for the floor unless a down preferred service demand indication is operated at that floor, because of the LN2 contact being opened.

If the demands for service in the system are such that one or more of the cars are able to have their motor-generator sets shut down, they will remain at the dispatching floor at which they last arrived and park with their doors closed. Since the exciter voltage E relay will have dropped out, the contacts E1 in the energizing circuit for the NUA relay will be opened, so that even though a car will maintain the selecting position preempted by it on arrival at the floor, the car cannot be selected as the next car to be dispatched. However, if all of the cars at the particular dispatching floor have their motor-generator sets shut down, as evidenced by the MGB or MGT (Fig. 6) relays being dropped out for the particular dispatching floor, the cars positioned at the floors with their motor-generator sets shut down can be selected for dispatching from the floor because of the appropriate MGB1 or MGT1 normally closed contacts in shunt relation with their respective E1 or E2 contact.

Hall lantern operation

Figure 14:
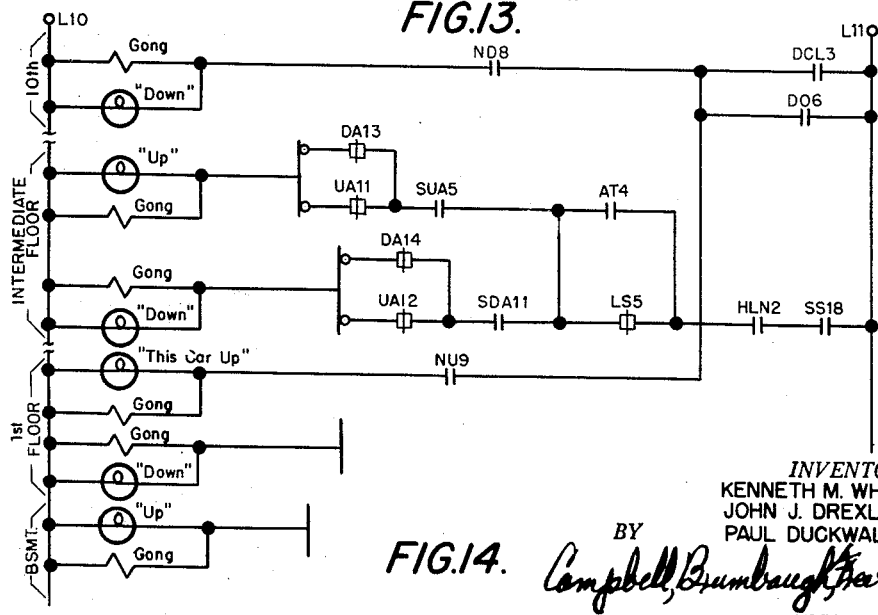
Fig. 14 is an electrical schematic diagram of a hall lamp indicating circuit.
Figures 13A, 14A:
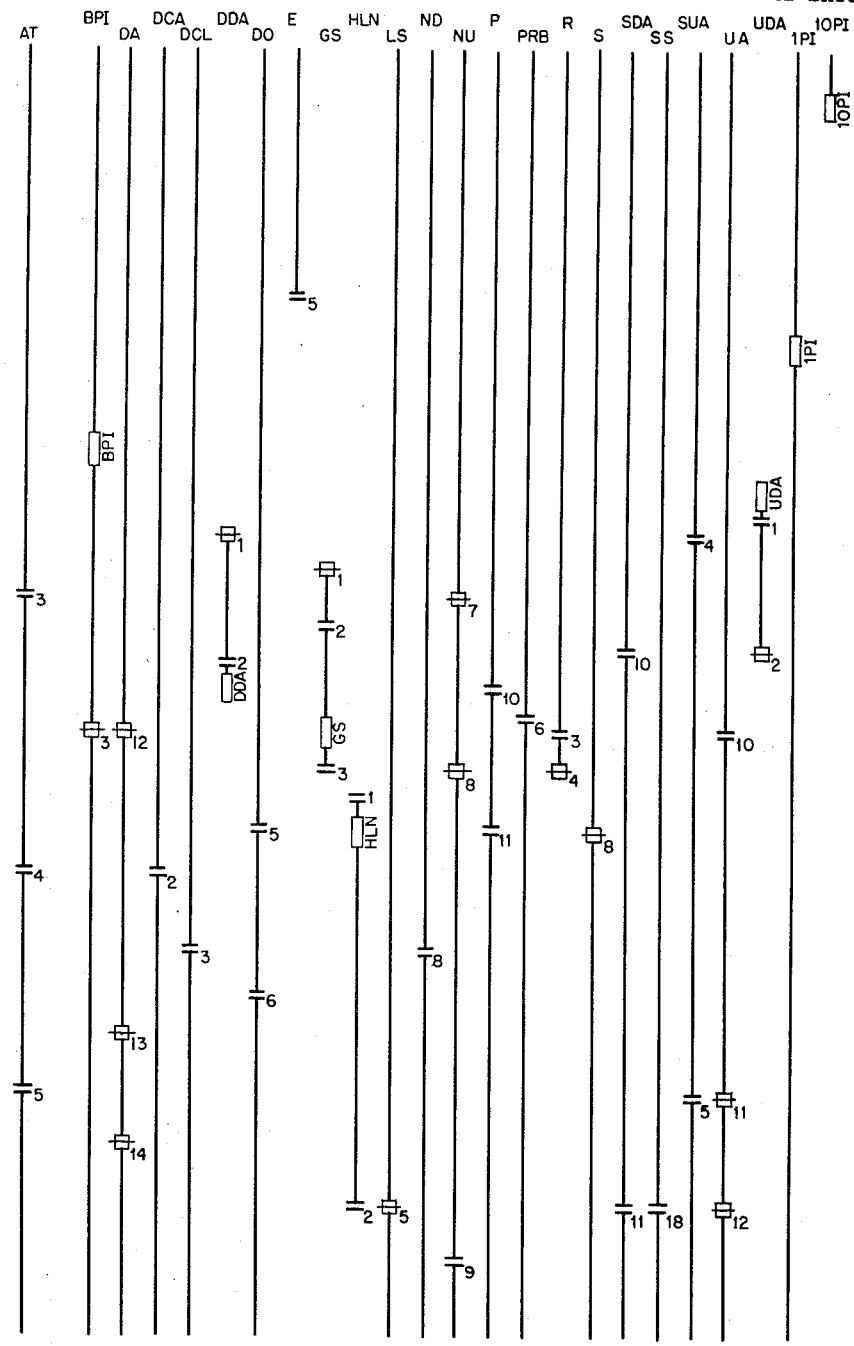

Up and down hall lanterns and corresponding gongs are positioned at each intermediate floor (Fig. 14) and the 1st floor. At the 10th floor, only a down direction lantern and corresponding gong is positioned. Similarly at the basement floor only an up direction hall lantern and gong is positioned. When a car is at the 1st floor and is selected as the next car to be dispatched from the 1st floor in the up direction, as evidenced by the contact NU9 being closed, and the door open signal DO relay is picked up, as indicated by the DO6 contact being closed, or the door is fully opened, as evidenced by the DCL3 contact being closed, the up hall lantern, which bears a legend "This Car Up" is illuminated, and the gong, which is preferably a single stroke gong is operated. Similarly, when a car is selected as the next down car at the upper dispatching floor, as evidenced by the contact ND8 being closed, the 10th floor down hall lantern and gong will be illuminated and operated, respectively, when the door open signal DO relay is picked up and when the doors are fully opened.

At all intermediate floors and at the basement floor, if a car is operating under the control of the dispatching and control system, as evidenced by the contact SS18 being closed; and the HLN relay is picked up as evidenced by the HLN2 contact being closed; the car is not set to by-pass the floor at which the call is registered, as evidenced by the contact LS5 being in its normally closed condition, except when the car is operating with an attendant, as evidenced by the contact AT4 being closed; and is set to travel in the down direction, as evidenced by the contact SDA11 being closed; the down direction hall lantern and accompanying gong will be operated either through the UA12 or DA14 normally closed contacts depending on the direction of travel of the car as it approaches the floor. For cars set to travel in the up direction as evidenced by the SUA5 contact being closed, the up hall lantern and gong at the intermediate floor will be energized through either the UA11 or BA13 normally closed contacts depending upon the direction of travel of the car.

The HLN hall lantern initiating signal relay is picked up when the DO door opening signal relay picks up, as evidenced by the DO5 contact being closed; the car is moving, as evidenced by the P11 contact being closed; but the S relay has been dropped out, evidenced by the S8 contact being returned to its normally closed condition, thereby indicating that the car is stopping at the particular floor. When the HLN relay picks up, it seals itself in to a contact HLN1. If the car is operating with an attendant, as evidenced by the contact AT3 being closed, it is not necessary that the DO relay be picked up as the car is stopped at the floor.

If the starting relay of the car is picked up to start the car to leave the floor and then for some reason the car remains at the floor, the S8 contact will open and then close, dropping out the HLN relay which will not be re-energized because the P11 contact will be opened. However, if the car is stopped from starting because of the operation of the DC down hall call relay, and the sequence operation of the DCA relay, as evidenced by the contact DCA2 being closed, the HLN relay will be re-energized, permitting a car which arrives at a floor traveling in the up direction to operate the up hall lantern at the floor for a first door interval, and then during a second door interval in which the car is set to travel in the down direction, the up hall lantern will be extinguished by the HLN relay dropping out and the down hall lantern will be picked up when the HLN relay is re-energized.

When a car is set to travel in the up direction, the up direction arrow (Fig. 13) will be illuminated and will remain illuminated as long as the car is traveling, in response to the up direction arrow holding UDA relay, which is sealed in by a contact UDA1 and a contact P10. When the car is stopped, the UDA up direction arrow will be picked up only when the car is set to travel in the up direction as indicated by the SUA4 contact. However, should a car while traveling in the up direction drop its SUA relay, opening the contact SUA4 and pick up its SDA relay, closing the contact SDA10 contact, the up direction arrow will remain operating until the car is stopped. If a car is set to travel in the down direction but is selected as the next car to be dispatched, the down direction arrow will drop out only when the car is not moving.

The start gong control GS relay controls the operation of the start gong through its contacts GS1 and GS2 and is picked up when the car is not at the basement floor, as indicated by the BP12 contact being in its normally closed condition; the car is not traveling in the down direction, as indicated by the contact DA12 being in its normally closed condition, or if it is traveling in the down direction the car is re-leveling as indicated by the normally closed contact R3; and the car is either selected for basement service operation, as indicated by the PRB6 contact being closed; or the car is moving but not re-leveling, as indicated by the R2 contact being closed, and is also traveling in the up direction, as indicated by the UA10 contact in series with R2 being in its normally closed condition. If the car is not selected as the next car to be dispatched in the up direction as evidenced by the contact NU8 being in its normally closed condition, the GS relay will seal itself in through contact GS3.

Under the full automatic operation on elevator cars it is important to be able to insure the correct operation of the car utilities, such as car lights and car fans. In Fig. 23, the car lights and car fan are energized across thee bus L10, L20 through appropriate car light switches and car fan switches, which may be located in the individual car. The car fan will be deenergized whenever the exciter voltage and safety circuits EM relay is dropped out as indicated by the EM3 relay. Otherwise, the various car utilities will be energized from the L10, L20 bus whenever any one of the following conditions obtain; the car is not at the 1st or 10th floors, as indicated by the normally closed contact 1DZ and 10DZ; the manual motor-generator switch indication is energized, as evidenced by the MG2 contact being closed, but the SAF relay has been dropped out as evidenced by the SAF6 contact being in its normally closed condition; the starting relay of the car is operated, as evidenced by the contact S9 being closed; the car is operating on independent service, as indicated by the contact IND6 being closed; when the car doors are opened, as evidenced by the DCL6 relay being closed; the exciter voltage and safety circuits are correctly operated, as indicated by the EM2 contact being closed; and when the power supply for the motor-generator set of the individual car fails, as indicated by the contact PF1 being in its normally closed condition. In that way, when there is a power failure of the motor-generator set, especially when the car might be located between floors or at a floor with its doors unable to be opened, at least the lights are maintained operative in the car, unless there is a failure of the individual elevator lighting supply as well as the power supply of the motor-generator means.

An alarm signal may be provided controlled by an alarm signal AR relay (Fig. 19) which is energized whenever the SAF relay is dropped out in response to the opening of the stop switches as indicated by the SAF2 contact being in its normally closed condition, or when the car is stopped, as indicated by the contact P13 being in its normally closed condition, but is not located within the door zone of any of the floors, as indicated by the DZ1 contact being in its normally closed position. When the AR relay is picked up, it closes a contact AR2 (Fig. 23) to operate a suitable alarm. A contact AR1 is also closed in shunt relation around the DOL3 normally closed contact (Fig. 18) in the short door time control circuit for the TD timer. In that way, the short door time control resistance 285 may be used to control the operation of the TD timer even when the doors are not fully opened.

Thus there has been provided a novel and improved fully automatic dispatching and control system for a bank of elevators operating between a plurality of floors, in which the cars may be operated without the need at any time of day or night of attendants in the cars or a starter at the lobby floor.

It will be understood by those skilled in the art, that the above described embodiments are meant to be merely exemplary and that they are susceptible of modification and variation without departing from the scope of the invention. For example, while the dispatching and control system has been described as controlling elevator cars operating under the control of an electrically driven motor-generator set, it will be evident that many of the aspects of the invention are equally applicable to the dispatching and control of other types of elevators such as hydraulic elevators. Further, it will be equally apparent that many of the various features disclosed in the exemplary embodiments are susceptible of use with a great variety of other types of control circuits and operating mechanisms. Therefore, it is contended that the invention is not deemed to be limited except as defined in the appended claims.

We claim:

1. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, and means responsive to said traffic demand sensing means for causing said dispatching means to dispatch a selected elevator car when said demand for travel by said elevator car is equal to or greater than a predetermined amount.

2. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, means responsive to said traffic demand sensing means for causing said dispatching means to dispatch a selected elevator car when said demand for travel by said elevator car is equal to or greater than a predetermined amount, and selectively operable means for causing said dispatching means to dispatch said selected elevator car when said demand for travel by said elevator car is less than said predetermined amount.

3. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, means responsive to said traffic demand sensing means for causing said dispatching means to dispatch a selected elevator car when said demand for travel by said elevator car is equal to or greater than a predetermined amount, and selectively operable means responsive to said traffic demand sensing means for causing said dispatching means to dispatch said selected elevator car when said demand for travel by said elevator car is less than said predetermined amount.

4. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, first control means responsive to said traffic demand sensing means for causing said dispatching means to dispatch a selected elevator car when said demand for travel by said elevator car is equal to or greater than a predetermined amount, means responsive to the selection of an elevator car for dispatching for enabling said first control means to cause said dispatching means to dispatch the selected elevator car, second control means responsive to said traffic demand sensing means for causing said dispatching means to dispatch said selected elevator car when said demand for travel by said elevator car is less than said predetermined amount, and selectively operable means for enabling said second control means to cause said dispatching means to dispatch said elevator car.

5. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, first control means responsive to said traffic demand sensing means for causing said dispatching means to dispatch a selected elevator car when said demand for travel by said elevator car is equal to or greater than a predetermined amount, selectively enabled second control means for causing said dispatching means to dispatch said selected elevator car when said demand for travel by said elevator cars is less than said predetermined amount, and timing means for enabling said second control means.

6. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, first control means responsive to said traffic demand sensing means for causing said dispatching means to dispatch a selected elevator car when said demand for travel by said elevator car is equal to or greater than a predetermined amount, selectively enabled second control means responsive to said traffic demand sensing means for causing said dispatching means to dispatch said selected elevator car when said demand for travel by said elevator cars is less than said predetermined amount, and timing means for enabling said second control means.

7. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, first control means responsive to said traffic demand sensing means for causing said dispatching means to dispatch a selected elevator car when said demand for travel by said elevator car is equal to or greater than a predetermined amount, selectively enabled second control means responsive to said traffic demand sensing means for causing said dispatching means to dispatch said selected elevator car when said demand for travel by said elevator cars is less than said predetermined amount, and timing means initiated upon the selection of a car by said selecting means for enabling said second control means at the end of a predetermined time interval.

8. A dispatching and control system for a plurality of elevator cars, comprising dispatching means for controlling the dispatching of an elevator car from a given floor, selecting means for selecting a car to be dispatched from said given floor, traffic demand sensing means responsive to the demand for travel by said elevator cars, first control means responsive to said traffic demand sensing means for causing said dispatching means to dispatch a selected elevator car when said demand for travel by said elevator car is equal to or greater than a predetermined amount, selectively enabled second control means responsive to said traffic demand sensing means for causing said dispatching means to dispatch said selected elevator car when said demand for travel by said elevator cars is less than said predetermined amount, and timing means individual to each elevator car and initiated upon the selection of its respective elevator car by said selecting means for enabling said second control means at the end of a predetermined time interval.

9. A dispatching and control system for a plurality of elevator cars, comprising selecting means for selecting one of said plurality of cars to be dispatched from a given floor and means individual to each of said plurality of cars including dispatching means for controlling the dispatching of a respective elevator car from said given floor, traffic demand sensing means responsive to demand for travel by said plurality of elevator cars, first control means responsive to said traffic demand sensing means for causing said dispatching means to dispatch said respective elevator car, provided said respective elevator car has been selected by said selecting means, when said demand for travel by said elevator car is equal to or greater than a predetermined amount, selectively enabled second control means responsive to said traffic demand sensing means for causing said dispatching means to dispatch said selected elevator car when said demand for travel by said elevator car is less than said predetermined amount, and timing means initiated upon the selection of said respective elevator car for enabling said second control means.

10. A dispatching and control system for a plurality of elevator cars, comprising selecting means for selecting one of said plurality of elevator cars to be dispatched from a given floor and means individual to each of said elevator cars including starting means, dispatching means for controlling the operation of said starting means at said given floor, traffic demand sensing means responsive to demand for travel by said elevator cars, first control means responsive to said traffic demand sensing means for operating said dispatching means when said demand for travel by said elevator cars is equal to or greater than a predetermined amount, selectively enabled second control means responsive to said traffic demand sensing means for controlling said dispatching means when said demand for travel by said elevator cars is less than said predetermined amount, and timing means initiated upon the selection of said respective car by said selecting means for enabling said second control means.

11. A dispatching and control system for a plurality of elevator cars, comprising dispatching means for controlling the dispatching of an elevator car from a given floor, selecting means for selecting a car to be dispatched from said given floor, traffic demand sensing means responsive to demand for travel by said elevator cars, means responsive to said traffic demand sensing means for causing said dispatching means to dispatch a selected elevator car when said demand for travel by said elevator car is equal to or greater than a predetermined amount, and means for causing said dispatching means to dispatch said selected elevator car when said demand for travel by said elevator cars is equal to or greater than a lesser predetermined amount.

12. A dispatching and control system for a plurality of elevator cars, comprising selecting means for selecting one of said plurality of elevator cars to be dispatched from a given floor, in the order of arrival of the cars at said given floor, and means individual to each of said plurality of cars including starting means, dispatching means for controlling the operation of said starting means of a respective elevator car from said given floor, traffic demand sensing means responsive to demand for travel by said elevator cars, first control means responsive to said traffic demand sensing means for controlling said dispatching means when said demand for travel by said elevator cars is equal to or greater than a predetermined amount, selectively enabled second control means responsive to said traffic demand sensing means for controlling said dispatching means when said demand for travel by said elevator cars is equal to or greater than a lesser predetermined amount, and timing means initiated upon the selection of said respective car by said selecting means for enabling said second control means at the end of a predetermined time interval.

13. A dispatching and control system for a plurality of elevator cars, comprising selecting means for selecting one of said elevator cars to be dispatched from a given floor, in the order of arrival of said cars at said given floor, means for registering demands for service by said elevator cars and means individual to each of said plurality of elevator cars including starting means, dispatching means for operating said starting means at said given floor, provided there is a demand for service affecting at least one car in the bank, traffic demand sensing means responsive to said demands for service, first control means responsive to said traffic demand sensing means for controlling said dispatching means when said demands for service by said elevator cars are equal to or greater than a predetermined amount, selectively enabled second control means responsive to said traffic demand sensing means for controlling said dispatching means to dispatch said respective elevator car when said demands for service by said elevator cars are equal to or greater than a lesser predetermined amount.

14. A dispatching and control system for a plurality of elevator cars, comprising means for registering demands for service by said elevator cars, means for indicating the position and direction of travel of each of said cars, selecting means for selecting one of said plurality of elevator cars to be dispatched from a given floor, dispatching means for controlling the dispatching of a selected elevator car from said given floor, traffic demand sensing means responsive to the position and direction of travel of each of said cars and responsive to demands for service by said elevator cars, means responsive to said traffic demand sensing means for causing said dispatching means to dispatch said selected elevator car when said demands for service are equal to or greater than a predetermined amount, and selectively enabled means for causing said dispatching means to dispatch said selected elevator car when said demands for service are equal to or greater than a lesser predetermined amount.

15. A dispatching and control system for a plurality of elevator cars operating in a bank, comprising means for registering demands for service by said cars, means for indicating the position and direction of travel of each of said elevator cars operating in said bank, selecting means for selecting in the order of their arrival at a given floor one of said plurality of cars operating in said bank as the next car to be dispatched from said given floor, and means individual to each of said cars operating in said bank including starting means, dispatching means for operating said starting means at said given floor, provided there is a demand for service registered which affects at least one car in the bank, traffic demand sensing means responsive to the position and direction of travel of each of said elevator cars operating in the bank and responsive to demands for service by said elevator cars, first control means responsive to said traffic demand sensing means for controlling said dispatching means when said demands for service by said elevator cars are equal to or greater than a predetermined amount, selectively enabled second control means responsive to said traffic demand sensing means for controlling said dispatching means when said demands for service by said elevator cars are equal to or greater than the lesser predetermined amount, and timing means initiated upon the selection of a car by said selecting means for enabling said second control means.

16. A dispatching and control system for a plurality of elevator cars operating in a bank, comprising selecting means for selecting one of said plurality of cars to be dispatched from a given floor, means for registering demands for service by said cars, and dispatching means for causing a car selected by said selecting means to be dispatched from said given floor and operable when said demands for service are equal to or greater than a predetermined amount.

17. A dispatching and control system for a plurality of elevator cars operating in a bank, comprising selecting means for selecting one of said plurality of cars to be dispatched from a given floor, means for registering demands for service by said cars, dispatching means for causing a car selected by said selecting means to be dispatched from said given floor and operable when said demands for service are equal to or greater than a predetermined amount, and selectively enabled means for varying the amount of service demand necessary to operate said dispatching means.

18. A dispatching and control system for a plurality of elevator cars operating in a bank, comprising selecting means for selecting one of said plurality of cars to be dispatched from a given floor, means for registering demands for service by said cars, dispatching means for causing a car selected by said selecting means to be dispatched from said given floor and operable when said demands for service are equal to or greater than a predetermined amount, selectively enabled means for varying the amount of service demand necessary to operate said dispatching means, and timing means initiated when said car is selected by said selecting means for enabling said service demand varying means.

19. A dispatching and control system for a plurality of elevator cars operating in a bank, comprising selecting means for selecting one of said plurality of cars to be dispatched from a given floor, means for registering demands for service by said cars, dispatching means for causing, provided a demand for service has been registered affecting at least one of said plurality of cars, a car selected by said selecting means to be dispatched from said given floor and operable when said demands for service are equal to or greater than a predetermined amount, and selectively enabled means for varying the amount of service demand necessary to operate said dispatching means.

20. A dispatching and control system for a plurality of elevator cars operating in a bank, comprising selecting means for selecting one of said plurality of cars to be dispatched from a given floor, means for registering demands for service by said cars, dispatching means for causing, provided a demand for service has been registered affecting at least one of said plurality of cars, a car selected by said selecting means to be dispatched from said given floor and operable when said demands for service are equal to or greater than a predetermined amount, selectively enabled means for varying the amount of service demand necessary to operate said dispatching means, and timing means initiated upon the selection of said cars by said selecting means to enable said service demand varying means at the end of a predetermined interval of time.

21. A dispatching and control system for a plurality of elevator cars operating in a bank between a plurality of floors, comprising selecting means for selecting one of said plurality of cars to be dispatched from a given floor, means at floors other than at said given floor operable by intending passengers for registering demands for service, dispatching means for causing a car selected by said selecting means to be dispatched from said given floor and operable when a plurality of said demands for service are registered, and selectively enabled means for causing the operation of said dispatching means when one or more of said demands for service are registered.

22. A dispatching and control system for a plurality of elevator cars operating in a bank between a plurality of floors, comprising selecting means for selecting one of said plurality of cars to be dispatched from a given floor, means at floors other than at said given floor operable by intending passengers for registering demands for service, dispatching means for causing a car selected by said selecting means to be dispatched from said given floor and operable when a plurality of demands for service are registered, timing means, and means responsive to the operation of said timing means at the end of a predetermined interval of time for enabling the operation of said dispatching means when one or more of said demands for service are registered.

23. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, dispatching means for causing a car selected by said selecting means to be dispatched from said given floor and operable when a plurality of demands for service are registered at floors between said given floor and another one of said plurality of cars positioned away from said given floor, and selectively enabled means for causing said dispatching means to be operable in response to the registration of one or more of said demands for service registered at floors between said given floor and said other car.

24. A dispatching and control system for a plurality of elevator cars operating in a bank between a plurality of floors, comprising selecting means for selecting one of said plurality of cars to be dispatched from a given floor, means at said floors other than said given floor operable by intending passengers for registering demands for service, dispatching means for causing a car selected by said selecting means to be dispatched from said given floor operable when a plurality of demands for service are registered at floors between said given floor and another one of said plurality of cars positioned away from said given floor, timing means, and means responsive to the operation of said timing means for causing said dispatching means to be operable in response to the registration of one or more demands for service at floors between said given floor and said other car.

25. A dispatching and control system for a plurality of elevator cars operating in a bank between a plurality of floors, comprising selecting means for selecting one of said plurality of cars to be dispatched from a given floor, means at floors other than said given floor operable by intending passengers for registering the demands for service, dispatching means for causing a car selected by said selecting means to be dispatched from said given floor operable when demands for service are registered at a plurality of floors behind the next preceding car dispatched from said given floor, and selectively enabled means for causing said dispatching means to be operable when one or more demands for service are registered at floors behind said next preceding car.

26. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, dispatching means for causing a car selected by said selecting means to be dispatched from said given floor operable when demands for service are registered at a plurality of floors behind the next preceding car dispatched from said given floor or when demands for service at a greater plurality of floors are registered ahead of said next preceding car, and selectively enabled means for causing said dispatching means to be operable when one or more demands for service are registered at floors behind said next preceding car.

27. A dispatching and control system as described in claim 26 having timing means for enabling said selectively enabled means at the end of a predetermined interval of time.

28. A dispatching and control system as described in claim 27 wherein said interval of time begins upon the selection of said one of said plurality of cars by said selecting means.

29. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, means in said elevator cars operable by passengers therein for registering demands for service, dispatching means for causing a car selected by said selecting means to be dispatched from said given floor operable when demands for service are registered at a plurality of said other floors, timing means initiated upon the selection of a car by said selecting means, and selectively enabled means responsive to said timing means for causing said dispatching means to be operable at the end of a predetermined time interval when one or more demands for service are registered at said other floors or when demands for service are registered in said selected car.

30. A dispatching and control system for a plurality of elevator cars operating in a bank between a plurality of floors, comprising selecting means for selecting one of said plurality of cars to be dispatched from a given floor, means at floors other than said given floors operable by intending passengers for registering demands for service, means in each of said plurality of elevator cars operable by passengers therein for registering demands for service, dispatching means for causing a car selected by said selecting means to be dispatched from said given floor operable when demands for service are registered at a predetermined plurality of said floors behind the next preceding car dispatched from said given floor, timing means, and selectively enabled means responsive to said timing means for causing said dispatching means to be operable when demands for service are registered at one or more of said other floors behind said next preceding car or demands for service are registered in said selected car.

31. A dispatching and control system for a plurality of elevator cars operating in a bank between a plurality of floors, comprising selecting means for selecting one of said plurality of cars to be dispatched from a given floor, means at floors other than said given floors operable by intending passengers for registering demands for service, means in each of said plurality of elevator cars operable by passengers therein for registering demands for service, dispatching means for causing a car selected by said selecting means to be dispatched from said given floor operable when demands for service are registered at a predetermined plurality of said other floors behind the next preceding car dispatched from said given floor, timing means, selectively enabled means responsive to said timing means for causing said dispatching means to be operable when demands for service are registered at one or more of said other floors behind said next preceding car or demands for service are registered in said selected car, and special service means for simulating demands for service at said predetermined plurality of said other floors.

32. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, means in each of said plurality of elevator cars operable by passengers therein for registering demands for service, dispatching means for causing a car selected by said selecting means to be dispatched from said given floor operable when demands for service are registered at a predetermined plurality of said floors behind the next preceding car dispatched from said given floor, timing means, selectively enabled means responsive to said timing means for causing said dispatching means to be operable when demands for service are registered at one or more of said other floors behind said next preceding car or demands for service are registered in said selected car, and special service means for simulating demands for service at said predetermined plurality of said other floors behind said next preceding car.

33. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, dispatching means for causing a car selected by said selecting means to be dispatched from said given floor operable when demands for service are registered at a predetermined plurality of said other floors, and special service means for simulating the registration of demands for service at said predetermined plurality of said other floors.

34. A dispatching and control system for a plurality of elevator cars operating in a bank between a plurality of floors, comprising selecting means for selecting one of said plurality of cars to be dispatched from a given floor, means at floors other than said given floors operable by intending passengers for registering demands for service, dispatching means for causing a car selected by said selecting means to be dispatched from said given floor operable when demands for service are registered at a predetermined plurality of said other floors behind the next preceding car dispatched from said given floor, timing means, selectively enabled means responsive to said timing means for causing said dispatching means to be operable when demands for service are registered at one or more of said other floors behind said next preceding car, load responsive means for determining the load in said selected car, and means responsive to a predetermined load in said selected car as determined by said load responsive means for simulating the registration of demands for service at said predetermined plurality of said other floors.

35. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, means in each of said plurality of elevator cars operable by passengers therein for registering demands for service, dispatching means for causing a car selected by said selecting means to be dispatched from said given floor operable when demands for service are registered at a predetermined plurality of said other floors behind the next preceding car dispatched from said given floor, timing means, selectively enabled means responsive to said timing means for causing said dispatching means to be operable when demands for service are registered at one or more of said other floors behind said next preceding car, or demands for service are registered in said selected car, load responsive means for determining the load in said selected car, and means responsive to a predetermined load in said selected car as determined by said load responsive means for simulating the registration of demands for service at said predetermined plurality of said other floors.

36. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, dispatching means for causing a car selected by said selecting means to be dispatched from said given floor operable when demands for service are registered at a predetermined plurality of said other floors, load responsive means in said selected car for determining the load condition of the car, and means for simulating the registration of demands for service at said predetermined plurality of floors when said selected car is loaded to at least a predetermined load condition.

37. A dispatching and control system for a plurality of elevator cars operating in a bank between a plurality of floors, comprising selecting means for selecting one of said plurality of cars to be dispatched from a given floor, means at floors other than said given floor operable by intending passengers for registering demands for service, dispatching means for causing a car selected by said selecting means to be dispatched from said given floor operable when demands for service are registered at a predetermined plurality of said other floors, load responsive means in said selected car for determining the load condition of the car, means for simulating the registration of demands for service at said predetermined plurality of floors when said selected car is loaded to at least a predetermined load condition, and means for preventing the operation of said simulating means for a predetermined interval of time following the selection of a car by said selecting means.

38. A dispatching and control system for a plurality of elevator cars operating in a bank, between a plurality of floors, comprising selecting means for selecting one of said plurality of cars to be dispatched from a given floor, means at floors other than said given floor operable by intending passengers for registering demands for service, dispatching means for causing a car selected by said selecting means to be dispatched from said given floor operable when demands for service are registered at a predetermined plurality of said other floors, load responsive means in said selected car for determining the load condition of the car, means for simulating the registration of demands for service at said predetermined plurality of floors when said selected car is loaded to at least a predetermined load condition, and means operable when said selected car is loaded to at least said predetermined load condition at the time that it is selected for dispatching by said selecting means for preventing operation of said simulating means until the load as determined by said load responsive means decreases to a predetermined amount.

39. A dispatching and control system for a plurality of elevator cars operating in a bank, between a plurality of floors, comprising selecting means for selecting one of said plurality of cars to be dispatched from a given floor, means at floors other than said given floor operable by intending passengers for registering demands for service, dispatching means for causing a car selected by said selecting means to be dispatched from said given floor operable when demands for service are registered at a predetermined plurality of said other floors, load responsive means in said selected car for determining the load condition of the car, means for simulating the registration of demands for service at said predetermined plurality of floors when said selected car is loaded to at least a predetermined load condition, and means operable when said selected car is loaded to at least said predetermined load condition at the time that it is selected for dispatching by said selecting means for preventing operation of said simulating means until the end of a predetermined interval of time following the selection of said selected car by said selecting means and after the load as determined by said load responsive means decreases to a predetermined amount.

40. A dispatching and control system for a plurality of elevator cars operating in a bank, comprising selecting means for selecting one of said cars to be dispatched from a dispatching floor when one or more of said cars are at said dispatching floor, means for registering demands for service, dispatching means for causing a car selected by said selecting means to be dispatched from said dispatching floor operable when one or more demands for service are registered, and selectively operable means responsive to the absence of cars from a selected floor for simulating a demand for service at said selected floor.

41. A dispatching and control system for a plurality of elevator cars operating in a bank, comprising selecting means for selecting one of said cars to be dispatched from a dispatching floor when one or more of said cars are at said dispatching floor, means for registering demands for service, dispatching means for causing a car selected by said selecting means to be dispatched from said dispatching floor operable when one or more demands for service are registered, and selectively operable means responsive to the absence of cars from the dispatching floor for simulating a demand for service at said dispatching floor.

42. A dispatching and control system for a plurality of elevator cars operating in a bank, between a plurality of floors, comprising selecting means for selecting one of said cars to be dispatched from a dispatching floor when one or more of said cars are at said dispatching floor, means at a plurality of floors for registering demands for service, dispatching means for causing a car selected by said selecting means to be dispatched from said dispatching floor operable when said demands for service are registered for a predetermined plurality of floors, and means responsive to the absence of cars from a selected floor for simulating the registration of demands for service at said selected floor equivalent to the registration of demands for service at said predetermined plurality of floors.

43. A dispatching and control system for a plurality of elevator cars operating in a bank, between a plurality of floors, comprising selecting means for selecting one of said cars to be dispatched from a dispatching floor when one or more of said cars are at said dispatching floor, means at a plurality of floors for registering demands for service, dispatching means for causing a car selected by said selecting means to be dispatched from said dispatching floor operable when said demands for service are registered for a predetermined plurality of floors, and selectively operable means responsive to the absence of cars from said dispatching floor for simulating the registration of demands for service at said dispatching floor equivalent to the registration of demands for service at said predetermined plurality of floors.

44. A dispatching and control system for a plurality of elevator cars operating in a bank between a plurality of floors, comprising selecting means for selecting one of said cars to be dispatched from a dispatching floor when one or more of said cars are at said dispatching floor, means at a plurality of floors for registering demands for service, dispatching means for causing a car selected by said selecting means to be dispatched from said dispatching floor operable when said demands for service are registered for a predetermined plurality of floors, timing means for providing predetermined intervals of time, and means responsive to said timing means and to the absence of cars from a selected floor other than said dispatching floor for simulating at the end of said time interval the registration of demands for service at said selected floor equivalent to the registration of demands for service at said predetermined plurality of floors.

45. A dispatching and control system for a plurality of elevator cars operating in a bank as described in claim 44, wherein said intervals of time are initiated at the time that a car at said dispatching floor is selected by said selecting means.

46. A dispatching and control system for a plurality of elevator cars operating in a bank between a plurality of floors, comprising selecting means for selecting one of said cars to be dispatched from a dispatching floor when one or more of said cars are at said dispatching floor, means at a plurality of floors for registering demands for service, dispatching means for causing a car selected by said selecting means to be dispatched from said dispatching floor operable when said demands for service are registered at a predetermined plurality of floors, means for determining whether at least a predetermined number of said elevator cars are operating in said bank, and means operable when at least said predetermined number of said cars are operating in said bank and responsive to the absence of cars from a selected floor other than said dispatching floor for simulating the registration of demands for service at said selected floor equivalent to the registration of demands for service at said predetermined plurality of floors.

47. A dispatching and control system for a plurality of elevator cars operating in a bank between a plurality of floors, comprising selecting means for selecting one of said cars to be dispatched from a dispatching floor when one or more of said cars are at said dispatching floor, means at a plurality of floors for registering demands for service, dispatching means for causing a car selected by said selecting means to be dispatched from said dispatching floor operable when said demands for service are registered at a predetermined plurality of floors, motor-generator means for each of said cars operating in said bank, means for selectively operating said motor-generator means in each of said cars and shutting down said motor-generator means in each of said cars, and means operable when said motor-generator means are operating in a predetermined number of said cars and responsive to the absence of cars from a selected floor other than said dispatching floor for simulating the registration of demands for service at said selected floor equivalent to the registration of demands for service at said predetermined plurality of floors.

48. A dispatching and control system for a plurality of elevator cars operating in a bank between a plurality of floors, comprising selecting means for selecting one of said cars to be dispatched from a dispatching floor when one or more of said cars are at said dispatching floor, means at a plurality of floors for registering demands for service, dispatching means for causing a car selected by said selecting means to be dispatched from said dispatching floor operable when said demands for service are registered at a predetermined plurality of floors, means for determining the position and direction of travel of each of said cars operating in said bank, and means responsive to the absence of said elevator cars at predetermined positions and operating in a given direction for simulating the registration of demands for service at a selected floor equivalent to the registration of demands for service at said predetermined plurality of floors.

49. A dispatching and control system for a plurality of elevator cars operating in a bank, comprising selecting means for selecting one of said cars to be dispatched from a dispatching floor when one or more of said cars are at said dispatching floor, means for registering demands for service, dispatching means for causing a car selected by said selecting means to be dispatched from said dispatching floor operable when one or more of said demands for service are registered, means for determining the presence and absence of said cars at said dispatching floor, and means responsive to the absence of cars from said dispatching floor and responsive to the selection of a car by said selecting means for simulating a demand for service at said dispatching floor.

50. A dispatching and control system for a plurality of elevator cars operating in a bank, comprising selecting means for selecting one of said cars to be dispatched from a dispatching floor when one or more of said cars are at said dispatching floor, means for registering demands for service, means individual to each of said cars for selectively conditioning a respective car for operation under the control of said control system and for operation independent of said control system, means for determining the number of cars controlled by said control system, dispatching means for causing a car selected by said selecting means to be dispatched from said dispatching floor operable when one or more of said demands for service are registered, means for determining the presence and absence of said cars at said dispatching floor, selectively enabled means responsive to the absence of cars from said dispatching floor and responsive to the selection of a car by said selecting means for simulating a demand for service at said dispatching floor, and means responsive to the number of said cars conditioned to be controlled by said control system for enabling said selectively enabled simulating means.

51. A dispatching and control system for a plurality of elevator cars operating in a bank, comprising selecting means for selecting one of said cars to be dispatched from a dispatching floor when one or more of said cars are at said dispatching floor, means for registering demands for service, means for each of said cars for selectively conditioning a respective car for operation under control of said control system, means for determining the number of said plurality of elevator cars conditioned for control by said control system, dispatching means for causing a car selected by said selecting means to be dispatched from said dispatching car operable when one or more of said demands for service are registered, means for determining the presence and absence of said cars at said dispatching floor, selectively enabled means responsive to the absence of cars from said dispatching floor and responsive to the selection of a car by said selecting means for simulating a demand for service at said dispatching floor, motor-generator means for each of said cars operating in said bank, means for selectively operating said motor-generator means in each of said cars and shutting down said motor-generator means in each of said cars, and means responsive to the number of said cars in which said motor-generator means are operating for disabling said selectively enabled simulating means when the number of said cars in which said motor-generator means are operating is less than a predetermined number.

52. In a dispatching and control system for a plurality of elevator cars as described in claim 51, timing means, means responsive to the absence of cars from said dispatching floor and responsive to the selection of a car by said selecting means for initiating the operation of said timing means, and means operable at the end of a predetermined interval of time determined by said timing means for rendering ineffective said disabling means.

53. In a dispatching and control system for a plurality of elevator cars operating in a bank as described in claim 51, timing means, means responsive to the presence and absence of the said cars at a selected floor other than said dispatching floor, means operable when the number of cars conditioned for control by said control system is more than a predetermined number and when no cars are positioned at said selected floor for initiating the operation of said timing means, means operable at the end of an interval of time determined by said timing means for rendering ineffective said disabling means.

54. A dispatching and control system for a plurality of elevator cars operating in a bank, comprising selecting means for selecting one of said cars to be dispatched from a dispatching floor when one or more of said cars are at said dispatching floor, means for registering demands for service, dispatching means for causing a car selected by said selecting means to be dispatched from said dispatching floor operable when one or more demands for service are registered, means for determining the presence and absence of said cars at said dispatching floor, and means responsive to the selection of a car by said selecting means and responsive to the absence of cars other than a car selected by said selecting means from said dispatching floor for simulating a demand for service at said dispatching floor.

55. A dispatching and control system for a plurality of elevator cars operating in a bank, comprising selecting means for selecting one of said cars to be dispatched from a dispatching floor when one or more of said cars are at said dispatching floor, means for registering demands for service, dispatching means for causing a car selected by said selecting means to be dispatched from said dispatching floor operable when one or more of said demands for service are registered, means for determining the presence and absence of said cars at said dispatching floor, and means responsive to the selection of a car by said selecting means and responsive to the absence of cars other than the car selected by said selecting means from said dispatching floor for simulating a demand for service at said dispatching floor, means for selectively conditioning each of said cars for operation under the control of said control system and for operation independent of said control system, and means operable when the number of cars conditioned for operation under the control of said control system is less than a predetermined amount for rendering said simulating means independent of the selection of a car by said selecting means, but responsive to the absence of cars from said dispatching floor.

56. A dispatching and control system for a plurality of elevator cars operating in a bank, comprising selecting means for selecting one of said cars to be dispatched from a dispatching floor when one or more of said cars are at said dispatching floor, means for registering demands for service, dispatching means for causing a car selected by said selecting means to be dispatched from said dispatching floor operable when one or more of said demands for service are registered, means in each of said elevator cars for registering demands for service, and means responsive to the registration of a demand for service in a car positioned at said dispatching floor for simulating a demand for service at said dispatching floor.

57. A dispatching and control system for a plurality of elevator cars operating in a bank between a plurality of floors, comprising selecting means for selecting one of said cars to be dispatched from a dispatching floor when one or more of said cars are at said dispatching floor, means for registering demands for service at a plurality of floors, means in each of said cars for registering demands for service, dispatching means for causing a car selected by said selecting means to be dispatched from said dispatching floor operable when demands for service are registered at a plurality of floors, and means responsive to the registration of demands for service in a car positioned at said dispatching floor for simulating a demand for service at said dispatching floor.

58. A dispatching and control system for a plurality of elevator cars operating in a bank between a plurality of floors, comprising selecting means for selecting one of said cars to be dispatched from a dispatching floor when one or more of said cars are at said dispatching floor, means for registering demands for service at a plurality of floors, means in each of said cars for registering demands for service, dispatching means for causing a car selected by said selecting means to be dispatched from said dispatching floor operable when demands for service are registered at a predetermined plurality of floors, and means responsive to the registration of a demand for service in a car positioned at said dispatching floor for simulating the registration of a demand for service at said dispatching floor equivalent to the registration of demands for service at said predetermined plurality of floors.

59. A dispatching and control system for a plurality of elevator cars operating in a bank between a plurality of floors, comprising selecting means for selecting one of said cars to be dispatched from a dispatching floor when one or more of said cars are at said dispatching floor, means for registering demands for service at a plurality of floors, means in each of said cars for registering demands for service, dispatching means for causing a car selected by said selecting means to be dispatched from said dispatching floor operable when demands for service are registered at a predetermined plurality of floors, means responsive to the registration of demands for service in a car selected by said selecting means for simulating the registration of a demand for service at said dispatching floor equivalent to the registration of demands for service at said predetermined plurality of floors.

60. A dispatching and control system for a plurality of elevator cars operating in a bank between a plurality of floors, comprising selecting means for selecting one of said cars to be dispatched from a dispatching floor when one or more of said cars are at said dispatching floor, means for registering demands for service at a plurality of said floors, means in each of said cars for registering demands for service, dispatching means for causing a car selected by said selecting means to be dispatched from said dispatching floor operable when demands for service are registered at a predetermined plurality of said floors, means for selectively conditioning each of said cars for operation under the control of said control system and for operation independent of said control system, and means operable when a predetermined number of cars are conditioned for operation under the control of said control system responsive to the registration of demands for service in a car positioned at said dispatching floor for simulating the registration of a demand for service at said dispatching floor equivalent to the registration of demands for service at said predetermined plurality of floors.

61. A dispatching and control system for a plurality of elevator cars operating in a bank between a plurality of floors, comprising selecting means for selecting one of said cars to be dispatched from a dispatching floor when one or more of said cars are at said dispatching floor, means for registering demands for service at a plurality of said floors, means in each of said cars for registering demands for service, dispatching means for causing a car selected by said selecting means to be dispatched from said dispatching floor operable when demands for service are registered at one or more of said plurality of floors, means for determining the presence and absence of said cars at said dispatching floor, means for selectively conditioning each of said cars for operation under the control of said control system and for operation independent of said control system, means for determining whether a predetermined number of cars are conditioned for operation under the control of said control system, selectively operable means for simulating demands for service at said dispatching floor, first means for operating said simulating means in response to the selection of a car by said selecting means and the absence of cars other than said selected car from said dispatching floor, second means for operating said simulating means responsive to the registration of demands for service in a car positioned at said dispatching floor, means for enabling said first operating means to operate said simulating means when at least a predetermined number of cars are conditioned for operation under the control of said control system, and means for enabling said second means to operate said simulating means when less than said predetermined number of cars are conditioned for operation under the control of said control system.

62. A dispatching and control system for a plurality of elevator cars operating in a bank between a plurality of floors, comprising selecting means for selecting one of said cars to be dispatched from a dispatching floor when one or more of said cars are at said dispatching floor, means for registering demands for service at a plurality of said floors, means in each of said cars for registering demands for service, means for selectively conditioning each of said cars for operation under the control of said control system and for operation independent of said control system, means for determining the presence and absence of said cars at said dispatching floor, first means for determining whether a predetermined number of said cars are conditioned for operation under the control of said control system, second means for determining whether a lesser predetermined number of cars are conditioned for operation under the control of said control system, dispatching means for causing a car selected by said selecting means to be dispatched from said dispatching floor operable when demands for service are registered at one or more of said floors, selectively operable means for simulating a demand for service at said dispatching floor, first control means responsive to the selection of a car by said selecting means and to the absence of cars other than said selected car from said dispatching floor for operating said simulating means when the number of cars conditioned for operation under the control of said control system are equal to or greater than said predetermined amount, second control means responsive to the registration of demands for service in a car positioned at said dispatching floor for operating said simulating means when the number of cars conditioned for operation under the control of said control means is less than said predetermined amount but equal to or greater than said lesser predetermined amount, and third control means responsive to the absence of cars from said dispatching floor and independent of the selection of a car by said selecting means or the registration of demands for service in a car positioned at said dispatching floor, regardless of the number of cars in said bank conditioned for operation under the control of said control system, for operating said simulating means.

63. In a dispatching and control system as described in claim 62, motor-generator means for each of said cars, means for selectively operating said motor-generator means in each of said cars and shutting down said motor-generator means in each of said cars, means for determining the number of said cars in said bank having their respective motor-generator means shut down, means for disabling said simulating means when a predetermined number of said cars in said bank have their respective motor-generator means shut down, timing means, and means operable at the end of an interval of time determined by said timing means for rendering ineffective said disabling means, provided said motor-generator means for a predetermined number of cars are operating.

64. In a dispatching and control system for a plurality of elevator cars as described in claim 63, means for initiating the operation of said timing means responsive to any of said first, second and third control means.

65. In a dispatching and control system for a plurality of elevator cars operating in a bank as described in claim 63, means for initiating the operation of said timing means including means responsive to the presence and absence of said elevator cars at a selected floor other than said dispatching floor, means operable when the number of cars conditioned for operation under the control of said control system is more than a predetermined number and the number of cars positioned at said selected floor is less than predetermined number.

66. A dispatching and control system for a plurality of elevator cars operating in a bank, comprising selecting means for selecting one of said plurality of cars to be dispatched from a given floor when one or more of said cars are at said given floor, means operable by intending passengers for registering demands for service at said given floor, dispatching means for causing a car selected by said selecting means to be dispatched from said given floor, means for determining when one of said plurality of said cars is selected by said selecting means and means responsive to said determining means for rendering said service demand registering means ineffective when one of said cars is selected by said selecting means.

67. A dispatching and control system for a plurality of elevator cars operating in a bank, comprising selecting means for selecting one of said plurality of cars to be dispatched from a given floor, means at said given floor for registering a demand for service, dispatching means for causing a car selected by said selecting means to be dispatched from said given floor, motor-generator means for each of said cars, means for selectively operating the motor-generator means in each of said cars and for shutting down said motor-generator means in each of said cars, means responsive to the operation of said motor-generator means in each of said cars for determining when all of said motor-generator means are shut down, and means responsive to said determining means for rendering said service demand registration means ineffective when none of said motor-generator means are operating.

68. A dispatching and control system for a plurality of elevator cars operating in a bank between a plurality of floors, comprising selecting means for selecting one of said plurality of cars to be dispatched from a given floor when one or more of said cars are at said given floor, means operable by intending passengers for registering demands for service at a plurality of floors including said given floor, means individual to each of said cars for indicating the presence and absence of a respective car at said given floor, service demand responsive means for each of said cars responsive to the registration of a demand for service at said floors, means responsive to said presence and absence indicating means for disabling said service demand responsive means when said respective car is positioned at said given floor, motor-generator means for each of said cars in said bank, means for selectively operating said motor-generator means and shutting down said motor-generator means, means for determining whether said motor-generator means in a predetermined number of said cars operating in said bank are shut down, and means responsive to the selection of a car by said selecting means and operable when said motor-generator means for said predetermined number of cars are shut down for rendering ineffective said disabling means.

69. In a dispatching and control system for a plurality of elevator cars operating in a bank as described in claim 68, wherein said predetermined number of cars having respective motor-generator means shut down is equal to all of said cars operating in said bank.

70. In a dispatching and control system for a plurality of elevator cars operating in a bank, selecting means for selecting one of said plurality of cars to be dispatched from a given floor, comprising means for indicating the presence of each of said cars at said given floor, means individual to each of said cars for determining the order of arrival at said given floor of a respective car relative to the other cars then at said given floor, means common to each of said cars responsive to said individual determining means for indicating the order of arrival of each of said cars at said given floor, selectively enabled means individual to each of said cars for indicating the selection of a respective car as the next to be dispatched, control means responsive to said common indicating means for enabling said individual indicating means in the order of arrival of the respective cars at said given floor, and selecting means for sequentially energizing said individual indicating means.

71. In a dispatching and control system for a plurality of elevator cars operating in a bank, selecting means for selecting one of said plurality of cars to be dispatched from a given floor, comprising positional indicating means individual to each of said cars in said bank, means for indicating the presence of each of said cars at said given floor, each of said positional indicating means having a plurality of positions equal in number to the number of cars in said bank and connected in common with corresponding positions associated with the respective positional indicating means of the other cars in said bank, control means responsive to the operation of said positional indicating means for pre-empting the first available position thereof, means responsive to the presence of an elevator car at said given floor for causing the selection by the respective positional indicating means of a position not pre-empted by a car previously arriving at said given floor, means common to said cars for scanning said positions of said positional indicating means in rotational sequence and for selecting a position pre-empted by the next car available for dispatching, and means individual to each of said cars responsive to the operation of said scanning and selecting means for indicating the selection of a respective car as the next to be dispatched.

72. In a dispatching and control system for a plurality of elevator cars operating in a bank, selecting means for selecting one of said plurality of cars to be dispatched from a given floor, comprising positional indicating means individual to each of said cars in said bank, means for indicating the presence of each of said cars at said given floor, each of said positional indicating means having a plurality of positions equal in number to the number of cars in said bank and connected in common with corresponding positions associated with the respective positional indicating means of the other cars in said bank, control means responsive to the operation of said positional indicating means for pre-empting the first available position thereof, means responsive to the presence of an elevator car at said given floor for causing an operation of the respective positional indicating means to select the first available position not pre-empted by a car previously arriving at said given floor, starting means individual to each of said cars, means common to said cars for scanning said positions of said positional indicating means in rotational sequence and for selecting a position pre-empted by the next car available for dispatching, means individual to each of said cars responsive to the operation of said scanning and selecting means for indicating the selection of a respective car as the next to be dispatched, and means for maintaining the pre-emption of said first available position by said positional indicating means until the operation of said starting means or said selection indicating means for said respective car.

73. In a dispatching and control system for a plurality of elevator cars operating in a bank, motor-generator means for each of said cars, means for selectively operating said motor-generator means and for shutting down said motor-generator means, means for indicating the presence of each of said cars at a given floor, means for determining whether said motor-generator means for each of the cars positioned at said given floor are operating, and selecting means for selecting one of said plurality of cars to be dispatched from said given floor, comprising positional indicating means individual to each of said cars in said bank, each of said positional indicating means having a plurality of positions equal in number to the number of cars in said bank and connected in common with corresponding positions associated with the respective positional indicating means of the other cars in said bank, control means responsive to the operation of said positional indicating means for pre-empting the first available position, means responsive to the presence of an elevator car at said given floor for causing the operation of the respective positional indicating means to select a position not pre-empted by a car previously arriving at said given floor, starting means individual to each of said cars, means common to said cars for scanning said positions in rotational sequence and for selecting a position pre-empted by the next car available for dispatching, means individual to each of said cars responsive to the operation of said scanning and selecting means for indicating the selection of a respective car as the next to be dispatched, means for maintaining the pre-emption of said position by said control means until the operation of said starting means or said indicating means for said respective car, means for disabling said selection indicating means for a car when the respective motor-generator means for said car is not operating, and means operable when the motor-generator means for all of the cars positioned at said given floor are shut down for rendering ineffective said disabling means.

74. In a dispatching and control system for a plurality of elevator cars operating in a bank, selecting means for selecting one of said plurality of cars to be dispatched from a given floor, comprising stepping switch means individual to each of said cars in said bank, means for indicating the presence of each of said cars at said given floor, each of said stepping switch means having a starting position and a plurality of stepping positions equal in number to the number of cars in said bank and connected in common with corresponding stepping positions associated with the respective stepping switch means of the other cars in said bank, control means responsive to the operation of said stepping switch means for pre-empting the first available stepping position, means responsive to the presence of an elevator car at said given floor for causing a stepping operation of the respective stepping switch means from said starting position to the first available stepping switch position not pre-empted by a car previously arriving at said given floor, starting means individual to each car, means common to said cars for scanning said stepping positions in rotational sequence and for selecting a stepping position pre-empted by the next car available for dispatching, and means individual to each of said cars responsive to the operation of said scanning and selecting means for indicating the selection of a respective car as the next to be dispatched.

75. In a dispatching and control system for a plurality of elevator cars operating in a bank, selecting means for selecting one of said plurality of cars to be dispatched from a given floor, comprising stepping switch means individual to each of said cars in said bank, means for indicating the presence of each of said cars at said given floor, each of said stepping switch means having a starting position and a plurality of stepping positions equal in number to the number of cars in said bank and connected in common with corresponding stepping positions associated with the respective stepping switch means of the other cars in said bank, control means responsive to the operation of said stepping switch means for pre-empting the first available stepping position, means responsive to the presence of an elevator car a said given floor for causing a stepping operation of the respective stepping switch means from said starting position to the first available stepping switch position not pre-empted by a car previously arriving at said given floor, starting means individual to each of said cars, means common to said cars for scanning said stepping positions in rotational sequence and for selecting a stepping position per-empted by the next car available for dispatching, means individual to each of said cars responsive to the operation of said scanning and selecting means for indicating the selection of a respective car as the next to be dispatched, and means for maintaining the pre-emption of said stepping switch position by said control means until the operation of said starting means or said selection indicating means for said respective car.

76. In a dispatching and control system for a plurality of elevator cars operating in a bank, motor-generator means for each of said cars, means for selectively operating said motor-generator means and for shutting down said motor-generator means in each of said cars, means for indicating the presence of each of said cars at said given floor, means for determining whether the motor-generator means for all of the cars positioned at said given floor are operating, and selecting means for selecting one of said plurality of cars to be dispatched from a given floor, comprising stepping switch means individual to each of said cars in said bank, each of said stepping switch means having a starting position and a plurality of stepping positions equal to the number of cars in said bank and connected in common with corresponding stepping positions associated with the respective stepping switch means of the other cars in said bank, control means responsive to the operation of said stepping switch means for pre-empting the first available stepping position, means responsive to the presence of an elevator car at said given floor for causing a stepping operation of the respective stepping switch means from said starting position to the first available stepping switch position not pre-empted by a car previously arriving at the given floor, starting means individual to each of said cars, means common to said cars for scanning said stepping positions in rotational sequence and for selecting a stepping position pre-empted by the next car available for dispatching, means individual to each of said cars responsive to the operation of said scanning and selecting means for indicating the selection of a respective car as the next to be dispatched, means for maintaining the pre-emption of said first available stepping switch position by said control means until the operation of said starting means or said indicating means for said respective car, means for disabling said selection indicating means for each of said cars when said respective motor-generator means is not operating, and means operable when the motor-generator means for all of the cars positioned at said given floor are not operating for rendering ineffective said disabling means.

77. In a dispatching and control system for a plurality of elevator cars operating in a bank, means for registering a demand for service at a floor, preferred service timing means for providing a predetermined interval of time initiated upon the registration of a demand for service at said floor, preferred service demand indicating means responsive to the operation of said preferred service timing means at the end of said predetermined interval of time, means individual to said cars and responsive to the registration of a demand for service at said floor, stopping means individual to said cars for stopping the respective car at said floor in response to the operation of said service demand registration responsive means, and means operable when a car by-passes said floor after a demand for service has been registered at said floor but prior to the end of said predetermined interval of time for operating said preferred service demand indicating means.

78. In a dispatching and control system for a plurality of elevator cars operating in a bank, and means for registering a demand for service in a given direction at a floor, preferred service timing means for providing a predetermined interval of time initiated upon the registration of a demand for service at said floor in said given direction, preferred service demand indicating means responsive to the operation of said preferred service timing means at the end of said predetermined interval of time, means individual to said cars and responsive to the registration of a demand for service at said floor in said given direction when the respective car is set for travel in said given direction, stopping means individual to said cars for stopping said respective car at said floor in response to the operation of said service demand registration responsive means, and means operable when a car set for travel in said given direction by-passes said floor after a demand for service has been registered at said floor in said given direction but prior to the end of the said predetermined interval of time for operating said preferred service demand indicating means.

79. In a dispatching and control system for a plurality of elevator cars operating in a bank, means for registering a demand for service in a given direction at a floor, preferred service timing means for providing a predetermined interval of time initiated upon the registration of a demand for service at said floor in said given direction, preferred service demand indicating means responsive to the operation of said preferred service timing means at the end of said predetermined interval of time, means individual to said cars and responsive to the registration of a demand for service at said floor in said given direction when the respective car is set for travel in said given direction, stopping means individual to said cars for stopping said respective car at said floor in response to the operation of said service demand registration responsive means, and means operable when a car set for travel in said given direction approaches said floor and is set to by-pass said floor after a demand for service in said given direction has been registered at said floor but prior to the end of said predetermined interval of time for operating said preferred service demand indicating means.

80. In a dispatching and control system for a plurality of elevator cars operating in a bank, means for registering a demand for service in a given direction at a floor, preferred service timing means for providing a predetermined interval of time initiated upon the registration of a demand for service in said given direction at said floor, preferred service demand indicating means responsive to the operation of said preferred service timing means at the end of said predetermined interval of time, means individual to said cars and responsive to the registration of a demand for service in said given direction at said floor, stopping means individual to said cars for stopping the respective car at said floor in response to the operation of said service demand registration responsive means, by-passing means for preventing the operation of said service demand registration responsive means for causing said stopping means to stop said respective car at said floor, and means operable when a car set for travel in said given direction by-passes said floor after a demand for service in said given direction has been registered at said floor but prior to the end of said predetermined interval of time for operating said preferred service demand indicating means.

81. In a dispatching and control system for a plurality of elevator cars operating in a bank, means for registering a demand for service in a given direction at a floor, preferred service timing means for providing a predetermined interval of time initiated upon the registration of a demand for service in said given direction at said floor, preferred service demand indicating means responsive to the operation of said preferred service timing means at the end of said predetermined interval of time, means individual to said cars and responsive to the registration of a demand for service in said given direction at said floor, stopping means individual to said cars for stopping the respective car at said floor in response to the operation of said service demand registration responsive means, by-passing means for preventing the operation of said service demand registration responsive means from causing said stopping means to stop the respective car at said floor, means for indicating the approach of a car to said floor in said given direction, and means operable when a car set for travel in said given direction approaches and is set to by-pass said floor after a demand for service has been registered at said floor but prior to the end of said predetermined interval of time for operating said preferred service demand indicating means.

82. In a dispatching and control system for a plurality of elevator cars operating in a bank, means for registering a demand for service in a given direction at a floor, preferred service timing means for providing a predetermined interval of time initiated upon the registration of a demand for service in said given direction at said floor, preferred service demand indicating means responsive to the operation of said preferred service timing means at the end of said predetermined interval of time, means individual to said cars and responsive to the registration of a demand for service in said given direction at said floor, stopping means individual to said cars for stopping the respective car at said floor in response to the operation of said service demand registration responsive means, by-passing means for preventing the operation of said service demand registration responsive means from causing said stopping means to stop the said respective car at said floor, means individual to each of said cars for indicating that the respective car is set for travel in said given direction, means for selectively causing each of said cars to operate under the control of said control system and to operate independently of said control system, means for indicating whether a car is operating under the control of said control system, and means operable when a car set for travel in said given direction and operating under the control of said control system by-passes said floor after a demand for service in said given direction has been registered at said floor but prior to the end of said predetermined interval of time for operating said preferred service demand indicating means.

83. In a dispatching and control system for a plurality of elevator cars operating in a bank as described in claim 82, manually operable means for controlling said by-passing means, load responsive means responsive to the load condition of a respective car for operating said by-passing means, and means for preventing the operation of said means operable when a car by-passes said floor when said by-passing means is controlled by said manually operable means.

84. In a dispatching and control system for a plurality of elevator cars operating in a bank, means for registering a demand for service in a given direction at a floor, preferred service timing means for providing a predetermined interval of time initiated upon the registration of a demand for service in said given direction at said floor, preferred service demand indicating means responsive to the operation of said preferred service timing means at the end of said predetermined interval of time, means individual to said cars and responsive to the registration of a demand for service in said given direction at said floor, stopping means individual to said cars for stopping the respective car at said floor in response to the operation of said service demand registration responsive means, by-passing means for preventing the operation of said service demand registration responsive means from causing said stopping means to stop the said respective car at said floor, means individual to a car for indicating the direction of travel in which the respective car is traveling, selectively operable means individual to a car for operating the respective car in accordance with a predetermined preferred operation, means for indicating whether a car is operating in accordance with said predetermined preferred operation, and means operable when a car traveling in said given direction and not operating in accordance with said predetermined preferred operation by-passes said floor after a demand for service in said given direction has been registered at said floor but prior to the end of said predetermined interval of time for operating said preferred service demand indicating means.

85. In a dispatching and control system for a plurality of elevator cars operating in a bank as described in claim 84, manually operable means for controlling said by-passing means, load responsive means responsive to the load condition of a respective car for controlling said by-passing means, and means for preventing the operation of said means operable when a car by-passes said floor when said by-passing means is controlled by said manually operable means.

86. In a dispatching and control system for a plurality of elevator cars operating in a bank as described in claim 85, means for selectively causing a car to be operated under the control of said control system and to be operated independently of said control system, and means for preventing the operation of said means operable when a car by-passes said floor when the by-passing car is operating independently of said control system.

87. In a dispatching and control system for a plurality of elevator cars operating in a bank, means for registering a demand for service in a given direction at a floor, preferred service timing means for providing a predetermined interval of time initiated upon the registration of a demand for service in said given direction at said floor, preferred service demand indicating means responsive to the operation of said preferred service timing means at the end of said predetermined interval of time, means individual to said cars and responsive to the registration of the demand for service in said given direction at said floor, stopping means individual to said cars for stopping the respective car at said floor in response to the operation of said service demand registration responsive means, by-passing means for preventing the operation of said service demand registration responsive means from causing said stopping means to stop the said respective car at said floor, means individual to a car for indicating the direction of travel in which the respective car is traveling, selectively operable means individual to a car for operating the respective car in accordance with a predetermined preferred operation, means for indicating whether a car is operating in accordance with said predetermined preferred operation, means operable when a car traveling in said given direction by-passes said floor after a demand for service in said given direction has been registered at said floor but prior to the end of said predetermined interval of time for operating said preferred service demand indicating means, and means responsive to an indication that said car by-passing said floor is operating in accordance with said predetermined preferred operation for preventing the operation of said preferred service demand indicating means in response to said car by-passing said floor.

88. In a dispatching and control system for a plurality of elevator cars operating in a bank as described in claim 87, means responsive to the selection of a car for operation in accordance with said predetermined preferred operation for preventing the operation of said preferred service demand indicating means in response to said car by-passing said floor even though said car is not then operating in accordance with said predetermined preferred operation until said car has completed the trip in said given direction, provided said car had been selected to operate in accordance with said predetermined preferred operation while on said trip in said given direction prior to by-passing said floor.

89. In a dispatching and control system for a plurality of elevator cars operating in a bank between a plurality of floors, selectively operable preferred service demand indicating means at one or more floors, and means responsive to the operation of a predetermined number of said preferred service demand indicating means for selecting a car for preferred service operation.

90. In a dispatching and control system for a plurality of elevator cars operating in a bank between a plurality of floors, selectively operable preferred service demand indicating means at one or more floors, and means responsive to the operation of at least one of said preferred service demand indicating means for selecting a car for preferred service operation.

91. In a dispatching and control system for a plurality of elevator cars operating in a bank between a plurality of floors, selectively operable preferred service demand indicating means at one or more floors, and means responsive to the operation of at least one of said preferred service demand indicating means for selecting a car for preferred service operation, provided no one of the other cars operating in said bank is selected for said preferred service operation.

92. In a dispatching and control system for a plurality of elevator cars operating in a bank between a plurality of floors, selectively operable preferred service demand indicating means at one or more floors, means for indicating that a car is positioned and conditioned relative to the other cars operating in said bank to serve operated preferred service demand indicating means at said floors, and means for selecting a car for preferred service operation when at least one of said preferred service demand indicating means is operated, provided said car to be selected is positioned and conditioned to serve said preferred service demand and no one of the other cars operating in said bank is selected for said preferred service operation.

93. In a dispatching and control system for a plurality of elevator cars operating in a bank between a plurality of floors, selectively operable preferred service demand indicating means at one or more floors, means for indicating that a car is positioned and conditioned relative to the other cars operating in said bank to serve operated preferred service demand indicating means at said floors, and means for selecting a car for preferred service operation when at least one of said preferred service demand indicating means is operated, provided said car to be selected is positioned and conditioned to serve said preferred service demand, no one of the other cars operating in said bank is selected for said preferred service operation, and said car to be selected is not selected for some other preferred service operation.

94. In a dispatching and control system for a plurality of elevator cars operating in a bank between a plurality of floors, selectively operable preferred service demand indicating means at one or more floors for indicating demands for service in a given direction, selectively operable preferred service demand indicating means at one or more floors for indicating demands for service in a direction opposite said given direction, means for selecting a car for preferred service operation in said given direction, means for selecting a car for preferred service operation in said opposite direction, and means for preventing the selection of a car by said selecting means for preferred service operation in said given direction when said car to be selected is selected for preferred service operation in said opposite direction.

95. In a dispatching and control system for a plurality of elevator cars operating in a bank between a plurality of floors, selectively operable preferred service demand indicating means at one or more floors for indicating demands for preferred service in a given direction, means for determining that a car is positioned in said given direction beyond any of said floors having operated preferred service demand indicating means, and means for selecting a car positioned in said given direction beyond any of said floors having operated preferred service demand indicating means for preferred service operation when at least one of said preferred service demand indicating means is operated and no one of the other cars operating in said bank is selected for said preferred service operation.

96. In a dispatching and control system for a plurality of elevator cars operating in a bank between a plurality of floors, selectively operable preferred service demand indicating means at one or more floors for indicating demands for preferred service in a given direction, means for determining that a car is positioned in a direction opposite the given direction beyond at least one of said floors having operated preferred service demand indicating means, and means for selecting a car for preferred service operation when at least one of said preferred service demand indicating means is operated, provided said car to be selected is positioned in said opposite direction beyond at least one of said operated preferred service demand indicating means and no one of the other cars operating in said bank is selected for said preferred service operation.

97. In a dispatching and control system for a plurality of elevator cars operating in a bank between a plurality of floors, selectively operable preferred service demand indicating means at one or more floors for indicating a preferred service demand for travel in a given direction, means for determining that a car is traveling in a direction opposite said given direction and is positioned in said opposite direction beyond any other of said cars traveling in said opposite direction, and means for selecting said car traveling in said opposite direction and positioned in said opposite direction beyond any of said other cars traveling in said opposite direction for preferred service operation when at least one of said preferred service demand indicating means is operated, provided no one of the other cars operating in said bank is selected for said preferred service operation.

98. In a dispatching and control system for a plurality of elevator cars operating in a bank between a plurality of floors, selectively operable preferred service demand indicating means at one or more floors, means at one or more floors for registering demands for service, by-passing means individual to a car for causing said car to by-pass a floor at which a service demand is registered, and means for selecting a car for preferred service operation when at least one of said preferred service demand indicating means is operated, provided said by-passing means is not operated in said car to be selected and no one of the other cars operating in said bank is selected for said preferred service operation.

99. In a dispatching and control system for a plurality of elevator cars operating in a bank between a plurality of floors, wherein cars are dispatched from a dispatching floor in a given direction, selectively operable preferred service demand indicating means at one or more floors for indicating a preferred service demand for travel in said given direction, means for determining which of said cars traveling in a direction opposite said given direction is nearest the dispatching floor toward which said cars are traveling, and means for selecting a car traveling in said opposite direction nearest said dispatching floor toward which it is traveling for preferred service operation when at least one of said preferred service demand indicating means is operated, provided no one of said cars operating in said bank other than said car to be selected is selected for said preferred service operation.

100. In a dispatching and control system for a plurality of elevator cars operating in a bank between a plurality of floors, selectively operable preferred service demand indicating means at one or more floors for indicating a preferred service demand for travel in the down direction, means for determining which of said cars is the highest up traveling car, and means for selecting the highest up traveling car for preferred service operation when at least one of said preferred service demand indicating means is operated, provided no one of the other cars operating in said bank other than said highest up traveling car is selected for said preferred service operation.

101. A dispatching and control system for a plurality of elevator cars operating in a bank between a plurality of floors, comprising selecting means for selecting a car to be dispatched from a given floor, dispatching means for controlling the dispatching of a selected car from said given floor, means at one or more floors other than said given floor for registering demands for service, selectively operable preferred service demand indicating means at one or more floors other than said given floor, by-passing means individual to said cars for causing a car to by-pass a floor at which a demand for service is registered, and means for selecting a car selected by said selecting means to be dispatched from said given floor for preferred service operation when at least one of said preferred service demand indicating means is operated, provided said by-passing means individual to said car selected by said selecting means for dispatching from said given floor is not operated and no one of the other cars operating in said bank is selected for said preferred service operation.

102. A dispatching and control system for a plurality of elevator cars operating in a bank between a plurality of floors, comprising selecting means for selecting a car to be dispatched from a given floor, dispatching means for controlling the dispatching of a selected car from said given floor, means individual to said cars for indicating the selection of a respective car by said selecting means as the next car to be dispatched from said given floor, selectively operable preferred service demand indicating means at one or more floors other than said given floor, means for registering a demand for service at one or more floors other than said given floor, by-passing means individual to said cars for by-passing floors at which demands for service are registered, and means responsive to said selection indicating means for selecting a car for preferred service operation when at least one of said service demand indicating means is operated, provided no one of said cars other than said car to be selected is selected for said preferred service operation and said by-passing means individual to said car to be selected is not operated.

103. A dispatching and control system for a plurality of elevator cars operating in a bank between a plurality of floors, comprising selecting means for selecting a car to be dispatched from an upper dispatching floor, dispatching means for controlling the dispatching from said upper dispatching floor of an elevator car selected by said selecting means, means at one or more floors other than said upper dispatching floor for registering demands for service, selectively operable preferred service demand indicating means at one or more floors other than said upper dispatching floor for indicating preferred service demand for travel in the down direction, by-passing means individual to said cars for causing a car to by-pass a floor at which a service demand is registered, and means for selecting a car selected by said selecting means for dispatching from said upper dispatching floor for preferred service operation when at least one of said preferred service demand indicating means is operated, provided said by-passing means individual to said car selected for dispatching from said upper dispatching floor is not operated and no one of the other cars operating in said bank is selected for said preferred service operation.

104. In a dispatching and control system for a plurality of elevator cars operating in a bank as described in claim 103, means for maintaining the selection of the car selected for said preferred service operation as long as down preferred service demand indicating means are operated below said selected preferred service operation car, provided said by-passing means individual to said selection preferred service operation car is not operated.

105. A dispatching and control system for a plurality of elevator cars operating in a bank between a plurality of floors, comprising selecting means for selecting a car to be dispatched from an upper dispatching floor, dispatching means for controlling the dispatching from said upper dispatching floor of an elevator car selected by said selecting means, means at one or more floors other than said upper dispatching floor for registering demands for service, selectively operable preferred service demand indicating means at one or more floors below said upper dispatching floor for indicating preferred service demand for travel in the up direction, by-passing means individual to said cars for causing a car to by-pass a floor at which a service demand is registered, and means for selecting a car selected by said selecting means for dispatching from said upper dispatching floor for preferred service operation when at least one of said preferred service demand indicating means is operated, provided said by-passing means individual to said car selected for dispatching from said upper dispatching floor is not operated and no one of the other cars operating in said bank is selected for said preferred service operation.

106. A dispatching and control system for a plurality of elevator cars operating in a bank between a plurality of floors, comprising selecting means for selecting a car to be dispatched from an upper dispatching floor, dispatching means for controlling the dispatching from said upper dispatching floor of an elevator car selected by said selecting means, means at one or more floors other than said upper dispatching floor for registering demands for service, selectively operable preferred service demand indicating means at one or more floors below said upper dispatching floor for indicating preferred service demand for travel in the up direction, by-passing means individual to said cars for causing a car to by-pass a floor at which a service demand is registered, means for determining the position of each of said cars in said bank relative to said one or more floors below said upper dispatching terminal at which said preferred service demand indicating means may be operated, the direction of travel for which each of said cars in said bank are set, and the direction in which each of said cars in said bank is travelling, and means for selecting a car selected by said selecting means for dispatching from said upper dispatching floor for preferred service operation when at least one of said preferred service demand indicating means is operated, provided said by-passing means individual to said car selected for dispatching from said upper dispatching floor is not operated, no one of the other cars operating in said bank is selected for said preferred service operation, and no car is positioned above said one or more floors at which said preferred service demand indicating means may be operable other than cars traveling in the up direction or if not traveling in the up direction not set for travel in the down direction.

107. In a dispatching and control system for a plurality of elevator cars operating in a bank between a plurality of floors as described in claim 106, means for determining which of said cars in said bank traveling in the down direction is the lowest, and means for maintaining the selection of said selected car for preferred service operation while it is traveling in the down direction and is positioned above said one or more floors at which said preferred service demand indicating means may be operable, provided it is the lowest down traveling car.

108. In a dispatching and control system for a plurailty of elevator cars operating in a bank between a plurality of floors as described in claim 107, means for determining when a car traveling in the down direction approaches the highest of one or more floors at which said preferred service demand indicating means may be operable, and means for maintaining the selection of said car for said preferred service operation as it approaches said highest floor, provided preferred service demand indicating means are operable at one or more of said floors below said highest floor.

109. In a dispatching and control system for a plurality of elevator cars operating in a bank between a plurality of floors, selectively operable preferred service demand indicating means at one or more floors for indicating a preferred service demand for travel in the up direction, means for determining which of said cars operating in said bank is the highest up traveling car, means for determining whether a car is positioned above said one or more floors at which preferred service demand indicating means may be operable, means for determining the direction of travel and the direction in which a car is set to travel of each of said cars in said bank, and means for selecting the highest up traveling car for preferred service operation when at least one of said preferred service demand indicating means is operated, provided no one of the other cars operating in said bank other than said highest up traveling car is selected for said preferred service operation, and none of said cars in said bank positioned above said one or more floors at which said preferred service demand indicating means may be operable are set for travel in the down direction unless traveling in the up direction.

110. In a dispatching and control system for a plurality of elevator cars operating in a bank between a plurality of floors as described in claim 109, means for maintaining the selection of said cars for said preferred service operation as long as said car remains the highest up traveling car, provided at least one of said preferred service demand indicating means is operated.

111. In a dispatching and control system for a plurality of elevator cars operating in a bank between a plurality of floors as described in claim 109, means for causing the reversal of the direction of travel of said highest traveling car, means for determining whether a car set for travel in the down direction is the highest down traveling car, and means for maintaining the selection of said preferred service operation car upon reversal of the direction in which it is set for travel, provided said selected car upon reversal of its direction setting is the lowest down traveling car.

112. In a dispatching and control system for a plurality of elevator cars operating in a bank between a plurality of floors, selectively operable preferred service demand indicating means at one or more floors for indicating a preferred service demand for travel in a given direction, means for determining whether one of said cars is positioned in said given direction beyond said one or more floors at which said preferred service demand indicating means may be operated, means for selecting a car positioned beyond said one or more floors at which said preferred service demand indicating means may be operated for preferred service operation when at least one of said preferred service demand indicating means is operated, means responsive to the position and direction of travel of a car for determining that the respective car is positioned at one of said one or more floors at which said preferred service demand indicating means may be operated and that said respective car is traveling in a direction opposite said given direction, and means for maintaining the selection of a car for preferred service operation when it is positioned at said one of said one or more floors and is traveling in said opposite direction, provided preferred service demand indicating means are operated at at least one of said one or more floors in said opposite direction beyond the floor at which said car is positioned.

113. In a dispatching and control system for a plurality of elevator cars operating in a bank between a plurality of floors, selectively operable preferred service demand indicating means at one or more floors for indicating a preferred service demand for travel in the up direction, means for determining whether a car is positioned above said one or more floors at which said preferred service demand indicating means may be operated, means for selecting a car positioned above said one or more floors at which a preferred service demand indicating means may be operated for preferred service operation when at least one of said preferred service demand indicating means is operated, means for determining that a car is positioned at one of said one or more floors at which said preferred service demand indicating means may be operated and is traveling in the down direction, and means for maintaining the selection of a car for said preferred service operation when it is positioned at said one of said one or more floors and is traveling in the down direction, provided said preferred service demand indicating means is operated at at least one of said one or more floors below the floor at which said car is positioned.

114. In a dispatching and control system for a plurality of elevator cars operating in a bank between a plurality of floors, wherein cars are dispatched from a dispatching floor in a given direction, selectively operable preferred service demand indicating means at one or more floors for indicating preferred service demand for travel in said given direction, means for determining which of said cars traveling in said given direction is nearest said dispatching floor from which cars are dispatched in said given direction, means for determining whether all of said cars operating in said bank are set for travel in said given direction, means for determining whether said preferred service demand indicating means are operable at floors in said given direction away from the car traveling in said given direction nearest said dispatching floor from which cars are dispatched in said given direction, and means for selecting the car traveling in said given direction nearest said dispatching floor from which cars are dispatched in said given direction for preferred service operation when all of said cars operating in said bank are set for travel in said given direction and at least one of said preferred service demand indicating means is operated, provided no one of the other cars operating in said bank is selected for said preferred service operation and said preferred service demand indicating means are operable at one or more floors in said given direction away from said car to be selected.

115. In a dispatching and control system for a plurality of elevator cars operating in a bank between a plurality of floors, wherein cars are dispatched from an upper dispatching floor in the down direction, selectively operable preferred service demand indicating means at one or more floors other than said upper dispatching floor for indicating preferred service demand for travel in the down direction, means for determining which of said cars operating in said bank is the highest down traveling car, means for determining whether all of the cars operating in said bank are set for travel in the down direction, means for determining whether down preferred service demand indicating means are operable at one or more floors below the highest down traveling car, and means for selecting the highest down traveling car for preferred service operation when all of said cars operating in said bank are set for travel in the down direction and at least one of said down preferred service demand indicating means is operated, provided down preferred service demand indicating means is operated at one or more floors below said highest down traveling car, and no one of the other cars operating in said bank is selected for said preferred service operation.

116. In a dispatching and control system for a plurality of elevator cars operating in a bank as described in claim 115, means for maintaining the selection of the car selected for said preferred service operation as long as down preferred service demand indicating means are operated below said selected preferred service operation car.

117. In a dispatching and control system for a plurality of elevator cars operating in a bank between a plurality of floors, selectively operable preferred service demand indicating means at one or more floors, means for selecting a car for preferred service operation when at least one of said preferred service demand indicating means is operated, means for determining whether said preferred service demand indicating means is operated at at least one of said one or more floors beyond the position of a car selected for preferred service operation in the direction in which said selected car is traveling, and means for maintaining the selection of said selected car for said preferred service operation as long as preferred service demand indicating means is operated at at least one of said one or more floors beyond the position of said selected car in the direction in which said selected car is traveling.

118. In a dispatching and control system for a plurality of elevator cars operating in a bank between a plurality of floors, selectively operable preferred service demand indicating means at one or more floors for indicating demands for preferred service in a given direction, means at one or more of said floors for registering demands for service in said given direction, means individual to each of said cars for causing a respective car to stop at a floor at which said demands for service are registered, selectively operable means individual to each of said cars for causing a car to by-pass a floor at which one of said demands for service is registered, means for selecting a car for preferred service operation when at least one of said preferred service demand indicating means is operated, and means for operating said selectively operable by-passing means selected for said preferred service operation and traveling in said given direction at floors at which said demands for service in said given direction are registered, provided preferred service demand indicating means is not operated at that floor.

119. In a dispatching and control system for a plurality of elevator cars operating in a bank between a plurality of floors, selectively operable preferred service demand indicating means at one or more floors for indicating demands for preferred service in a given direction, means at one or more of said floors for registering demands for service in said given direction, means at one or more of said floors for registering demands for service in a direction opposite said given direction, means individual to each of said cars for causing a respective car to stop at a floor at which said demands for service are registered, selectively operable means individual to each of said cars for causing a car to by-pass a floor at which one of said demands for service is registered in a direction corresponding to the direction of travel of the respective car, means for selecting a car for preferred service operation when at least one of said preferred service demand indicating means is operated, and means for operating said selectively operable by-passing means selected for said preferred service operation and traveling in said given direction at floors at which said demands for service in said given direction are registered, provided preferred service demand indicating means is not operated at that floor, and means for operating said selectively operable by-passing means in a car selected for said preferred service operation and traveling in said opposite direction at floors at which said demands for service are registered in said opposite direction.

120. In a dispatching and control system for a plurality of elevator cars operating in a bank between a plurality of floors, selectively operable preferred service demand indicating means at one or more floors for indicating demands for preferred service in the down direction, means at one or more of said floors for registering demands for service in said up direction, means at one or more of said floors for registering demands for service in said down direction, means individual to said cars for causing a car to stop at a floor at which demands for service in the direction in which the respective car is traveling is registered, selectively operable by-passing means individual to each of said cars for causing the respective car to by-pass a floor at which said demand for service is operated, means for selecting a car for preferred service operation when at least one of said preferred service demand indicating means is operated, means for operating said selectively operable by-passing means in a car selected for said preferred service operation traveling in the down direction at a floor at which a demand for service is registered in said down direction, provided said preferred service demand indicating means is not operated at that floor, and means for operating said selectively operable by-passing means in said selected car when traveling in the up direction at floors at which said demands for service in the up direction are registered.

121. In a dispatching and control system for a plurality of elevator cars operating in a bank between a plurality of floors, selectively operable preferred service demand indicating means at one or more floors for indicating demands for preferred service in the up direction, means at one or more of said floors for registering demands for service in the up direction, means at one or more of said floors for registering demands for service in the down direction, means individual to each of said cars for causing a respective car traveling in the direction for which a demand for service is registered at one of said floors to stop said car at said one of said floors, selectively operable by-passing means individual to each of said cars for causing a car traveling in the direction in which a demand for service is registered at one of said floors for by-passing a floor for which said demand for service is registered, means for selecting a car for preferred service operation when at least one of said preferred service demand indicating means is operated, means for operating said selectively operable by-passing means in a car selected for said preferred service operation traveling in the down direction at floors at which demands for service are registered in said down direction, and means for operating said selectively operable by-passing means of said car selected for said preferred service operation traveling in the up direction at floors at which demands for service are registered in the up direction.

122. In a dispatching and control system for a plurality of elevator cars operating in a bank between a plurality of floors, selectively operable preferred service demand indicating means at one or more floors for indicating demands for service in a given direction, means for indicating that a car is positioned and conditioned relative to the other cars operating in said bank to serve operated preferred service demand indicating means at said floors, means for selecting a car traveling in said given direction for preferred service operation when at least one of said preferred service demand indicating means is operated, provided no one of the other cars operating in said bank is selected for preferred service operation, and means for preventing the selection of a car traveling in said given direction for said preferred service operation when said car is not positioned and conditioned to serve operated preferred service demand indicating means at said floors while traveling in said given direction.

123. In a dispatching and control system for a plurality of elevator cars operating in a bank between a plurality of floors, wherein cars are dispatched in a given direction from a dispatching floor, traffic demand sensing means responsive to demands for travel by said cars, selectively enabled means individual to each of said cars responsive to said traffic demand sensing means for causing a car to travel in said given direction when the demand for service by said cars is equal to or exceeds a predetermined amount, means at one or more of said floors for registering demands for service in a direction toward said dispatching floor opposite said given direction, means for determining whether said demands for service in said opposite direction are registered at floors between a car traveling in said opposite direction and said dispatching floor, and means operable when no demands for service in said opposite direction are registered at floors between a car traveling in said opposite direction and said displatching floor for enabling said selectively enabled means to cause a car to travel in said given direction before arriving at said displatching floor when the demand for service by said car is equal to or exceeds said predetermined amount.

124. In a dispatching and control system for a plurality of elevator cars operating in a bank between a plurality of floors, wherein cars are dispatched in a given direction from a dispatching floor, traffic demand sensing means responsive to demands for travel by said cars, means at one or more of said floors for registering demands for service in said given direction away from said dispatching floor, means at one or more of said floors for registering demands for service in a direction towards said dispatching floor opposite said given direction, selectively enabled means individual to each of said cars responsive to said traffic demand sensing means for causing a car to travel in said given direction when demands for service are registered at a predetermined plurality of said floors, means for determining whether said demands for service in said opposite direction are registered at floors between the car traveling in said opposite direction and said dispatching floor and means operable when no demands for service in said opposite direction are registered at floors between a car traveling in said opposite direction and said dispatching floor for enabling the respective selectively enabled means to cause the car to travel in said given direction before arriving at said dispatching floor when demands for service are registered at said predetermined plurality of floors.

125. In a dispatching and control system for a plurality of elevator cars operating in a bank between a plurality of floors, wherein cars are dispatched in a given direction from a dispatching floor, traffic demand sensing means responsive to demands for travel by said cars, means at one or more of said floors for registering demands for service in said given direction away from said dispatching floor, means at one or more of said floors for registering demands for service in a direction towards a dispatching floor opposite said given direction, selectively enabled means individual to each of said cars responsive to said traffic demand sensing means for causing a car to travel in said given direction when demands for service are registered at a predetermined plurality of said floors, means for determining whether said demands for service in said opposite direction are registered at floors between a car traveling in said opposite direction and said displatching floor, means operable when no demands for service in said opposite direction are registered at floors between a car traveling in said opposite direction and said dispatching floor for enabling the respective selectively enabled means to cause a car to travel in said given direction before arriving at said dispatching floor when demands for service are registered at said predetermined plurality of floors, and special service means for simulating demands for service at said predetermined plurality of floors.

126. In a dispatching and control system for a plurality of elevator cars operating in a bank between a plurality of floors, wherein cars are dispatched in a given direction from a dispatching floor, traffic demand sensing means responsive to demands for travel by said cars, means for determining the direction of travel and position of each of said cars operating in said bank relative to the other cars operating in said bank, means at one or more of said floors for registering demands for service in said given direction away from said dispatching floor, means at one or more of said floors for registering demands for service in a direction toward said dispatching floor opposite said given direction, selectively enabled means individual to each of said cars responsive to said traffic demand sensing means for causing a car to travel in said given direction when demands for service are registered at a predetermined plurality of said floors between the respective car and the next preceding car operating in said bank, means for determining whether said demands for service in said opposite direction are registered at floors between a car traveling in said opposite direction and said dispatching floor, and means operable when no demands for service in said opposite direction are registered at floors between a car traveling in said opposite direction and dispatching floor for enabling the respective selectively enabled means to cause the respective car to travel in said given direction before arriving at said dispatching floor when demands for service are registered at said predetermined plurality of floors between said respective car and said next preceding car.

127. In a dispatching and control system for a plurality of elevator cars operating in a bank between a plurality of floors, wherein cars are dispatched in a given direction from a dispatching floor, traffic demand sensing means responsive to demands for travel by said cars, means for determining the direction of travel and position of each of said cars operating in said bank relative to the other cars operating in said bank, means at one or more of said floors for registering demands for service in said given direction away from said dispatching floor, means at one or more of said floors for registering demands for service in a direction toward said dispatching floor opposite said given direction, selectively enabled means individual to each of said cars responsive to said traffic demand sensing means for causing a car to travel in said given direction when demands for service are registered at a predetermined plurality of said floors between the respective car and the next preceding car or when demands for service are registered at a greater predetermined plurality of said floors ahead of said next preceding car, means for determining whether said demands for service in said opposite direction are registered at floors between a car traveling in said opposite direction and said dispatching floor, and means operable when no demands for service in said opposite direction are registered at floors between the car traveling in said opposite direction and said dispatching floor for enabling the respective selectively enabled means to cause the respective car to travel in said given direction before arriving at said dispatching floor when demands for service are registered at said predetermined plurality of floors between said respective car and said next preceding car or when demands for service are registered at a greater predetermined plurality of floors ahead of said next preceding car.

128. In a dispatching and control system for a plurality of elevator cars operating in a bank between a plurality of floors, wherein cars are dispatched in a given direction from a dispatching floor, traffic demand sensing means responsive to demands for travel by said cars, means for determining the direction of travel and position of each of said cars operating in said bank relative to the other cars operating in said bank, means at one or more of said floors for registering demands for service in said given direction away from said dispatching floor, means at one or more of said floors for registering demands for service in a direction toward said dispatching floor opposite said given direction, selectively enabled means individual to each of said cars responsive to said traffic demand sensing means for causing a car to travel in said given direction when demands for service are registered at a predetermined plurality of said floors between the respective car and the next preceding car, means for determining whether said demands for service in said opposite direction are registered at floors between a car traveling in said opposite direction and said dispatching floor, means operable when no demands for service in said opposite direction are registered at floors between a car traveling in said opposite direction and said dispatching floor for enabling the respective selectively enabled means to cause the respective car to travel in said given direction before arriving at said dispatching floor when demands for service are registered at said predetermined plurality of floors between said respective car and said next preceding car, and special service means for simulating the registration of demands for service at said predetermined plurality of floors.

129. In a dispatching and control system for a plurality of elevator cars operating in a bank between a plurality of floors, wherein cars are dispatched in a given direction from a dispatching floor, traffic demand sensing means responsive to demands for travel by said cars, means for determining the direction of travel and position of each of said cars operating in said bank relative to the other cars operating in said bank, means at one or more of said floors for registering demands for service in said given direction away from said dispatching floor, means at one or more of said floors for registering demands for service in a direction toward said dispatching floor opposite said given direction, selectively enabled means individual to each of said cars responsive to said traffic demand sensing means for causing a car to travel in said given direction when demands for service are registered at a predetermined plurality of said floors between the respective car and the next preceding car, means for determining whether said demands for service in said opposite direction are registered at floors between a car traveling in said opposite direction and said dispatching floor, means operable when no demands for service in said opposite direction are registered at floors between a car traveling in said opposite direction and said dispatching floor for enabling the respective selectively enabled means to cause the respective car to travel in said given direction before arriving at said dispatching floor when demands for service are registered at said predetermined plurality of floors between said respective car and said next preceding car, and special service means for simulating at predetermined positions relative to said floors the registration of demands for service at said predetermined plurality of floors.

130. In a dispatching and control system for a plurality of elevator cars as described in claim 129, said special service means including means responsive to the registration of a demand for service at a predetermined one of said floors.

131. In a dispatching and control system for a plurality of elevator cars as described in claim 129, means in each of said cars for registering demands for service, said special service means including means responsive to the registration of a demand for service in a predetermined car.

132. In a dispatching and control system for a plurality of elevator cars as described in claim 129, means responsive to the presence and absence of cars to determine whether a predetermined number of cars are at a given floor other than said dispatching floor located in said given direction away from said dispatching floor, said special service means including means operable when less than said predetermined number of cars are at said given floor.

133. In a dispatching and control system for a plurality of elevator cars as described in claim 129, selectively operable preferred service demand indicating means at one or more floors other than said dispatching floor located in said given direction away from said dispatching floor for indicating a demand for special service, said special service means including means responsive to the operation of said preferred service demand indicating means at one or more of said floors.

134. In a dispatching and control system for a plurality of elevator cars as described in claim 129, selectively operable preferred service demand indicating means at one or more floors other than said dispatching floor located in said given direction away from said dispatching floor, means responsive to the operation of at least one of said preferred service demand indicating means for selecting a car for preferred service operation, means for determining whether a car traveling in said opposite direction is positioned between said dispatching floor and any of said one or more floors at which said preferred service demand indicating means is operated, and means independent of whether said demands for service are registered at floors between a car traveling in said opposite direction and said dispatching floor for causing a car selected for preferred service operation and positioned between said dispatching floor and said any of said one or more floors at which said preferred service demand indicating means is operated for causing said preferred service operation selected car traveling in said opposite direction to reverse its direction of travel.

135. In a dispatching and control system for a plurality of elevator cars operating in a bank between a plurality of floors, wherein cars are dispatched in a given direction from a dispatching floor, traffic demand sensing means responsive to the demand for travel by said cars, means at one or more of said floors for registering demands for service in said given direction away from said dispatching floor, means at one or more of said floors for registering demands for service in a direction towards said dispatching floor opposite said given direction, selectively operable means individual to each of said cars responsive to said traffic demand sensing means for causing a car to travel in said given direction when demands for service are registered at a predetermined plurality of said floors, selectively operable preferred service demand indicating means at one or more floors other than said dispatching floor located in said given direction away from said dispatching floor, means responsive to the operation of a preferred service demand indicating means of one or more floors for selecting a car for preferred service operation, means for determining whether a preferred service demand indicating means is operated at a floor between a car selected for said preferred service operation and said dispatching floor, and means for operating said selectively operable means for causing a car to travel in said given direction of a car selected for said preferred service operation and traveling in said opposite direction, provided no preferred service demand indicating means are operated at floors between said selected car and said dispatching floor.

136. In a dispatching and control system for a plurality of elevator cars operating in a bank between a plurality of floors, wherein cars are dispatched in a given direction from a dispatching floor, means at one or more floors other than said dispatching floor located in said given direction away from said dispatching floor for registering demands for service, selectively operable preferred service demand indicating means at said one or more floors for indicating demands for preferred service in said given direction, means individual to each of said cars for causing a car to stop at a floor in response to the registration of a demand for service at that floor, selectively operable by-passing means individual to each of said cars for causing a car to by-pass a floor at which a demand for service is registered, means individual to each of said cars and responsive to the load conditions of a respective car for operating said selectively operable by-passing means when said load condition in said respective car is equal to or greater than a predetermined amount, means responsive to the operation of said selectively operable by-passing means for operating said selectively operable preferred service demand indicating means at a floor at which a demand for service is registered when it is by-passed by a car having a load condition equal to or greater than said predetermined amount, and means responsive to the operation of said selectively operable preferred service demand indicating means for operating said means for causing a car to travel in said given direction, provided no preferred service demand indicating means is operated at a floor between said car and said dispatching floor.

137. A dispatching and control system for a plurality of elevator cars operating in a bank, comprising selecting means for selecting one of said cars to be dispatched from a dispatching floor when one or more cars are at said dispatching floor, dispatching means individual to each of said cars for causing a car selected by said selecting means to be dispatched from said dispatching floor, means for detecting failure of said dispatching means and means responsive to said dispatcher failure detecting means for removing the respective car from the control of said dispatching and control system.

138. A dispatching and control system for a plurality of elevator cars operating in a bank, comprising selecting means for selecting one of said cars to be dispatched from a dispatching floor when one or more cars are at said dispatching floor, electronic dispatching means individual to each of said cars for causing the respective car selected by said selecting means to be dispatched from said dispatching floor, means for detecting failure of said electronic dispatching means, and means responsive to said failure detecting means for removing the respective car from the control of said dispatching and control system upon failure of said electronic dispatching means.

139. A dispatching and control system for a plurality of elevator cars operating in a bank, comprising selecting means for selecting one of said cars to be dispatched from a dispatching floor when one or more cars are at said dispatching floor, electronic dispatching means for causing a car selected by said selecting means to be dispatched from said dispatching floor, means for detecting failure of said electronic dispatching means, timing means initiated upon the operation of said failure detecting means, and means responsive to the operation of said electronic dispatcher failure detecting means at the end of a predetermined interval of time provided by said timing means for removing the respective car from the control of said dispatching and control system.

140. A dispatching and control system for a plurality of elevator cars operating in a bank, comprising selecting means for selecting one of said cars to be dispatched from a dispatching floor when one or more of said cars are at said dispatching floor, dispatching means for causing a car selected by said selecting means to be dispatched from said dispatching floor, door closing means individual to each car, means for detecting interference with the operation of said door closing means, timing means responsive to said interference detecting means, and means for causing a car to lose its selection as the car to be dispatched from said dispatching floor at the end of a predetermined interval of time during which there is a continuous interference with the operation of said door closing mechanism.

141. A dispatching and control system for a plurality of elevator cars operating in a bank, comprising selecting means for selecting one of said cars to be dispatched from a dispatching floor when one or more of said cars are at said dispatching floor, starting means individual to each of said cars, dispatching means individual to each of said cars for operating said starting means of a car selected by said selecting means, door closing means individual to each car, means for detecting interference with said door closing means, first timing means responsive to the operation of said interference detecting means for providing time intervals of a given duration, means operable in response to the operation of said timing means after a timing interval of said given duration in which continuous interference with said door closing means is detected for causing a car selected by said selecting means to lose its selection as the next car to be dispatched from said dispatching floor, second timing means responsive to the operation of said dispatching means for providing timing intervals a duration greater than said given duration, and means for removing a car from the control of said dispatching and control system at the end of a time interval of said duration greater than said given duration following the operation of said dispatching means, provided said starting means failed to operate.

142. A dispatching and control system for a plurality of elevator cars operating in a bank, comprising selecting means for selecting one of said cars to be dispatched from a dispatching floor when one or more of said cars are at said dispatching floor, starting means individual to each of said cars, dispatching means individual to each of said cars for operating said starting means of a car selected by said selecting means to be dispatched from said dispatching floor, timing means responsive to the operation of said dispatching means, and means for removing a car from the control of said dispatching and control system at the end of a predetermined interval of time following the operation of said dispatching means, provided said starting means fails to operate.

143. A dispatching and control system for a plurality of elevator cars operating in a bank, comprising selecting means for selecting one of said cars to be dispatched from a dispatching floor when one or more of said cars are at said dispatching floor, dispatching means for causing a car selected by said selecting means to be dispatched from said dispatching floor, selectively operable motor-generator means for each of said cars, means for determining when said motor-generator means for all of the cars in said bank are not operating, door opening means individual to each of said cars, door closing means individual to each of said cars, means for causing said door opening means of a car selected by said selecting means for dispatching to be operated, means for maintaining the doors of a car selected by said selecting means open while the respective car remains selected for dispatching, means for operating said door closing means in said selected car in response to the operation of said dispatching means, and means for operating said door closing means while said car remains selected for dispatching by said selecting means independent of said dispatching means when said motor-generator means for all of the cars in said bank are not operating.

144. A dispatching and control system for a plurality of elevator cars operating in a bank, comprising selecting means for selecting one of said cars to be dispatched from a dispatching floor when one or more of said cars are at said dispatching floor, means for registering demands for service by said cars, dispatching means for causing a car selected by said selecting means to be dispatched from said dispatching floor, operable when one or more demands for service are registered by said cars, motor-generator means for each of said cars, selectively operable means individual to each of said cars for running the respective motor-generator means and for shutting down said respective motor-generator means, means responsive to an absence of demand for the service of a car for operating said means for shutting down said respective motor-generator means, means responsive to demand for service of a car for operating said means for running said motor-generator means, means for determining that the motor-generator means for all of said cars in said bank are shut down, means for maintaining the selection of a car by said selecting means as the next car to be dispatched from said dispatching floor when one or more demands for service are registered even when said motor-generator means for said selected car is shut down, means responsive to the absence of a predetermined number of cars from said dispatching floor for simulating a demand for service at said dispatching floor to cause the movement of a car in said bank from a floor other than said dispatching floor to said dispatching floor, means for preventing the operation of said service demand simulating means when a demand for service is registered after said motor-generator means for all of said cars in said bank have been shut down, timing means initiated in response to an indication of the absence of said predetermined number of cars from said dispatching floor after said motor-generator means for all of said cars have been shut down and a demand for service causes said motor-generator means for said car selected as the next car to be dispatched to run permitting said selected car to leave said dispatching floor in response to said demand for service, and means for disabling said means for preventing the operation of said service demand simulating means at the end of a predetermined time interval provided by said timing means.

145. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispachting means for causing a car selected by said selecting means to be dispatched from said dispatching floor in said given direction, means for registering demands for service to and from said floor beyond said dispatching floor and means responsive to the presence of one or more cars at said dispatching floor other than said selected car for selecting one of said other cars for preferred service operation to said floor beyond said dispatching floor independent of the operation of said means for registering demands for service.

146. A dispatching and control system for a plurality of elevator cars operating in a bank between a plurality of floors as described in claim 145, each of said cars operating in said bank being in a predetermined numerical order of preference, means operable when more than one car is at said dispatching floor in addition to said car selected by said selecting means for dispatching for causing the selection of a car for preferred service operation to said floor beyond said dispatching floor to be in accordance with said predetermined numerical order of preference.

147. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more cars at said dispatching floor other than said selected car for selecting one of said other cars for preferred service operation to said floor beyond said dispatching floor independent of the operation of said means for registering demands for service, and means for preventing the selection for service to said floor beyond said dispatching floor of a car other than said car selected by said preferred service operation selecting means.

148. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more cars at said dispatching floor other than said selected car for selecting one of said other cars for preferred service operation to said floor beyond said dispatching floor independent of the operation of said means for registering demands for service, means permitting the selection of a car selected for preferred service operation to said floor beyond said dispatching floor by said selecting means for selecting one of said cars to be dispatched from said dispatching floor, provided demands for service to and from said floor beyond said dispatching floor are not registered.

149. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more cars at said dispatching floor other than said selected car for selecting one of said other cars for preferred service operation to said floor beyond said dispatching floor independent of the operation of said means for registering demands for service, means permitting the selection of a car selected for preferred service operation to said floor beyond said dispatching floor by said selecting means for selecting one of said cars to be dispatched from said dispatching floor, provided demands for service to and from said floor beyond said dispatching floor are not registered, and means responsive to the selection of said car selected for said preferred service operation to said floor beyond said dispatching floor by said selecting means as a car to be dispatched from said dispatching floor for causing said preferred service operation car to lose its selection for preferred service operation and to permit said preferred service operation selecting means to select another one of said cars.

150. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more of said cars at said dispatching floor other than said selected car for selecting one of said other cars for preferred service operation to said floor beyond said dispatching floor independent of the operation of said means for registering demands for service, means for indicating the presence of a car at said floor beyond said dispatching floor, means for registering demands for service in each of said cars for floors in said given direction from said dispatching floor, and means responsive to the presence of the car selected for said preferred service operation at said floor beyond said dispatching floor and to the registration of demands for service in said car selected for said preferred service operation for floors in said given direction away from said dispatching floor for causing said preferred service operation car to lose its selection for said preferred service operation and to permit said preferred service operation selecting means to select another car.

151. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more of said cars at said dispatching floor other than said selected car for selecting one of said other cars for preferred service operation to said floor beyond said dispatching floor independent of the operation of said means for registering demands for service, means for indicating the presence of a car at said floor beyond said dispatching floor, means in each of said cars for registering demands for service for floors in said given direction from said dispatching floor, and means for permitting the selection of a car positioned at or in said opposite direction beyond said dispatching floor by said dispatching selecting means, provided demands for service for floors in said given direction from said dispatching floor were registered in said car positioned at said dispatching floor and at or in said opposite direction beyond said dispatching floor when said car was positioned at said floor beyond said dispatching floor.

152. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more of said cars at said dispatching floor other than said selected car for selecting one of said other cars for preferred service operation to said floor beyond said dispatching floor independent of the operation of said means for registering demands for service, means permitting the selection by said dispatching selecting means of a car positioned in said opposite direction beyond said dispatching floor, provided demands for service to and from said floor beyond said dispatching floor are not registered.

153. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more of said cars at said dispatching floor other than said selected car for selecting one of said other cars for preferred service operation to said floor beyond said dispatching floor independent of the operation of said means for registering demands for service, means for determining whether a predetermined number of said cars are operating in said bank, means for preventing a car selected as the car to be dispatched from said dispatching floor from being responsive to the registration of demands for service to and from said floor beyond said dispatching floor when at least said predetermined number of said cars are in operation in said bank, means for indicating the movement of a car, means for registering demands for service in each of said cars for floors in said given direction from said dispatching floor, and means permitting said car selected to be dispatched from said dispatching floor to be responsive to the registration of demands for service to and from said floor beyond said dispatching floor when less than said predetermined number of cars are in operation in said bank, provided said car selected by said dispatching selecting means is not moving and demands for service for floors in said given direction from said dispatching floor are not registered in said car selected to be dispatched from said dispatching floor.

154. A dispatching and control system for a plurality of elevator cars operating in a bank between a plurality of floors, wherein cars are dispatched in a given direction from a dispatching floor and at least one floor is located beyond said dispatching floor in a direction opposite said given direction, comprising selecting means for selecting one of said cars to be dispatched from said dispatching floor, dispatching means for causing a car selected by said selecting means to be dispatched from said dispatching floor in said given direction, means for registering demands for service to and from said floor beyond said dispatching floor, means responsive to the presence of one or more of said cars at said dispatching floor other than said selected car for selecting one of said other cars for preferred service operation to said floor beyond said dispatching floor independent of the operation of said means for registering demands for service, traffic demand sensing means individual to each of said cars responsive to the registration of demands for service for causing cars positioned in said given direction away from said dispatching floor to travel towards said dispatching floor, means for determining whether a predetermined number of said cars are operating in said bank, means for indicating that one of said cars operating in said bank has been selected for preferred service operation to said floor beyond said dispatching floor, and means operable when at least said predetermined number of cars are operating in said bank and when no one of said cars operating in said bank is selected for said preferred service operation to said floor beyond said dispatching floor to make said traffic demand sensing means responsive to the registration of demands for service to and from said floor beyond said dispatching floor.

155. A dispatching and control system for a plurality of elevator cars operating in a bank between a plurality of floors, wherein cars are dispatched from a dispatching floor, comprising selecting means for selecting a car to be dispatched from said dispatching floor, dispatching means for dispatching a car selected by said selecting means, selectively operable means in each of said cars for registering demands for service by the respective car, means for indicating the presence and approach of a car to said dispatching floor, and means responsive to the approach of a car to said dispatching floor for disabling said selectively operable means in the respective car to prevent the registration of said demands for service and to dump demands for service previously registered.

156. A dispatching and control system for a plurality of elevator cars operating in a bank between a plurality of floors, wherein cars are dispatched from a dispatching floor, comprising selecting means for selecting a car to be dispatched from said dispatching floor, dispatching means for dispatching a car selected by said selecting means, selectively operable means in each of said cars for registering demands for service by the respective car, means for indicating the selection by said selecting means of a car to be dispatched from said dispatching floor, and means responsive to the said selection indicating means for disabling said selectively operable means to prevent the registration of said demands for service prior to the selection of the respective car by said selecting means.

157. A dispatching and control system for a plurality of elevator cars operating in a bank between a plurality of floors, wherein cars are dispatched from a dispatching floor, comprising selecting means for selecting a car to be dispatched from said dispatching floor, dispatching means for dispatching a car selected by said selecting means, selectively operable means in each of said cars for registering demands for service by the respective car, means for indicating the selection of a car by said selecting means, means responsive to the movement of a car for indicating that the respective car is stopped, and means responsive to said selection indicating means and said movement indicating means for disabling said selectively operable means to prevent the registration of said demands for service in a car at said terminal floor until it has stopped and prior to its selection by said selecting means.

158. A dispatching and control system for a plurality of elevator cars operating in a bank between a plurality of floors, wherein cars are dispatched from a dispatching floor, comprising selecting means for selecting a car to be dispatched from said dispatching floor, dispatching means for dispatching a car selected by said selecting means, selectively operable means in each of said cars for registering demands for service by the respective car, means for indicating the approach of a car to said dispatching floor, means responsive to the movement of a car for indicating that a car is stopped, means for indicating the selection of a car by said selecting means, means responsive to the approach of a car to said dispatching floor for disabling said selectively operable means to dump demands for service by the respective car previously registered, and further means responsive to said selection indicating means and said movement indicating means for disabling said selectively operable means to prevent the registration of said demands for service until said car has been stopped at said dispatching floor and has been selected by said selecting means.

159. In a dispatching and control system for a plurality of elevator cars operating in a bank between a plurality of floors as described in claim 158, means for preventing the dumping of calls by said disabling means as the car selected by said selecting means is dispatched from said dispatching floor.

160. A dispatching and control system for a plurality of elevator cars operating in a bank between a plurality of floors, wherein cars are dispatched from a dispatching floor in the up direction, comprising selecting means for selecting a car to be dispatched from said dispatching floor, dispatching means for dispatching a car selected by said selecting means, selectively operable means in each of said cars for registering demands for service by the respective car to floors in said given direction from said dispatching floor and in said opposite direction from said dispatching floor, means indicating the approach of a car traveling in said opposite direction to said dispatching floor, means responsive to said approach indicating means for disabling said selectively operable means for registering demands for service for floors in said given direction from said dispatching floor to dump demands for service as previously registered thereby, and means for preventing the dumping of demands for service registered by said selectively operable means for registering demands for service for floors in said opposite direction from said dispatching floor.

161. A dispatching and control system for a plurality of elevator cars operating in a bank between a plurality of floors, wherein cars are dispatched from a dispatching floor in a given direction and at least one floor is located beyond said dispatching floor in a direction opposite said given direction, comprising selecting means for selecting a car to be dispatched from said dispatching floor, dispatching means for dispatching a car selected by said selecting means, selectively operable means in each of said cars for registering demands for service by the respective car to floors in said given direction from said dispatching floor, selectively operable means in each of said cars for registering demands for service by the respective car to said at least one floor in said opposite direction from said dispatching floor, said dispatching selecting means being operable to select a car positioned at said dispatching floor or in said opposite direction beyond said dispatching floor, means responsive to the approach of a car to said dispatching floor for disabling said selectively operable means to dump demands for service previously registered in said car approaching said dispatching floor, and means responsive to the registration of a demand for service to said dispatching floor in a car approaching said dispatching floor in said given direction from said floor beyond said dispatching floor in said opposite direction for preventing said disabling means from dumping said demands for a service previously registered to said dispatching floor and to floors registered to said dispatching floor and to floors in said given direction away from said dispatching floor.

162. In a control system for an elevator car having a car door and operating between a plurality of floors, means in said elevator car for registering demands for service to predetermined floors, means indicating the registration of demands for service in said car to floors beyond said car in a given direction, means indicating travel of a car in said given direction, car door opening means, means indicating when said car door is to be opened, means for causing a car to stop and level at a floor, means for causing a car to re-level at a floor, means for indicating that said car is re-leveling, and means operable when no demands for service are registered in said car beyond said car in said given direction, said car is traveling in said given direction, the car door is to be opened, and the car is not stopped or re-leveling for disabling said selectively operable means to dump demands for service previously registered in said car.

163. In a control system for an elevator car operating between a plurality of floors, separately energized means for controlling the movement of said elevator car, first power source for energizing said movement controlling means, means for indicating the failure of said power source, separately energized utility means in said car, second power source for selectively energizing said utility means, and means responsive to the operation of said power failure indicating means for causing said second power means to energize said utility means.

References Cited in the file of this patent

UNITED STATES PATENTS

| | | |
|---|---|---|
| 2,682,318 | Glaser et al. | June 29, 1954 |
| 2,688,383 | Eames | Sept. 7, 1954 |
| 2,688,384 | Yeasting | Sept. 7, 1954 |
| 2,709,503 | Santini et al. | May 31, 1955 |

UNITED STATES PATENT OFFICE
Certificate of Correction

Patent No. 2,854,096                                                                            September 30, 1958

Kenneth M. White et al.

It is hereby certified that error appears in the printed specification of the above numbered patent requiring correction and that the said Letters Patent should read as corrected below.

Column 5, line 36, for "cat" read —car—; column 6, line 15, for "M" read —EM—; column 8, line 41, for "PBI1" read —BPI1—; column 9, line 9, after "down" insert —as—; column 10, line 12, for "SS3" read —SS13—; column 11, line 13, for "B" read —being—; line 26, for "attendant" read —independent—; column 17, line 6, after "car" strike out "operates"; line 52, for "NDC" read —NDC3—; column 18, line 21, for "displatching" read —dispatching—; column 19, line 75, for "stopping" read —stepping—; column 20, line 19, for "car" read —top—; column 34, line 45, for "closed or" read —open and—; line 46, for "closed" read —open—; lines 47 and 48, for "pick up" read —remain dropped out—; column 38, line 56, strike out "as long as it does not become" and insert instead —until: it becomes—; column 41, lines 9 and 18, strike out "fully opened", in each occurrence, and insert instead —at least a few inches open from the fully closed position—; column 42, line 30, for "thee" read —the—; column 49, lines 25 and 43, and column 50, line 22, second occurrence, for "floors", in each occurrence, read —floor—; column 60, line 43, for "per-empted" read —pre-empted—; column 68, line 31, after "of" insert —said—; column 70, line 66, before "selected" insert —in a car—; column 71, line 16, before "selected" insert —in a car—; column 72, line 45, and column 73, line 14, for "displatching", in each occurrence, read —dispatching—; column 78, line 58, for "dispachting" read —dispatching—; column 84, line 4, after "for" strike out "a"; line 5, after "floors" strike out "registered to said dispatching floor and to floors".

Signed and sealed this 17th day of March 1959.

[SEAL]

Attest:
KARL H. AXLINE,
*Attesting Officer.*

ROBERT C. WATSON,
*Commissioner of Patents.*